United States Patent
Lee et al.

(10) Patent No.: US 11,317,382 B2
(45) Date of Patent: Apr. 26, 2022

(54) METHOD FOR TRANSMITTING V2X MESSAGE BY TERMINAL IN WIRELESS COMMUNICATION SYSTEM, AND TERMINAL USING SAME METHOD

(71) Applicant: LG Electronics Inc., Seoul (KR)

(72) Inventors: Seungmin Lee, Seoul (KR); Hanbyul Seo, Seoul (KR); Hyukjin Chae, Seoul (KR); Kyuhwan Kwak, Seoul (KR)

(73) Assignee: LG Electronics Inc., Seoul (KR)

( * ) Notice: Subject to any disclaimer, the term of this patent is extended or adjusted under 35 U.S.C. 154(b) by 107 days.

(21) Appl. No.: 16/648,097

(22) PCT Filed: Oct. 1, 2018

(86) PCT No.: PCT/KR2018/011658
§ 371 (c)(1),
(2) Date: Mar. 17, 2020

(87) PCT Pub. No.: WO2019/066629
PCT Pub. Date: Apr. 4, 2019

(65) Prior Publication Data
US 2020/0280961 A1    Sep. 3, 2020

Related U.S. Application Data

(60) Provisional application No. 62/566,309, filed on Sep. 29, 2017, provisional application No. 62/631,507, (Continued)

(30) Foreign Application Priority Data

Mar. 13, 2018 (KR) .......................... 10-2018-0029395

(51) Int. Cl.
*H04W 72/04* (2009.01)
*H04W 4/40* (2018.01)

(52) U.S. Cl.
CPC ............. *H04W 72/04* (2013.01); *H04W 4/40* (2018.02)

(58) Field of Classification Search
CPC ....... H04W 72/04; H04W 4/40; H04W 72/02; H04W 72/10; H04W 72/087; H04L 67/12
See application file for complete search history.

(56) References Cited

U.S. PATENT DOCUMENTS

2018/0206260 A1* 7/2018 Khoryaev ......... H04W 72/1263
2018/0376485 A1* 12/2018 Kahtava ................ H04W 72/10
(Continued)

OTHER PUBLICATIONS

CATT, "Discussion on carrier aggregation for mode 4 in V2X Phase 2," R1-1712339, 3GPP TSG RAN WG1 Meeting #90, Prague, Czech Republic, Aug. 21-25, 2017.
(Continued)

*Primary Examiner* — Qun Shen
(74) *Attorney, Agent, or Firm* — Dentons US LLP

(57) ABSTRACT

Provided are a method for transmitting a vehicle-to-everything (V2X) message by a terminal in a wireless communication system, and a device using the method. The method comprises: performing an operation of excluding candidate resources on the basis of a PSSCH-RSRP threshold value in a selection window; determining whether the ratio of remaining candidate resources in the selection window is smaller than a predetermined threshold value; when the ratio is smaller than the threshold value, according to whether at least one of the delay requirement and priority of the V2X message satisfies a predetermined condition, increasing the PSSCH-RSRP threshold value and performing an operation of excluding candidate resources on the basis of the increased PSSCHRSRP threshold value; and transmitting the V2X message by using a resource selected among the remaining candidate resources in the selection window.

7 Claims, 49 Drawing Sheets

Related U.S. Application Data filed on Feb. 16, 2018, provisional application No. 62/634,920, filed on Feb. 25, 2018.

(56) References Cited

U.S. PATENT DOCUMENTS

| | | | | |
|---|---|---|---|---|
| 2019/0044667 | A1* | 2/2019 | Guo | H04L 1/1893 |
| 2019/0059115 | A1* | 2/2019 | Uchiyama | H04W 56/002 |
| 2019/0182840 | A1* | 6/2019 | Feng | H04W 74/0816 |
| 2019/0313405 | A1* | 10/2019 | Li | H04W 24/08 |

OTHER PUBLICATIONS

Intel Corporation, "Resource Selection Latency Reduction for LTE V2V Sidelink Communication," R1-1712490, 3GPP TSG RAN WG1 Meeting #90, Prague, Czech Republic, Aug. 21-25, 2017.

Guangdong OPPO Mobile Telecom, "Discussion of sTTI in eV2X," RR1-1713248, 3GPP TSG RAN WG1 Meeting #90, Prague, P.R. Czechia, Aug. 21-25, 2017.

Huawei, HiSilicon, "Discussion on further latency reduction for R15 sidelink," R1-1713360, 3GPP TSG RAN WG1 Meeting #90, Prague, Czech Republic, Aug. 21-25, 2017.

Samsung, "High order modulation in V2X," R1-1713529, 3GPP TSG RAN WG1 Meeting #90, Prague, Czechia, Aug. 21-25, 2017.

Intel Corporation, "Transmitter behavior for sidelink resource (re)selection", 3GPP TSG RAN WG1 Meeting #86, Aug. 22-26, 2016, R1-166512.

\* cited by examiner

: Resource in which Nth message transmission is performed (SF#K)

: Reselection resource (SF#(K+Z))

METHOD FOR TRANSMITTING V2X MESSAGE BY TERMINAL IN WIRELESS COMMUNICATION SYSTEM, AND TERMINAL USING SAME METHOD

CROSS-REFERENCE TO RELATED APPLICATIONS

This application is the National Stage filing under 35 U.S.C. 371 of International Application No. PCT/KR2018/011658, filed on Oct. 1, 2018, which claims the benefit of U.S. Provisional Application No. 62/566,309 filed on Sep. 29, 2017, No. 62/631,507 filed on Feb. 16, 2018, No. 62/634,920 filed on Feb. 25, 2018 and Korean Patent Application No. 10-2018-0029395 filed on Mar. 13, 2018, the contents of which are all hereby incorporated by reference herein in their entirety.

BACKGROUND OF THE DISCLOSURE

Field of the Disclosure

The present disclosure relates to wireless communication, and more particularly, to a method for transmitting a V2X message performed by a terminal in a wireless communication system and a terminal using the method.

Related Art

In International Telecommunication Union Radio communication sector (ITU-R), a standardization task for International Mobile Telecommunication (IMT)-Advanced, that is, the next-generation mobile communication system since the third generation, is in progress. IMT-Advanced sets its goal to support Internet Protocol (IP)-based multimedia services at a data transfer rate of 1 Gbps in the stop and slow-speed moving state and of 100 Mbps in the fast-speed moving state.

For example, $3^{rd}$ Generation Partnership Project (3GPP) is a system standard to satisfy the requirements of IMT-Advanced and is preparing for LTE-Advanced improved from Long Term Evolution (LTE) based on Orthogonal Frequency Division Multiple Access (OFDMA)/Single Carrier-Frequency Division Multiple Access (SC-FDMA) transmission schemes. LTE-Advanced is one of strong candidates for IMT-Advanced.

There is a growing interest in a Device-to-Device (D2D) technology in which devices perform direct communication. In particular, D2D has been in the spotlight as a communication technology for a public safety network. A commercial communication network is rapidly changing to LTE, but the current public safety network is basically based on the 2G technology in terms of a collision problem with existing communication standards and a cost. Such a technology gap and a need for improved services are leading to efforts to improve the public safety network.

The D2D communication described above may be extended and applied to signal transmission/reception between vehicles, and the communication related to a vehicle is referred to as VEHICLE-TO-EVERYTHING (V2X) communication, particularly. In the term V2X, the term 'X' may mean PEDESTRIAN, and in this case, V2X may be denoted as V2P. Likewise, the term 'X' may mean, INFRASTRUCTURE/NETWORK, and in this case, V2X may be denoted as V2I/N, and the like.

The (V2P communication related) device owned by a pedestrian (or a person) may be named as "P-UE", and the (V2X communication related) device installed on a VEHICLE may be named as "V-UE". In the present disclosure, the term 'ENTITY' may be interpreted to at least one of P-UE, V-UE and RSU (/NETWORK/INFRASTRUCTURE).

Meanwhile, in the conventional standard, in a V2X communication, a terminal measure physical sidelink shared channel-reference signal received power (PSSCH-RSRP), and in the case that the PSSCH-RSRP value is greater than a configured threshold value, the corresponding resource is excluded. In this case, the ration/number of remaining resources excluding the excluded resource becomes a predetermined value or smaller, the threshold value is increased, and the resource excluding process is performed based on the PSSCH-RSRP value again. Consequently, the ration/number of the remaining resources becomes greater than the predetermined value, among the remaining resources, a resource for V2X message transmission is selected. That is, the threshold value is increased for securing the number of candidate resources for V2X message transmission more than a predetermined amount, which is resulted in increasing a probability that a candidate resource of high interference is finally selected for V2X message transmission.

However, among the V2X messages, there may be a message which is sensitive in interference, not good for long delay time, should be good in service quality or transmitted preferentially. In such a V2X message transmission, there is a problem that indiscriminate application of such a method may degrade V2X transmission efficiency and make it difficult in satisfying the requirement which is required.

SUMMARY OF THE DISCLOSURE

Accordingly, an object of the present disclosure is to provide a method for transmitting a V2X message performed by a terminal in a wireless communication system and a terminal using the method.

In one aspect, provided is a method for transmitting a vehicle-to-everything (V2X) message by a user equipment (UE) in a wireless communication system. The method includes performing a candidate resource exclusion operation based on physical sidelink shared channel-reference signal received power (PSSCH-RSRP) threshold value in a selection window, determining whether a ratio of remaining candidate resources in the selection window is smaller than a configured threshold value, when the ratio is smaller than the configured threshold value, performing increase of the PSSCH-RSRP threshold value and the candidate resource exclusion operation based on the increased PSSCH-RSRP threshold value according to whether at least one of latency requirement and priority of the V2X message satisfies a predetermined condition, and transmitting the V2X message by using a selected resource among the candidates remained in the selection window.

When the V2X message does not satisfy the condition, the increase of the PSSCH-RSRP threshold value and the candidate resource exclusion operation based on the increased PSSCH-RSRP threshold value may be performed.

When the V2X message satisfies the condition, the increase of the PSSCH-RSRP threshold value and the candidate resource exclusion operation based on the increased PSSCH-RSRP threshold value may not be performed.

The condition may be that the latency requirement of the V2X message is shorter than a configured threshold value or that the priority of the V2X message is higher than a configured threshold value.

When the ratio is smaller than the threshold value and the V2X message satisfies the condition, the increase of the PSSCH-RSRP threshold value and the candidate resource exclusion operation based on the increased PSSCH-RSRP threshold value may be performed, but a ratio of the increase of the PSSCH-RSRP threshold value and the candidate resources that should be remained after performing the candidate resource exclusion operation based on the increased PSSCH-RSRP threshold value may be received from a base station.

When a time duration of the selection window is from a first timing to a second timing, one of a plurality of candidates may be selected for the second timing.

The plurality of candidates may be determined according to at least one of the latency requirement and the priority of the V2X message.

The first timing may be determined according to a processing time required for the UE to transmit the V2X message, and the second timing may be determined according to one of the latency requirement and the priority of the V2X message.

Scheduling assignment information may be received from another UE, and the PSSCH-RSRP may be measured using a demodulation reference signal (DMRS) in a physical sidelink shared channel (PSSCH) region scheduled by the scheduling assignment information.

The PSSCH region may be included in the selection window.

In another aspect, provided is a User Equipment (UE). The UE includes a transceiver for transmitting and receiving a radio signal and a processor operating with being combined with the transceiver. The processor is configured to: perform a candidate resource exclusion operation based on physical sidelink shared channel-reference signal received power (PSSCH-RSRP) threshold value in a selection window, determine whether a ratio of remaining candidate resources in the selection window is smaller than a configured threshold value, when the ratio is smaller than the configured threshold value, perform increase of the PSSCH-RSRP threshold value and the candidate resource exclusion operation based on the increased PSSCH-RSRP threshold value according to whether at least one of latency requirement and priority of the V2X message satisfies a predetermined condition, and transmit the V2X message by using a selected resource among the candidates remained in the selection window.

According to the present disclosure, in the case that a terminal satisfies a specific condition in a property of a V2X message, for example, latency requirement, priority, and the like, even in the case that a ration of remaining candidate resource after performing a candidate resource exclusion operation based on PSSCH-RSRP threshold value in a selection window is less than a configured value, the terminal may not re-perform the candidate resource exclusion operation based on increase of the PSSCH-RSRP threshold value or the increased PSSCH-RSRP threshold value. As a result, it may be alleviated/prevented a resource of high interference is finally selected for V2X message transmission.

DESCRIPTION OF EXEMPLARY EMBODIMENTS

Figure 1:
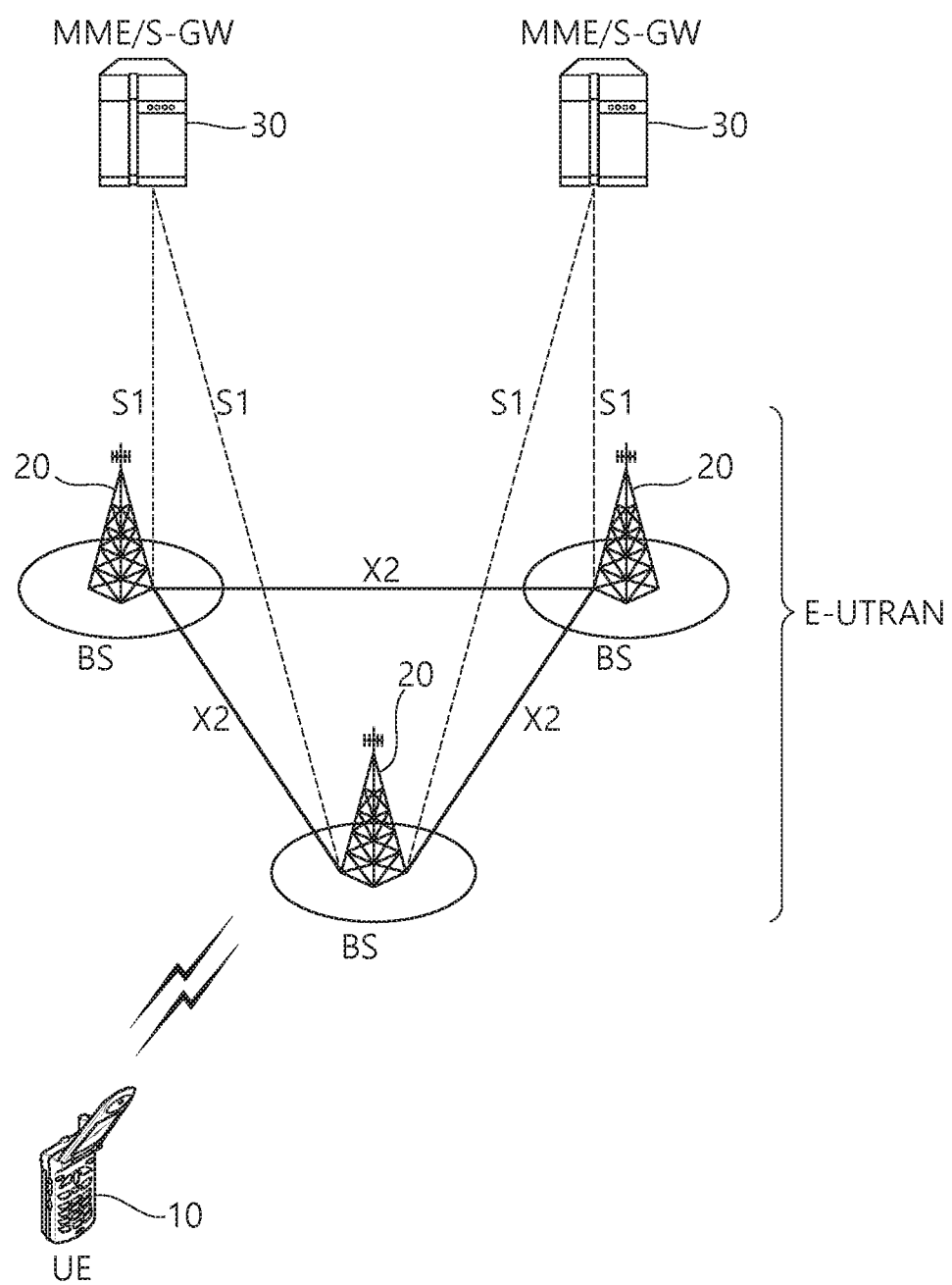
FIG. 1 illustrates a wireless communication system to which the present disclosure can be applied.

FIG. 1 illustrates a wireless communication system to which the present disclosure is applicable. This may also be called Evolved-UMTS Terrestrial Radio Access Network (E-UTRAN) or Long Term Evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

The user plane is a protocol stack for user data transmission. The control plane is a protocol stack for control signal transmission.

a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The D2D operation will now be described. In 3GPP LTE-A, the service related to D2D operation is called proximity based service (ProSe). Hereinafter, ProSe is equivalent to D2D operation and ProSe may be interchanged with D2D operation. ProSe will now be described.

The ProSe includes ProSe direction communication and ProSe direct discovery. The ProSe direct communication is communication performed between two or more proximate UEs. The UEs may perform communication by using a protocol of a user plane. A ProSe-enabled UE implies a UE supporting a procedure related to a requirement of the ProSe. Unless otherwise specified, the ProSe-enabled UE includes both of a public safety UE and a non-public safety UE. The public safety UE is a UE supporting both of a function specified for a public safety and a ProSe procedure, and the non-public safety UE is a UE supporting the ProSe procedure and not supporting the function specified for the public safety.

ProSe direct discovery is a process for discovering another ProSe-enabled UE adjacent to ProSe-enabled UE. In this case, only the capabilities of the two types of ProSe-enabled UE are used. EPC-level ProSe discovery means a process for determining, by an EPC, whether the two types of ProSe-enabled UE are in proximity and notifying the two types of ProSe-enabled UE of the proximity.

Hereinafter, for convenience, the ProSe direct communication may be referred to as D2D communication, and the ProSe direct discovery may be referred to as D2D discovery.

Figure 2:
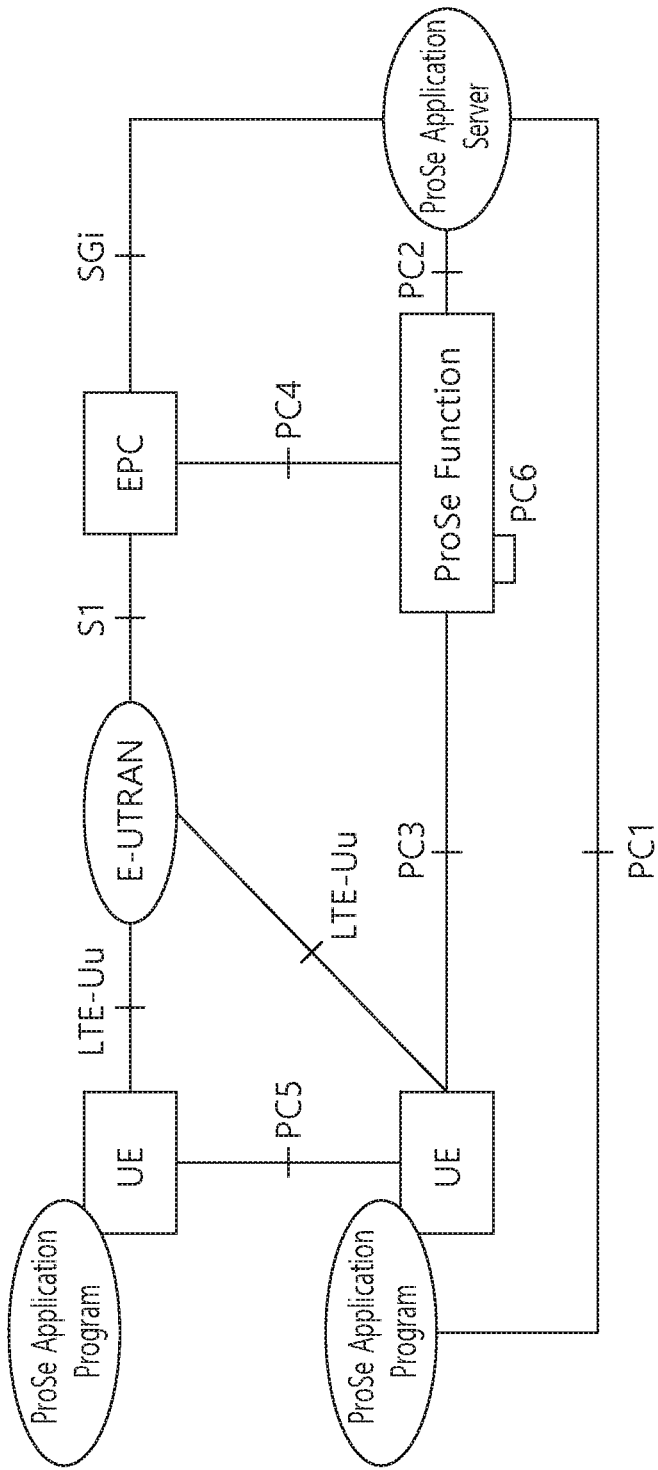
FIG. 2 shows a basic structure for ProSe.

FIG. 2 shows a basic structure for ProSe.

Referring to FIG. 2, the basic structure for ProSe includes an E-UTRAN, an EPC, a plurality of types of UE including a ProSe application program, a ProSe application server (a ProSe APP server), and a ProSe function.

The EPC represents an E-UTRAN core network configuration. The EPC may include an MME, an S-GW, a P-GW, a policy and charging rules function (PCRF), a home subscriber server (HSS) and so on.

The ProSe APP server is a user of a ProSe capability for producing an application function. The ProSe APP server may communicate with an application program within UE. The application program within UE may use a ProSe capability for producing an application function.

The ProSe function may include at least one of the followings, but is not necessarily limited thereto.

Interworking via a reference point toward the 3rd party applications

Authorization and configuration of UE for discovery and direct communication

Enable the functionality of EPC level ProSe discovery

ProSe related new subscriber data and handling of data storage, and also handling of the ProSe identities Security related functionality Provide control towards the EPC for policy related functionality Provide functionality for charging (via or outside of the EPC, e.g., offline charging)

A reference point and a reference interface in the basic structure for ProSe are described below.

PC1: a reference point between the ProSe application program within the UE and the ProSe application program within the ProSe APP server. This is used to define signaling requirements in an application dimension.

PC2: a reference point between the ProSe APP server and the ProSe function. This is used to define an interaction between the ProSe APP server and the ProSe function. The update of application data in the ProSe database of the ProSe function may be an example of the interaction.

PC3: a reference point between the UE and the ProSe function. This is used to define an interaction between the UE and the ProSe function. A configuration for ProSe discovery and communication may be an example of the interaction.

PC4: a reference point between the EPC and the ProSe function. This is used to define an interaction between the EPC and the ProSe function. The interaction may illustrate the time when a path for 1:1 communication between types of UE is set up or the time when ProSe service for real-time session management or mobility management is authenticated.

PC5: a reference point used for using control/user plane for discovery and communication, relay, and 1:1 communication between types of UE.

PC6: a reference point for using a function, such as ProSe discovery, between users belonging to different PLMNs.

SGi: this may be used to exchange application data and types of application dimension control information.

<ProSe Direct Communication: (D2D Communication)>

ProSe Direct Communication is a communication mode in which two public safety UEs may communicate directly through PC 5 interface. This communication mode may be supported in both of the case that a UE is served within the coverage of E-UTRAN or the case that a UE is out of coverage of E-UTRAN.

Figure 3:
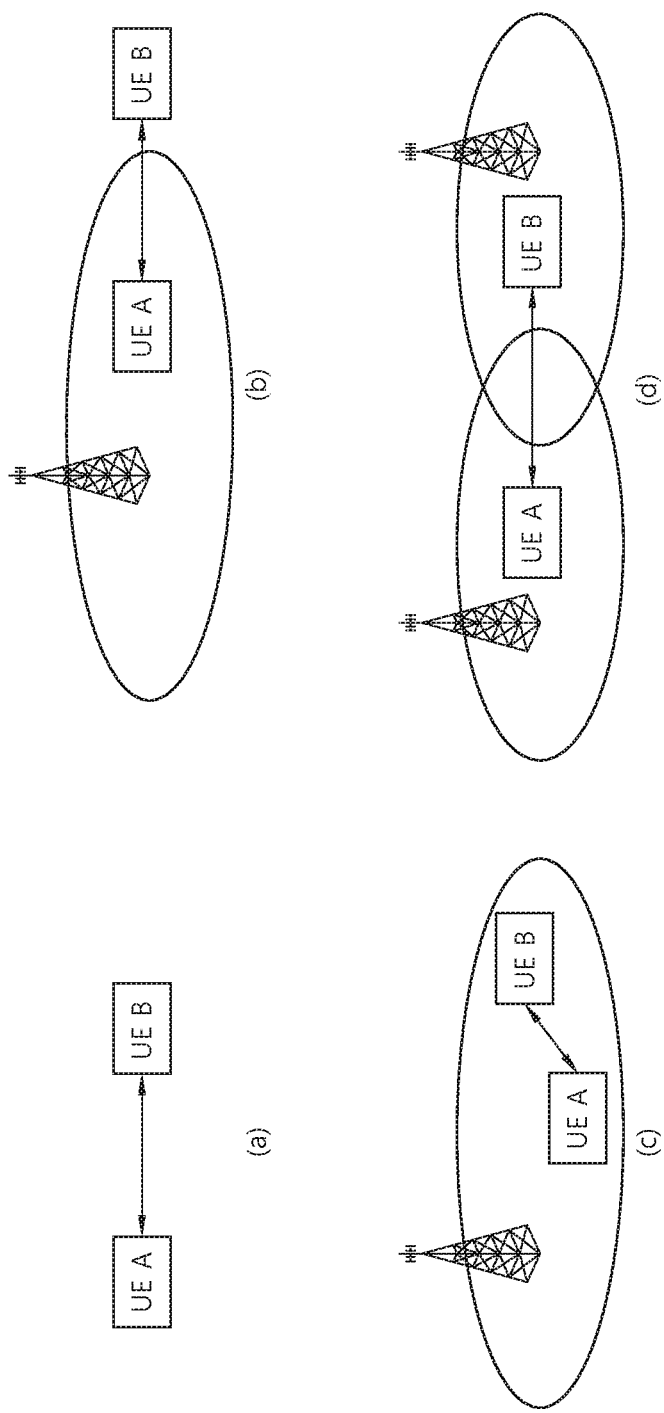
FIG. 3 shows the deployment examples of types of UE performing ProSe direct communication and cell coverage.

FIG. 3 illustrates deployment examples of UEs performing ProSe Direct Communication and cell coverage.

Referring to FIG. 3($a$), types of UE A and B may be placed outside cell coverage. Referring to FIG. 3($b$), UE A may be placed within cell coverage, and UE B may be placed outside cell coverage. Referring to FIG. 3($c$), types of UE A and B may be placed within single cell coverage. Referring to FIG. 3($d$), UE A may be placed within coverage of a first cell, and UE B may be placed within coverage of a second cell.

ProSe Direct Communication may be performed among UEs located in various positions as shown in FIG. 3.

Meanwhile, the following IDs may be used in ProSe Direct Communication.

Source layer-2 ID: This ID identifies a transmitter of a packet in PC 5 interface.

Object layer-2 ID: This ID identifies a target in a packet in PC 5 interface.

SA L1 ID: This ID is an ID in a scheduling assignment (SA) in PC 5 interface.

Figure 4:
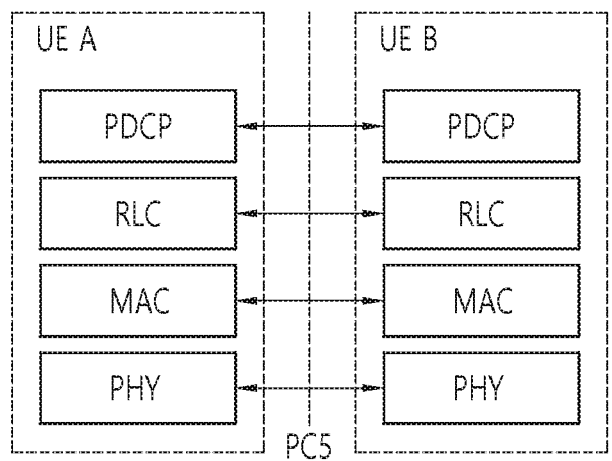
FIG. 4 illustrates a user plane protocol stack for ProSe Direct Communication.

FIG. 4 illustrates a user plane protocol stack for ProSe Direct Communication.

Referring to FIG. 4, PC 5 interface includes PDCH, RLC, MAC and PHY layers.

HARQ feedback may not be present in ProSe Direct Communication. MAC header may include Source layer-2 ID and Object layer-2 ID.

<Radio Resource Allocation for ProSe Direct Communication>

A ProSe-available UE may use the following two modes for a resource allocation for ProSe Direct Communication.

1. Mode 1

Mode 1 is mode in which resources for ProSe direct communication are scheduled by an eNB. UE needs to be in the RRC_CONNECTED state in order to send data in accordance with mode 1. The UE requests a transmission resource from an eNB. The eNB performs scheduling assignment and schedules resources for sending data. The UE may send a scheduling request to the eNB and send a ProSe Buffer Status Report (BSR). The eNB has data to be subjected to ProSe direct communication by the UE based on the ProSe BSR and determines that a resource for transmission is required.

2. Mode 2

Mode 2 is mode in which UE directly selects a resource. UE directly selects a resource for ProSe direct communication in a resource pool. The resource pool may be configured by a network or may have been previously determined.

Meanwhile, if UE has a serving cell, that is, if the UE is in the RRC_CONNECTED state with an eNB or is placed in a specific cell in the RRC_IDLE state, the UE is considered to be placed within coverage of the eNB.

If UE is placed outside coverage, only mode 2 may be applied. If the UE is placed within the coverage, the UE may use mode 1 or mode 2 depending on the configuration of an eNB.

If another exception condition is not present, only when an eNB performs a configuration, UE may change mode from mode 1 to mode 2 or from mode 2 to mode 1.

<ProSe Direct Discovery (D2D Discovery)>

ProSe direct discovery is referred to as a procedure used for a ProSe-available UE to discover another close ProSe-available UE and also referred to as D2D direct discovery or D2D discovery. In this case, E-UTRA wireless signal through PC 5 interface may be used. Hereinafter, information used for ProSe direct discovery is referred to as discovery information.

Figure 5:
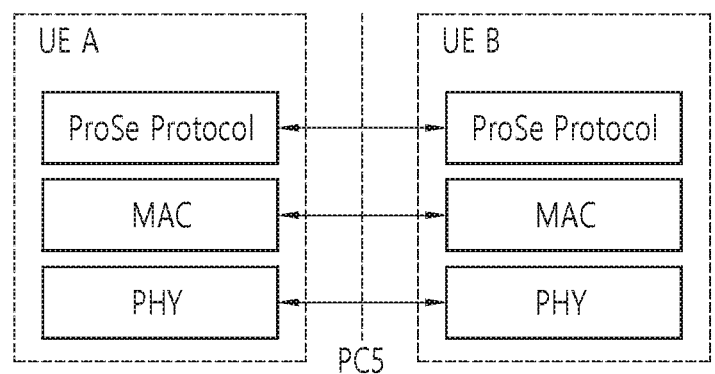
FIG. 5 illustrates PC 5 interface for D2D discovery.

FIG. 5 illustrates PC 5 interface for D2D discovery.

Referring to FIG. 5, PC 5 interface includes MAC layer, PHY layer and ProSe Protocol layer which is a higher layer. In the higher layer (ProSe Protocol), it is dealt announcement of discovery information (hereinafter, announcement) and grant for monitoring, and the content of discovery information is transparent for access stratum (AS). ProSe Protocol enables only valid discovery information to be delivered to AS for announcement.

The MAC layer receives discovery information from the higher layer (the ProSe Protocol). An IP layer is not used to send discovery information. The MAC layer determines a resource used to announce discovery information received from the higher layer. The MAC layer produces an MAC protocol data unit (PDU) for carrying discovery information and sends the MAC PDU to the physical layer. An MAC header is not added.

In order to announce discovery information, there are two types of resource assignment.

1. Type 1

The type 1 is a method for assigning a resource for announcing discovery information in a UE-not-specific manner. An eNB provides a resource pool configuration for discovery information announcement to types of UE. The configuration may be broadcasted through the SIB. The configuration may be provided through a UE-specific RRC message. Or the configuration may be broadcasted through other than the RRC message in other layer or may be provided by UE-specific signaling.

UE autonomously selects a resource from an indicated resource pool and announces discovery information using the selected resource. The UE may announce the discovery information through a randomly selected resource during each discovery period.

2. Type 2

The type 2 is a method for assigning a resource for announcing discovery information in a UE-specific manner. UE in the RRC_CONNECTED state may request a resource for discovery signal announcement from an eNB through an RRC signal. The eNB may announce a resource for discovery signal announcement through an RRC signal. A resource for discovery signal monitoring may be assigned within a resource pool configured for types of UE.

An eNB 1) may announce a type 1 resource pool for discovery signal announcement to UE in the RRC_IDLE state through the SIB. Types of UE whose ProSe direct discovery has been permitted use the type 1 resource pool for discovery information announcement in the RRC_IDLE state. Alternatively, the eNB 2) announces that the eNB supports ProSe direct discovery through the SIB, but may not provide a resource for discovery information announcement. In this case, UE needs to enter the RRC_CONNECTED state for discovery information announcement.

An eNB may configure that UE has to use a type 1 resource pool for discovery information announcement or has to use a type 2 resource through an RRC signal in relation to UE in the RRC_CONNECTED state.

<V2X (Vehicle-to-X) Communication>

As described above, D2D operation generally provides various advantages in that it supports signal transmission and reception between devices adjacent to each other. For example, a D2D UE may perform data communication with a high transmission rate and low latency. Also, D2D operation may disperse traffic concentrated at a base station, and if a UE performing a D2D operation acts as a relay, D2D operation may extend the coverage of the base station. As an extension of the D2D communication, vehicle-related communication including signal transmission and reception between vehicles is particularly called Vehicle-to-X (V2X) communication.

In one example, the 'X' in the V2X represents pedestrian (communication between a vehicle and a device carried by individual (for example, handheld UE carried by a pedestrian, cyclist, driver, or passenger), where, in this case, V2X may be expressed by V2P), vehicle (communication between vehicles, V2V), infrastructure/network (communication between a vehicle and a roadside unit (RSU)/network, where RSU is a transportation infrastructure entity, for example, an entity transmitting speed notifications implemented in an eNB or a stationary UE, V2I/N). Here, as an example, in the term VEHICLE-TO-X (V2X), the term 'X' means PEDESTRIAN (COMMUNICATION BETWEEN A VEHICLE AND A DEVICE CARRIED BY AN INDIVIDUAL (e.g., HANDHELD TERMINAL CARRIED BY A PEDESTRIAN, CYCLIST, DRIVER OR PASSENGER), at this time, V2X may be denoted as V2P), VEHICLE (COMMUNICATION BETWEEN VEHICLES) (V2V), INFRASTRUCTURE/NETWORK (COMMUNICATION BETWEEN A VEHICLE AND A ROADSIDE UNIT (RSU)/NETWORK (ex) RSU IS A TRANSPORTATION INFRASTRUCTURE ENTITY (ex) AN ENTITY TRANSMITTING SPEED NOTIFICATIONS) IMPLEMENTED IN AN eNB OR A STATIONARY UE)) (V2I/N), and the like. In addition, in one example, for the convenience of description of the proposed method, a (V2P communication-related) device carried by a pedestrian (or person) is called a "P-UE" while a (V2X communication-related) device installed in a vehicle is called a "V-UE". Also, in one example, the term 'entity' in this document may be interpreted as P-UE, V-UE or RSU (/network/infrastructure).

A V2X UE may perform message (or channel) transmission on a predefined (or signaled) resource pool. Here, a resource pool may refer to a predefined resource(s) which enables a UE to perform a V2X operation (or which is capable of performing a V2X operation). At this time, a resource pool may also be defined in terms of time-frequency aspect.

Meanwhile, various types of V2X transmission resource pools may be defined.

Figure 6:
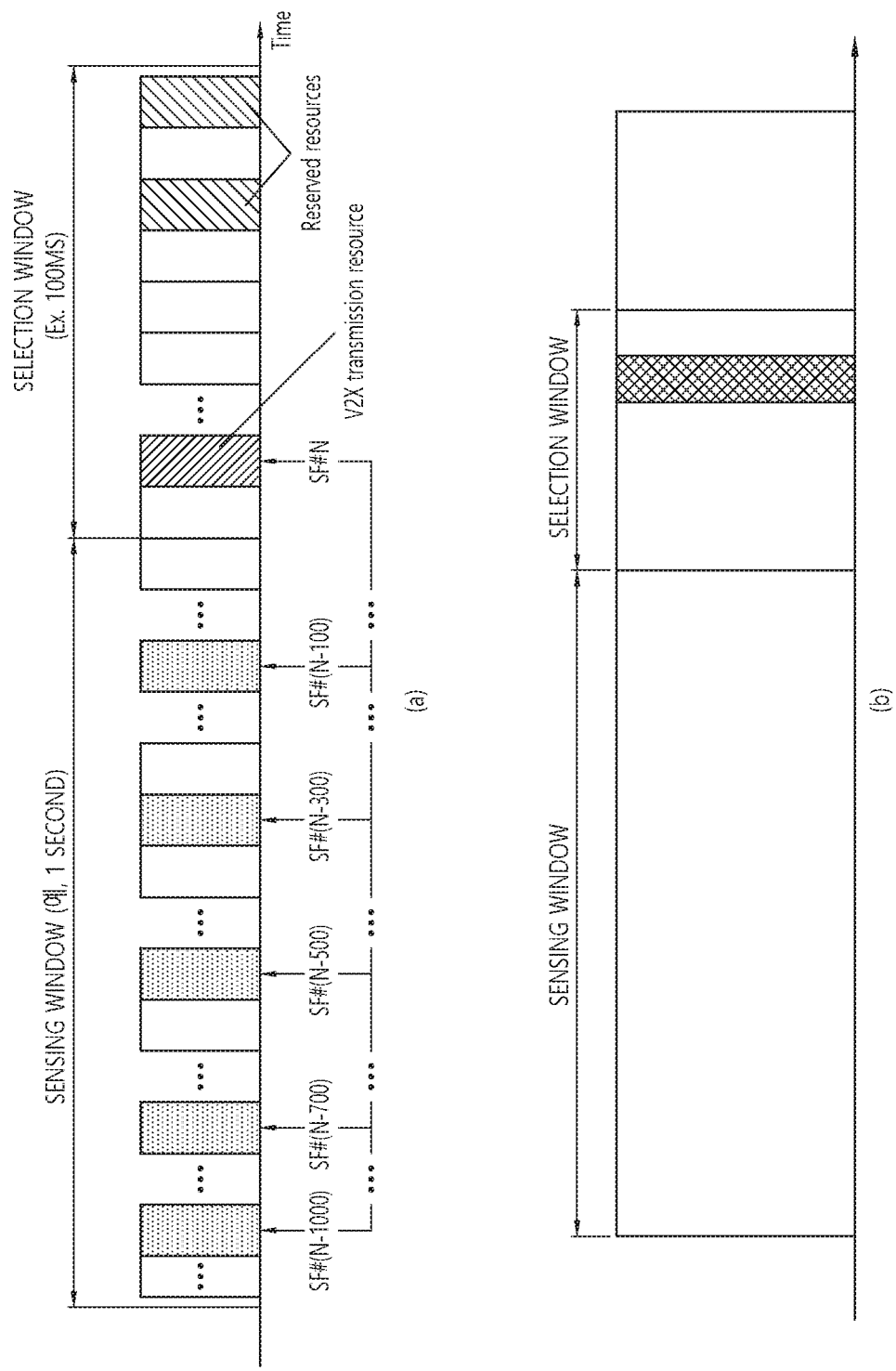
FIG. 6 illustrates types of V2X transmission resource pools.

FIG. 6 illustrates types of V2X transmission resource pools.

Referring to FIG. 6(a), V2X transmission resource pool #A may be a resource pool that allows (partial) sensing only. In the V2X transmission resource pool #A, a UE needs to select a V2X transmission resource after performing (partial) sensing, and random selection may not be allowed. As shown in FIG. 6(a), a V2X transmission resource selected by (partial) sensing is maintained semi-statically at predetermined intervals.

In order for a UE to perform V2X message transmission on the V2X transmission resource pool #A, a base station may configure a (scheduling assignment decoding/energy measurement-based) sensing operation to be performed (partially). This may be interpreted as not allowing 'random selection' of a transmission resource on the V2X transmission resource pool #A but may be interpreted as (allowing) performing (only) '(partial) sensing' based transmission resource selection. The configuration may be set by the base station.

Referring to FIG. 6(b), the V2X transmission resource pool #B may be a resource pool that allows random selection only. In the V2X transmission resource pool #B, a UE may not perform (partial) sensing but select a V2X transmission resource randomly from a selection window. In one example, different from a resource pool which allows (partial) sensing only, a resource pool which allows only random selection may set (or signaled) so that a selected resource may not be semi-statically reserved.

A base station may set not to perform a (scheduling assignment decoding/energy measurement-based) sensing operation so that a UE may perform a V2X message transmission operation on the V2X transmission resource pool #B. This may be interpreted as performing (/allowing) (only) 'random selection' of a transmission resource on the V2X transmission resource pool #B and/or not allowing '(partial) sensing'-based transmission resource selection.

Meanwhile, although not shown in FIG. 6, there may exist a resource pool which allows both (partial) sensing and random selection. A base station may inform (by the UE implementation) that in such a resource pool, either of the (partial) sensing and the random selection may be used to select a V2X resource.

Figure 7:
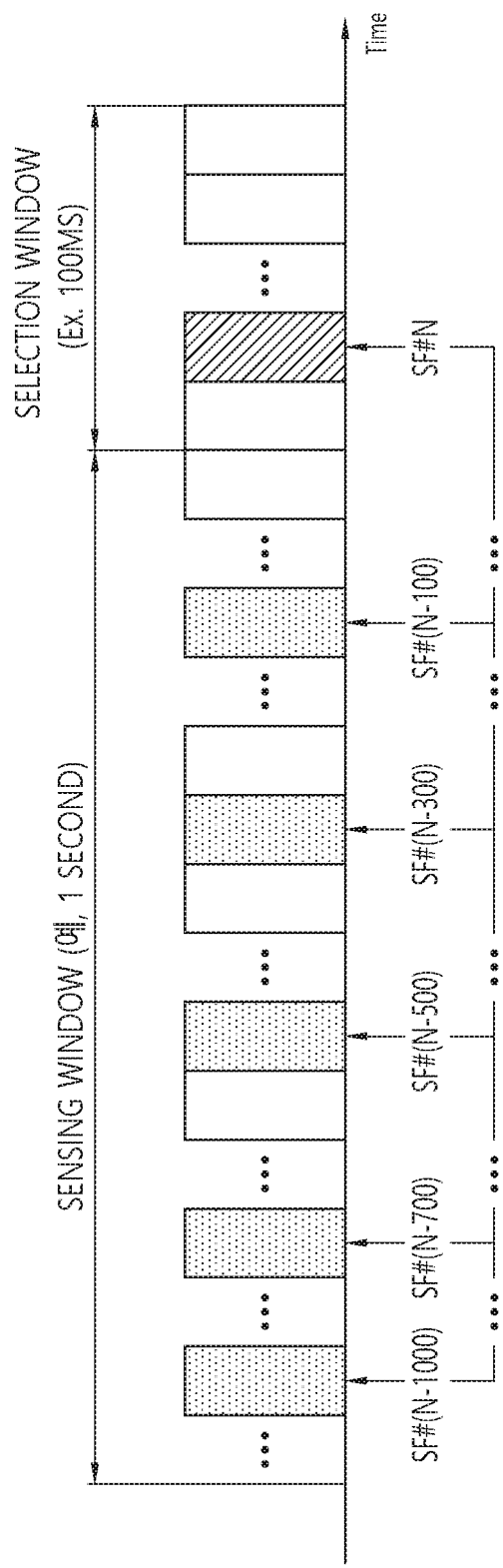
FIG. 7 illustrates a V2X transmission resource (re)selection (/reservation) method according to a partial sensing operation.

FIG. 7 illustrates a V2X transmission resource (re)selection (/reservation) method according to a partial sensing operation.

Referring to FIG. 7, a UE (which denotes a P-UE in what follows) may determine (or trigger) (re)selection (or reservation) of a resource for V2X signal transmission (depending on whether a predetermined condition is satisfied). For example, suppose the transmission resource (re)selection (or reservation) is determined or triggered at subframe #m. In this case, the UE may (re)select (or reserve) a resource for V2X signal transmission from within a subframe period ranging from the subframe #m+T1 to #m+T2. Hereinafter, the subframe period ranging from the subframe #m+T1 to #m+T2 is called a selection window. For example, a selection window may comprise 100 consecutive subframes.

A UE may select at least Y subframes within a selection window as candidate resources. In other words, a UE may have to consider at least Y subframes as candidate resources within the selection window. The Y value may be a predetermined value or may be determined by the network. It should be noted that how to select Y subframes within a selection window may be subject to issues of implementing a UE. In other words, suppose the Y value is 50. Then the UE may select which 50 subframes to select among 100 subframes comprising a selection window. For example, the UE may select 50 subframes whose subframe number is an odd number from among the 100 subframes. Likewise, the UE may select 50 subframes whose subframe number is an even number. Alternatively, 50 subframes may be selected by an arbitrary rule.

Meanwhile, in order to (re)select (or reserve) a specific subframe among the Y subframes, for example, subframe #N (SF #N) as a V2X transmission subframe capable of transmitting a V2X signal, the UE may have to be linked to the subframe #N or sense at least one associated subframe. The (whole) subframe period defined for sensing is called a sensing window, which may comprise 1000 subframes, for example. That is, a sensing window may span 1000 milliseconds or 1 second. For example, the UE may sense subframes corresponding to subframe #N−100*k (where k may be a set of elements in the range [1, 10] and may be preset or determined by the network) within the sensing window.

FIG. 7 illustrates a case in which k values are {1, 3, 5, 7, 10}. In other words, the UE may sense subframe #N−1000, #N−700, #N−500, #N−300, and #N−100, estimate/determine whether the subframe #N is used by other V2X UE (and/or whether relatively high interference (or interference larger than a preset (or signaled) threshold value) exists on the subframe #N), and (finally) select the subframe #N according to the result. Since a P-UE is more sensitive to battery consumption than a V-UE, not all the subframes within the sensing window are sensed but only part thereof is sensed, that is, partial sensing is performed.

As an example, in performing V2X communication, an example for (A) transport resource selection procedure (/method) based on sensing operation and/or (B) V2X resource pool configuration (/signaling) procedure (/method) may be described as below.

(A) For transport resource selection procedure (/method),

STEP 1: For PSSCH resource (re)selection, when all the PSCCH/PSSCH transmissions have the same priority, first, all the resources may be considered as selectable resources.

STEP 2: Meanwhile, a UE may exclude resources based on at least one of SA decoding and additional conditions.

UE excludes resources based on SA decoding and additional conditions, and then, selects V2X transport resource. At this time, in the case that scheduling assignment and its associated data are transmitted in same subframe, it is supported a method of excluding the resources based on DM-RS reception power of PSSCH. That is, a resource is excluded which is indicated or deferred (reserved) by a decoded scheduling assignment and of which PSSCH RSRP (reference signal received power) in the associated data resource is a threshold value or greater. Particularly, PSSCH-RSRP may be defined as the linear average over the power contributions of the resource elements (REs) that carry DM-RSs associated with PSSCH within physical resource blocks (PRBs) indicated by the associated PSCCH. PSSCH-RSRP may be measured on an antenna connector of a UE as a reference point. The scheduling assignment may include PPPP field of 3-bit.

The threshold value may be provided in a form of function with respect to priority information. For example, the threshold value may be dependent upon the priority information of a transport block and the priority information of decoded scheduling assignment. The threshold value may be given in a range between [−128 dBm] and [0 dBm] with the granularity of [2 dBm]. Total 64 threshold values may be preconfigured.

A UE may decode a scheduling assignment in subframe #m+c within the sensing period and assume that the same frequency resource is reserved by the scheduling assignment at subframe #m+d+P*i. As described above, P may be a value fixed to 100. i may be selected in the range [0, 1, . . . , 10], which may be configured by carrier-specific network or preconfigured. i=0 means no intention to defer (reserve) the frequency resource. i may be configured by 10-bit bitmap or configured with 4-bit field within the scheduling assignment.

In the case that a candidate semi-persistent resource X with the period of P*I collides with a resource Y, which is reserved by another UE's scheduling assignment and meets the condition of exclusion, then the UE may exclude candidate semi-persistent resource X. The I is a value of i which is signaled by the scheduling assignment.

In the case that the number of remaining resource is smaller than 20% of the total resources within the selection window after resources are excluded by the scheduling assignment, sensing procedure, and the like, the UE may perform the process of excluding resources again after all the threshold values are increased (e.g., by 3 dB), and this process may be performed until the number of remaining resource within the selection window becomes greater than 20% of the total resources. The total resources within the selection window means available candidate resources, which the UE needs to consider.

Meanwhile, in the process of selecting V2X transport resources after specific resource is excluded, when a counter reaches 0 value, the UE may maintain current resources with probability p and reset the counter. That is, a resource may be reselected with probability 1-p.

The carrier-specific parameter p may be preconfigured and may be configured in the range [0, 0.2, 0.4, 0.6, 0.8].

The UE measures and ranks the remaining PSSCH resources excluding a specific resource based on total received energy and selects a subset. The subset may be the set of candidate resources with the lowest total received energy. The size of the subset may be 20% of the total resources within the selection window.

The UE may randomly select one resource from the subset.

When a transport block is transmitted in one subframe, the UE may select M consecutive sub-channels, and an average of energy measured in each sub-channel may be an energy measurement value in each resource.

Meanwhile, when a TRANSMISSION BLOCK (TB) is transmitted in two subframes, the following resource selection may be supported.

First, one resource may be selected using the mechanism defined for the case where a TB is transmitted in one subframe.

In addition, another resource may be selected randomly under the following condition. The selected resource should not be in the same subframe as the first resource and should not be the subframe excluded in the resource selection. Further, the SCI should be able to indicate the time gap between the two selected resources.

In the case that no resource may meet the condition for the second resource selection, a TB may be transmitted only using the first resource.

STEP 3: A UE may select V2X transport resource among the resources which are not excluded.

(B) V2V resource pool configuration (/signaling) procedure (/method)

First, in the case that resources are configured such that SA and data are always transmitted in the same subframe, UE is not expected to combine PSCCH transmitted in different subframes.

In a pool is configured such that a UE always transmits SA and data in adjacent RBs in the same subframe, a sub-channel with the lowest index among those selected for data transmission may be used for SA transmission.

When a pool is configured such that a UE can transmit SA and data in non-adjacent RBs in the same subframe, the number of SA candidate resources in a SA pool may be the same as the number of sub-channels in the associated data pool. The SA resource associated with the lowest index among those selected for data transmission may be used for SA transmission.

A UE may make resource selection/reselection decision at TTI m (>=n). Here, TTI m may mean a reception time of a corresponding TB.

For resource reselection, the UE needs to consider available candidate resources in the interval [m+T1, m+T2]. Here, T1 may be up to UE implementation, and T1<=[4]. Furthermore, T2 may also be up to UE implementation, 20<=T2<=100. Here, Selection of T2 needs to fulfill the latency requirement.

In addition, the sensing window may be changed to [m-a, m-b] (where, a=b+1000 and b=1).

When a pool is configured such that a UE always transmits SA and data in adjacent RBs in the same subframe, the resource pool includes one or multiple sub-channels in a frequency domain. Here, a sub-channel may include a group of contiguous RBs in a same subframe. Furthermore, the sub-channel size in a resource pool may be configured by a base station or preconfigured. Here, the candidate size of a sub-channel may mean {5, 6, 10, 15, 20, 25, 50, 75, 100}.

When a pool is configured such that a UE always transmits SA and data in non-adjacent RBs in the same subframe, the resource pool includes one or multiple sub-channels in a frequency domain. Here, a sub-channel may include a group of contiguous RBs in a same subframe. Furthermore, the sub-channel size in a resource pool may be configured by a base station or preconfigured. Here, the number of sub-channels may be 20 to the maximum, and a minimum candidate size may not have a value less than 4.

The UE may always select an integer number of adjacent sub-channels for transmission, and the UE may not decode more than [100] RBs in a subframe. Furthermore, the UE may not decode more than [10] PSCCHs in a subframe.

A SA pool and the associated data pool may overlap. In addition, a SA pool and a non-associated data pool may overlap.

When a pool is configured such that a UE always transmits SA and data in adjacent RBs in the same subframe, a resource pool may include N contiguous PRBs in a frequency domain. Here, N may be equal to (the sub-channel size*the number of sub-channels).

A V2V pool may be defined by a repeating bitmap mapped to all subframes except for SLSS subframes which are skipped. Here, the bitmap length may be 16, 20, or 100. Here, the bitmap may mean to define which subframes are allowed for V2V SA/data transmission and/or reception for a pool.

Meanwhile, once resource reselection is triggered, a UE may reselect resources for all the transmissions corresponding to a TB. Here, SA may schedule a transmission corresponding to one TB. In addition, a UE may apply PSSCH-RSRP measured a TTI that occurs before the reception of a successfully decoded associated SA. Here, the number of transmissions of a TB may be 1 or 2. Additionally, each SA may indicate the time/frequency resources of all the data transmissions corresponding to the same TB.

Hereinafter, the present disclosure is described.

The following proposed schemes propose (A) a method of defining a BOUNDARY of a time domain when a sensing operation is performed and/or (B) a method of efficiently supporting a retransmission (RE-TX) of V2X MESSAGE (S) which is omitted (/stopped) by performing a sensing operation, when V2X UE(S) (re)reserves (/selects) resource(s) related to its own V2X MESSAGE transmission (TX), based on "SENSING operation". Here, as an example, in the present disclosure, "SENSING" wording may be interpreted as RSRP measurement for (preconfigured (/signaled) REFERENCE SIGNAL (RS) (e.g., S-RSRP) operation and/or energy measurement (e.g., S-RSSI) operation (on PSSCH scheduled by a PSCCH successfully decodes) or a decoding operation for preconfigured (/signaled) channel (e.g., PHYSICAL SIDELINK CONTROL CHANNEL (PSCCH)). Here, as an example, in the present disclosure, "DURATION" (and/or "PERIOD") wording may be extendedly interpreted as "RANGE (/WINDOW)" (and/or "SCOPE").

[Proposed rule #1] A BOUNDARY (/POSITION) of a time domain (/period) in which sensing operation is performed (for each V2X UE(S)) may have a form (/property) of "UE-SPECIFIC ((TIME) BOUNDARY)". Here, as an example, a BOUNDARY (/POSITION) of a time domain (/period) in which (resource (re)reservation (/selection) related) sensing operation is performed of a specific V2X UE may be defined as "V2X MESSAGE TX TIME (SF #K)" (of the corresponding V2X UE). When this rule is applied, for example, on "a resource duration from (here, for example, SF #(K−D) to SF #K (or from SF #(K−1−D) to SF #(K−1) (here, for example, "D" means a 'SENSING DURATION' which is preconfigured (/signaled)", after a V2X UE performs SENSING operation on remaining (resource) timings except (resource) timing when the V2X UE itself performs (actual) V2X MESSAGE TX operation, the V2X UE (re)reserves (/selects) its own V2X MESSAGE TX related resource(s) thereafter. Here, as another example, the V2X UE may omit (/stop) its own (V2X MESSAGE) (the last) transmission on "SF #K" (when it is required) (according to a predefined rule), and perform an optimal re-reservation (/selection) resource decision (and/or (V2X MESSAGE) transmission immediately based on re-reserved (/selected) resource by sensing (/measuring) up to resource (SF #K) which has been used by the V2X UE (and/or reserved (/selected) in advance). Here, as another example, the V2X UE that performs the SENSING operation on the resource duration may perform (re-)reservation (/selection) of the resource (based on the sensing result) on "a resource duration from (here, for example, SF #(K+1) to SF #(K+1+R) (or from SF #K to SF #(K+R) (here, for example, "R" means a 'TX RESOURCE (RE)SELECTION DURATION' which is preconfigured (/signaled)"

Hereinafter, for the convenience of understanding, with reference to drawings, it is described the fact that a BOUNDARY of a time domain when the sensing operation is performed (for each V2X UE(S)) in proposed rule #1 is the form (/property) of "UE-SPECIFIC (TIME) BOUNDARY" as below.

Figure 8:
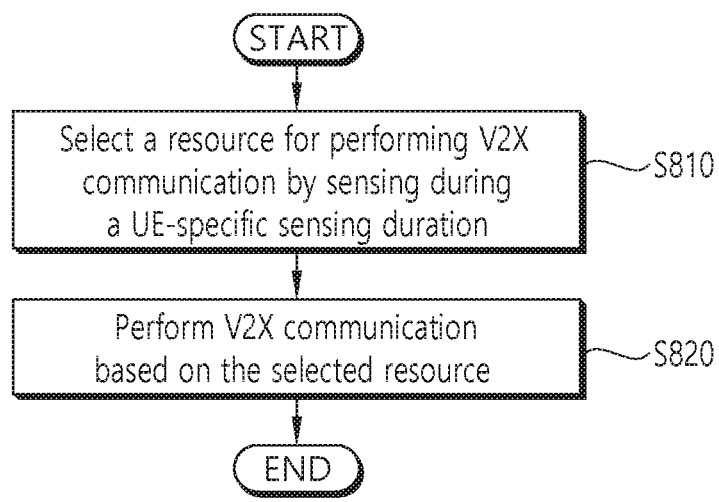
FIG. 8 is a flowchart for a method for performing V2X communication based on a UE-specific sensing duration according to an embodiment of the present disclosure.

FIG. 8 is a flowchart for a method for performing V2X communication based on a UE-specific sensing duration according to an embodiment of the present disclosure.

Referring to FIG. 8, a UE may select a resource for performing V2X communication by sensing during a UE-specific sensing duration (step, S810). Here, the fact that a UE selects a resource for performing V2X communication by sensing during a specific duration (i.e., UE-specific sensing duration (or UE-specific sensing window)) may be described based on (A) the aspect that the duration (i.e., sensing window) during which the UE performs sensing is UE-specific and (B) the aspect that the duration during which the UE performs sensing is 1 second (i.e., duration corresponding to 1000 subframes, each subframe is duration of 1 MS), and the 1 second corresponds to maximum SPS PERIOD (or maximum resource reservation (available) period) length (i.e., [N−1000, N−1]).

(A) First, it is mainly described the aspect that the duration (i.e., sensing window) during which the UE performs sensing is UE-specific as below.

As described above, a UE may select a resource for performing V2X communication by performing sensing, and here, the duration during which the UE performs sensing may have a sensing duration (i.e., UE-specific sensing duration) which is different for each UE. Here, the fact of having a sensing duration different for each UE may mean that a position of sensing duration (i.e., sensing window) is different for each UE, not that the sensing time itself is different for each UE.

That is, a BOUNDARY of a time domain when a sensing operation is performed (for each V2X UE(S)) may have form (/property) of "UE-SPECIFIC (TIME) BOUNDARY". In other words, this means that ENERGY MEASUREMENT WINDOW is UE-SPECIFIC (i.e., for "[N–A, N–B]" energy sensing (/measurement) duration, N value is UE-SPECIFIC), and this is described with reference to a drawing as below.

Figure 9:
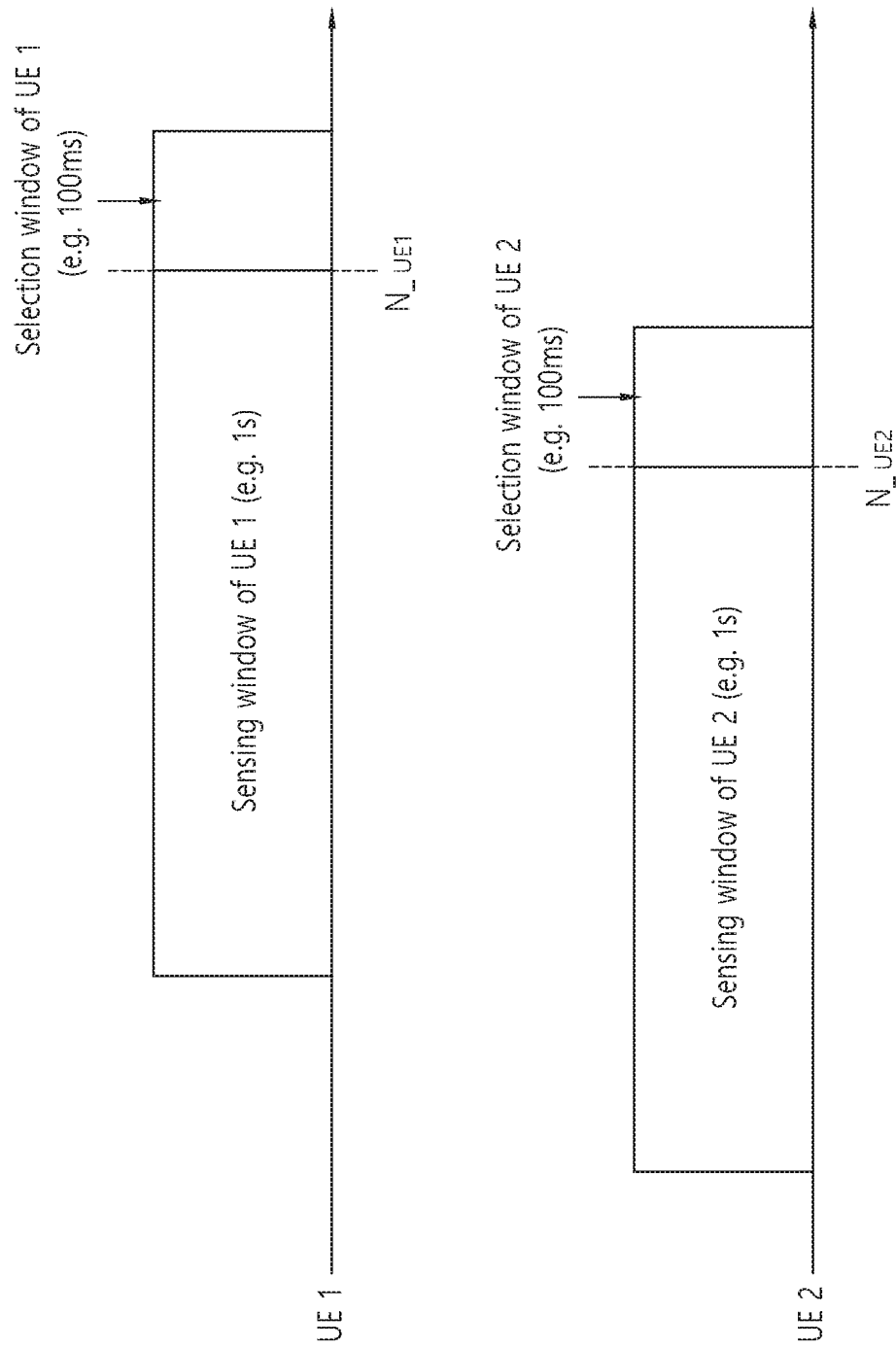
FIG. 9 illustrates a schematic example of UE-SPECIFIC sensing window.

FIG. 9 illustrates a schematic example of UE-SPECIFIC sensing window.

Referring to FIG. 9, each of UEs, that is, 'UE 1' and 'UE 2' may have respective sensing window in different times, and a sensing window for each UE may be existed in different time.

More particularly, in the case that a request from a higher layer of a UE is generated in a specific subframe (hereinafter, subframe N), the UE may determine a set of resources to be transmitted to a higher layer with respect to V2X MESSAGE transmission (e.g., PSSCH transmission).

Later, the UE monitors during a specific sensing duration (e.g., up to subframe N–1000, N–999, N–998, ..., N–1) (except subframes in which a transmission by the UE is generated). Here, the fact that the UE performs monitoring a specific sensing duration (e.g., up to subframe N–1000, N–999, N–998, ..., N–1) based on subframe N determined by a higher layer of the UE itself means that a sensing window which is a duration for the UE to perform monitoring is determined by each of the UEs.

In describing based on the example of FIG. 9, UE 1 may assume that a request is generated from a higher layer of UE 1 in $N_{UE1}$. In this case, the sensing duration (i.e., sensing window) in UE 1 may mean up to subframes $N_{UE1}$–1000, $N_{UE1}$–999, ..., $N_{UE1}$–1, and the sensing window in this case is specific for UE 1 as shown in FIG. 9. Likewise, UE 2 may assume that a request is generated from a higher layer of UE 2 in $N_{UE2}$. In this case, the sensing duration (i.e., sensing window) in UE 2 may mean up to subframes $N_{UE2}$–1000, $N_{UE2}$–999, ..., $N_{UE2}$–1, and the sensing window in this case is specific for UE 2 as shown in FIG. 9.

Next, the UE may select a resource to perform V2X communication based on measured S-RSSI and decoded PSCCH within the subframe, that is, subframe N–1000, N–999, N–998, ..., N–1). Here, a particular example for the UE to select a resource to perform V2X communication is as described above.

(B) it is mainly described the aspect that the duration during which the UE performs sensing is 1 second (i.e., duration corresponding to 1000 subframes), and the 1 second corresponds to maximum SPS (SEMI-PERSISTENT SCHEDULING) PERIOD (or maximum resource reservation (available) period) length (i.e., [N–1000, N–1]) as below.

As an example, in the case that a V2X UE uses the sensing result obtained by monitoring 'SF #(N–A), SF #(N–A+1), ..., SF #(N–B) (or SC PERIOD #(N–A), SC PERIOD #(N–A+1), ..., SC PERIOD #(N–B)) (A≥B (e.g., 'B' value may be a positive integer greater than '0' considering a processing time for resource (re)selection)' duration for 'SF #N' (or in 'SC PERIOD #N') (V2X MESSAGE TX related) resource (re)reservation (/selection) in which (re) reservation (/selection) is triggered, "MONITORING WINDOW SIZE (i.e., '(A–B)')" may be tuned in the maximum value of a time when (re)reservation (/selection) is occurred (e.g., this may be interpreted as a spacing (/INTERVAL) of reservation resource). Here, for example, the V2X UE select its own transport resource on a duration of 'SF #(N+C), SF #(N+C+1), ..., SF #(N+D) (or SC PERIOD #(N+C), SC PERIOD #(N+C+1), ..., SC PERIOD #(N+D)) (D≥C (e.g., 'C' value may be a positive integer greater than '0' considering a processing time for PSCCH/PSSCH generation))'. As a particular example, in the case that the V2X UE (re)reserves (/selects) a resource once per '500 millisecond (MS), (considering '100 MS' which is a time length (/LATENCY REQUIREMENT) of transport resource) '(A–B)' may be interpreted as a remaining value excluding '400 MS' (here, for example, '400 MS' is one 'SC PERIOD (100 MS)' (/LATENCY REQUIREMENT) which is predefined (/signaled)). In addition, for example, the corresponding '400 MS' may be interpreted as a duration 'from 'SF #(N–500 MS)' to 'SF #(N–100 MS)'. In other words, 'SENSING DURATION' (or '(A–B)') may be a function of 'resource (re)reservation (/selection) period' which is predefined (/configured) (or may be interpreted as performing 'SENSING operation' during a time induced from 'resource (re) reservation (/selection) period'). In summary, as an example, since the same resource may be selected (/used) until 'resource re-reservation (/selection)', there is a meaning of sensing previous resource just before 'resource (re)reservation (/selection)' resource, but it is not required to sense that of before the time when 'resource (re)reservation (/selection)' is necessarily occurred. Here, as an example, such a rule may be particularly used for the case that SA/DATA (POOL) is implemented with 'TDM structure'.

As another example, it is assumed the situation that a V2X UE performs 'SA (/PSCCH)' transmission related to inter-linked 'DATA (/PSSCH)' transmission on 'SF #(N+D) 'in'SF #(N+C)' (e.g., 'D≥C'). Here, as an example, 'SF #N' may be assumed (/interpreted) as a time when 'RESOURCE (RE)SELECTION' operation is performed (according to predefined rule (/signaling)) and/or a duration from 'SF #(N–A)' to 'SF #(N–B)' (e.g., 'A>B>0') is '(SA (/PSCCH) (SF #(N+C)') and/or interpreted as an area in which a sensing result referred when DATA (/PSSCH) ('SF #(N+D) ')) RESOURCE (RE)SELECTION' is performed is derived (or sensing is performed). Here, as an example, in 'SF #(N+D)' when performing another 'TB' related 'POTENTIAL DATA (/PSSCH)' transmission is performed on 'SF #(N+E)' (e.g., 'D<E'), an 'intention' to reuse '(frequency) resource' (used for 'DATA (/PSSCH)' transmission on 'SF #(N+D)' may be informed through (predefined (/signaled) a channel (e.g., '(SA (/PSCCH)' ('SF #(N+C)') (or 'DATA (/PSSCH)')). Here, as an example, on the '(SA(/PSCCH)' ('SF #(N+C)') used for the corresponding use, (additionally) a field in which '(E–C)' value (or '(E–D)' value or 'E' value) is transmitted may be (newly) defined. Here, as an example, '(E–C)' value (E_CGAP) (or '(E–D)' value (E_DGAP)) (or 'E' value (E_GAP)) may be interpreted as an interval between 'SA (/PSCCH)' ('SF #(N+C)') transmission time and 'NEXT TB' related (POTENTIAL) DATA (/PSSCH)' transmission time (or an interval between 'DATA (/PSSCH)' transmission time scheduled from 'SA (/PSCCH)' ('SF #(N+C)') and (POTENTIAL) DATA (/PSSCH) transmission time related to 'NEXT TB'. Here, as an example, 'SENSING WINDOW SIZE' (e.g., '(B–A)') of a V2X UE may be determined (/configured) according to the following (a part of) rule. Here, as an example, 'E_CGAP' (or E_DGAP or E_GAP) related (maximum (/minimum)) value may be configured (/signaled) as 'SINGLE VALUE' or 'MULTIPLE VALUE(S)' (in 'UE-COMMON' or 'UE-SPECIFIC' manner) (from a network (or (serving) base station)) or a V2X UE may regard (/assume) as the same as its own (maximum (/minimum) 'MESSAGE GENERATION (/TX) PERIODICITY'.

(Rule #A) A 'SENSING WINDOW SIZE' may be regarded (/determined) as (A) 'E_CGAP' (or E_DGAP or E_GAP) related (maximum (/minimum)) value and/or (B) (maximum (/minimum) 'MESSAGE GENERATION (/TX) PERIODICITY' value. As another example, without regard to (A) 'E_CGAP' (or E_DGAP or E_GAP) related (maximum (/minimum)) value and/or (B) (maximum (/minimum) 'MESSAGE GENERATION (/TX) PERIODICITY' value, the 'SENSING WINDOW SIZE' may be configured as preconfigured (/signaled) (specific) value. Here, as an example, when this rule is applied, even in the case that a V2X UE performs 'V2X MESSAGE' transmission of (relatively) long 'MESSAGE GENERATION(/TX) PERIODICITY', the V2X UE may perform a sensing operation with the 'SENSING WINDOW SIZE' of (preconfigured (/signaled)) (relatively) small value (e.g., this may be interpreted as a kind of 'PARTIAL (/LIMITED) REGION SENSING'). As an example, in the (rule #A), the 'SENSING WINDOW SIZE' may be configured in 'UE-COMMON' (or 'UE-SPECIFIC') manner.

(Rule #B) A 'SENSING WINDOW SIZE' may be regarded (/determined) as '(V2X) SPS PERIODICITY' value which is preconfigured (/signaled). Here, as an example (for the case that the rule is applied), in the case that 'SPS PERIODICITY' is configured (/signaled) as different multiple 'SPS CONFIGURATIONS (/PROCESSES)', it may be interpreted (/regarded) that the 'SENSING WINDOW SIZE' may be different for each 'SPS CONFIGURATION (/PROCESS)'. As another example, in the case that multiple 'SPS CONFIGURATIONS (/PROCESSES)' of different '(V2X) SPS PERIODICITY' is configured (/signaled/ allowed), '(COMMON) SENSING WINDOW SIZE' may be determined (/derived) as a maximum (/minimum) value among the corresponding '(V2X) SPS PERIODICITIES' and may be commonly applied on multiple 'SPS CONFIGURATION (/PROCESS/(transmission) operations)'. As an example, in (rule #B), the 'SENSING WINDOW SIZE' may be configured in 'UE-SPECIFIC' (or 'UE-COMMON') manner.

Here, SPS PERIOD may be determined like a resource reservation field in Sidelink Control Information (SCI) format 1, as represented in Table 1 below.

TABLE 1

| Resource reservation field in SCI format 1 | Indicated value X | Condition |
|---|---|---|
| '0001', '0010', . . . , '1010' | Number in decimal system corresponding to a field | When a higher layer decides to maintain a resource for transmission of next transport block and X value is 1 or more and 10 or less |
| '1011' | 0.5 | When a higher layer decides to maintain a resource for transmission of next transport block and X value is 0.5 |

TABLE 1-continued

| Resource reservation field in SCI format 1 | Indicated value X | Condition |
|---|---|---|
| '1100' | 0.2 | When a higher layer decides to maintain a resource for transmission of next transport block and X value is 0.2 |
| '0000' | 0 | When a higher layer decides not to maintain a resource for transmission of next transport block |
| '1101', '1110', '1111' | Reserved | — |

Here, a reception UE (RX UE) may identify a resource reservation period of a final transmission UE (TX UE) based on values which may be signaled in RESOURCE RESERVATION field on SCI FORMAT represented in Table 1.

Here, the RX UE may multiply a value of the RESOURCE RESERVATION field value by 100 and decide "RESOURCE RESERVATION PERIOD candidate value" configurable by the TX UE. For example, in the case that the RESOURCE RESERVATION field value is '0001', the RESOURCE RESERVATION PERIOD value may be 100 MS, and in the case that the RESOURCE RESERVATION field value is '0010', the RESOURCE RESERVATION PERIOD value may be 200 MS. Likewise, in the case that the RESOURCE RESERVATION field value is '1010', the RESOURCE RESERVATION PERIOD value may be 1000 MS.

In summary, the RX UE may know that the "RESOURCE RESERVATION PERIOD candidate value" configurable by the TX by multiplying a value of the RESOURCE RESERVATION field value by 100 are "20, 50, 100, 200, 300, 400, 500, 600, 700, 800, 900, 1000 MS", and accordingly, a maximum value of SPS PERIOD may have 1000 MS (i.e., 1 s).

As described above, the duration (i.e., sensing window of the UE) during with the UE performs sensing may have maximum SPS (SEMI-PERSISTENT SCHEDULING) PERIOD (or maximum resource reservation (available) period) length, and accordingly, the duration (i.e., sensing window of the UE) during with the UE performs sensing may have 1000 MS (i.e., 1 s), a maximum value of SPS PERIOD.

Referring to FIG. 8 again, the UE may perform V2X communication based on the selected resource (step, S820). As described above (or below), the UE may select a subframe within a selection window based on the sensing result performed during the UE-specific sensing duration, and the UE may determine transmission reservation resources based on the selected subframe and perform V2X communication based on the selected resource. Since the particular example that the UE performs V2X communication based on the selected resource is as described above (or below), the detailed description is omitted.

Meanwhile, in V2X communication, END TO END LATENCY should be considered. That is, when a UE transmits a packet generated in a higher layer, not only the time of sending down the packet generated in a higher layer to physical layer, but also the time of sending up the packet to a higher layer of the RX UE after receiving the packet. Accordingly, it is problematic a way of configuring a duration during which the UE selects a resource to perform V2X MESSAGE transmission, that is, a SELECTION WINDOW and selecting a transport resource. Hereinafter, a method of configuring a selection window is described with reference to a drawing.

Figure 10:
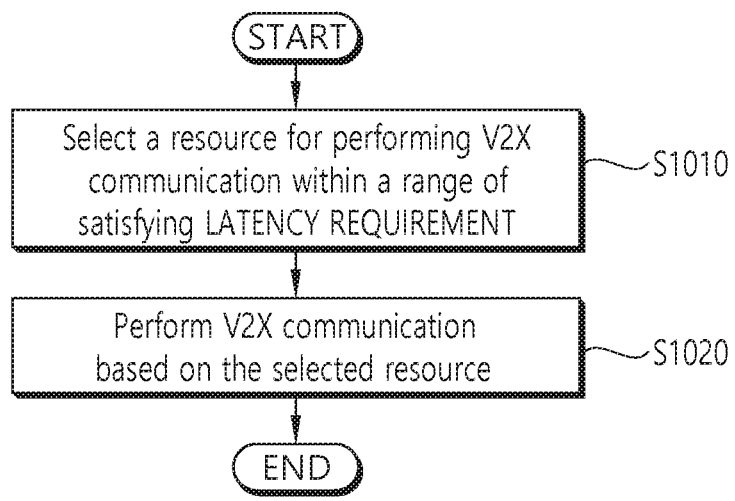
FIG. 10 is a flowchart for a method of configuring a selection window according to an embodiment of the present disclosure.

FIG. 10 is a flowchart for a method of configuring a selection window according to an embodiment of the present disclosure.

A UE may select a resource for performing V2X communication (or subframe, hereinafter, for the convenience of description, a resource and a subframe may be used in mixed manner) within a range of satisfying LATENCY REQUIREMENT (step, S1010). At this time, the UE may select the resource by configuring a SELECTION WINDOW within a range of satisfying LATENCY REQUIREMENT, and the V2X communication may be performed in a unit of multiple sub-channels, and based on sensing performed in a unit of sub-channel of a size corresponding to a size of the multiple sub-channels, a resource for performing the V2X communication may be selected. The sensing area used when the sensing is performed may be an area of a size corresponding to a size of the multiple sub-channels. Furthermore, the UE may also perform sensing using an energy measurement average value of the sub-channels included in the multiple sub-channels.

In summary, the UE may select the resource by configuring a SELECTION WINDOW within a range of satisfying LATENCY REQUIREMENT, and furthermore, the UE may perform sensing in a unit of multiple sub-channels when the V2X communication is performed a unit of multiple sub-channels. Here, in the case that the V2X communication is performed a unit of multiple sub-channels, a detailed example of performing sensing a unit of multiple sub-channels will be described below.

Hereinafter, it is mainly described an example that a UE selects a transport resource within a range of satisfying LATENCY REQUIREMENT.

A UE may select a transport resource (or subframe) within a range of satisfying LATENCY REQUIREMENT (after configuring a SELECTION WINDOW). Here, the UE may assume that a set of adjacent sub-channels (e.g., $L_{subCH}$) in a V2X resource pool (e.g., PSSCH resource pool) included within a specific duration (e.g., $[n+T_1, n+T_2]$) corresponds to one candidate subframe (resource). At this time, selection of information (e.g., $T_1$ and $T_2$) for determining the specific duration may follow a UE implementation. $T_1$ may have a value of 4 or less, and $T_2$ may have a value of 20 or more and 100 or less. Particularly, UE selection of $T_2$ needs to satisfy LATENCY REQUIREMENT.

For example, 'SENSING DURATION (D)' and/or 'TX RESOURCE (RE)SELECTION DURATION (R)' may be assumed to be the same (implicitly) as 'V2X MESSAGE GENERATION PERIOD' (and/or in the case that (a part of) different 'PPPP' value is configured (/allowed) for each of different V2X MESSAGE (/TB) of '(SERVICE) LATENCY REQUIREMENT') according to '(SERVICE) LATENCY REQUIREMENT') (and/or 'V2X MESSAGE GENERATION PERIOD' (and/or '(SERVICE) LATENCY REQUIREMENT' and/or '(V2X MESSAGE (/TB)) PPPP', and or assumed as a specific value which is predefined (/signaled) (e.g., the rule may be interpreted to be configured such that 'TX RESOURCE (RE)SELECTION DURATION (R)' satisfies '(SERVICE) LATENCY REQUIREMENT'). Here, as an example, (particularly, for latter case), 'SENSING DURATION (D)' and 'TX RESOURCE (RE)SELECTION DURATION (R)' may be configured (/regarded) as the same value (always) or defined as independent (or different) values. As another example, a BOUNDARY of a time domain when (resource (re)reservation (/selection) related) sensing operation of a specific V2X UE is performed may be defined as "V2X MESSAGE GENERATION TIME" (of the V2X UE). As another example, considering '(TX) PROCESSING TIME' (of the V2X UE), a timing to which a predefined (/signaled) uniform offset is added (or subtracted) to (from) the 'a BOUNDARY criterion of a time domain of a time domain when sensing operation is performed' (resource (re)reservation (/selection) related) sensing operation is performed described above (e.g., 'V2X MESSAGE TX TIME', 'V2X MESSAGE GENERATION TIME') may be final 'BOUNDARY criterion of a time domain when sensing operation is performed'. As a particular example, on "a resource duration from (here, for example, SF #(K–D–S) to SF #(K–S) (or from SF #(K–1–D-S) to SF #(K–1–S) (here, for example, "D" and "S" mean a 'SENSING DURATION' which is preconfigured (/signaled), '(TX) PROCESSING TIME' (of V2X UE)", after a V2X UE performs SENSING operation on remaining (resource) timings except (resource) timing when the V2X UE itself performs (actual) V2X MESSAGE TX operation, the V2X UE (re)reserves (/selects) its own V2X MESSAGE TX related resource(s) thereafter on the resource duration (from "SF #(K+1) to SF #(K+1+R) (or from SF #K to SF #(K+R)).

Later, the UE may perform V2X communication based on the selected resource (step, S1020). Here, as described above, the selected resource may mean a resource determined based on SELECTION WINDOW configured within a range of satisfying LATENCY REQUIREMENT (i.e., a resource on a selection window satisfying LATENCY REQUIREMENT). In addition, as described above (or below), the UE may select a subframe within a selection window based on the sensing result performed during the UE-specific sensing duration, and the UE may determine transmission reservation resources based on the selected subframe and perform V2X communication based on the selected resource. Since the particular example that the UE performs V2X communication based on the selected resource is as described above (or below), the detailed description is omitted.

Figure 11:
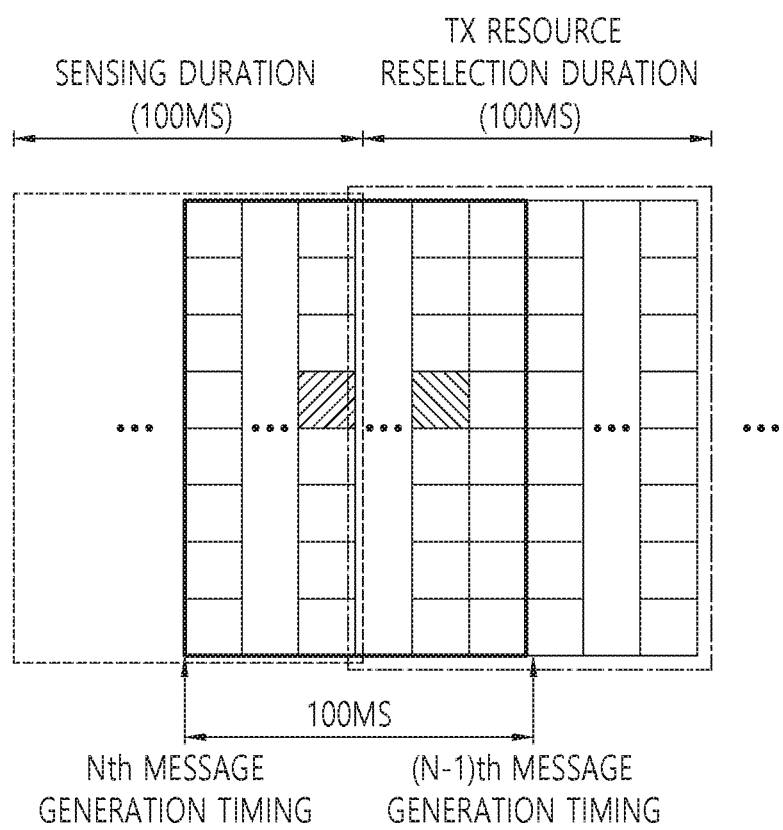
FIGS. 11 and 12 are schematic expression for [Proposed rule #1].
Figure 11:
Figure 11:
Figure 12:
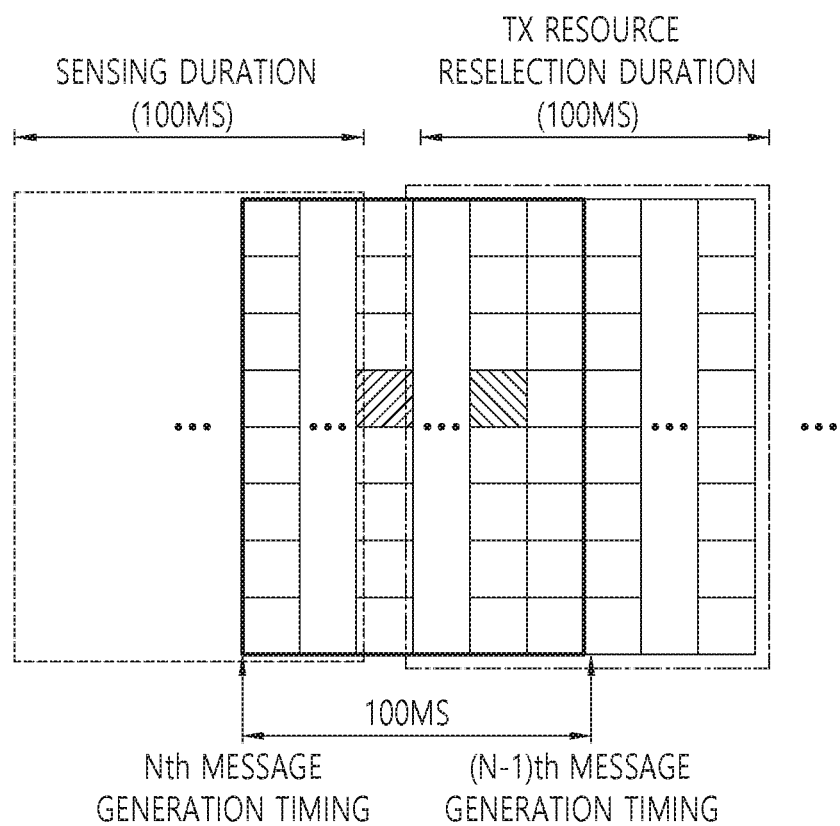

FIGS. 11 and 12 are schematic expression for [Proposed rule #1].

Referring to FIG. 11 and FIG. 12, here, as an example, it is assumed the situation that a V2X MESSAGE is generated periodically (for each V2X UE(S)) (e.g., '100 MS'). In addition, as an example, it is assumed the case that 'SENSING DURATION (/TX RESOURCE (RE)SELECTION DURATION)' and 'V2X MESSAGE TX related (REPETITION NUMBER)' are set to '100 MS' and '1', respectively. As an additional example, FIG. 11 shows the case that on "a resource duration from SF #(K–100) to SF #K", after the V2X UE itself performs a sensing operation on the remaining (resource) times except the (resource) time for performing (actual) V2X MESSAGE TX operation, the UE (re)reserves (/selects) its own V2X MESSAGE TX related resource(s) thereafter on the resource duration from "SF #(K+1) to SF #(K+101) based on the sensing result. As an example, in FIG. 11 and FIG. 12, '(N+1)$^{th}$ V2X MESSAGE transmission' is performed through reselection resource (e.g., SF #(K+Z+100)).

Figure 13:
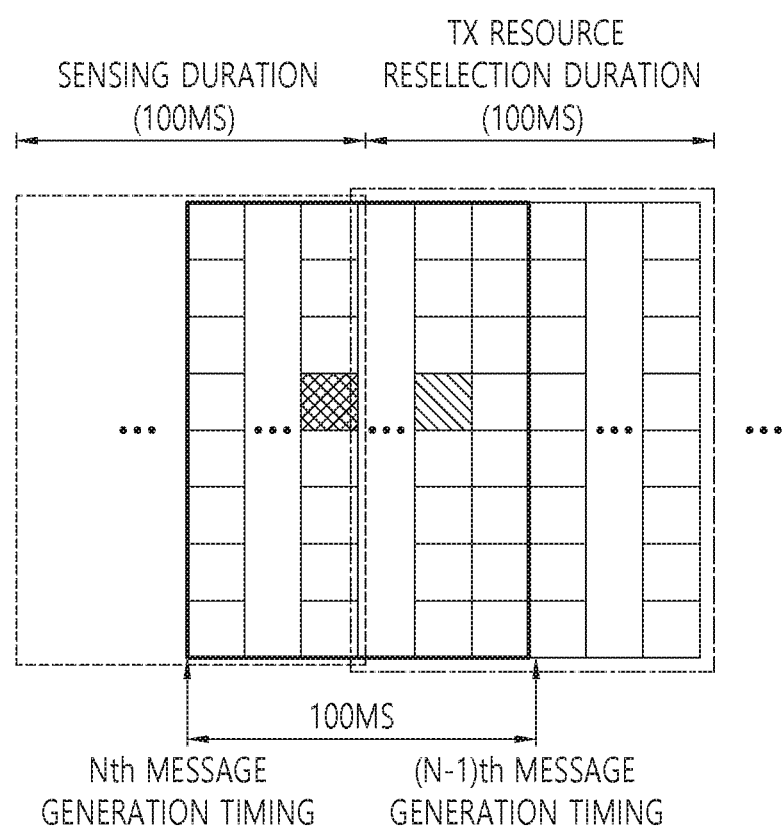
FIGS. 13 and 14 illustrates performing re-reservation (/selection) resource determination and (V2X MESSAGE) transmission immediately based on and the re-reserved (/selected) resource.
Figure 14:
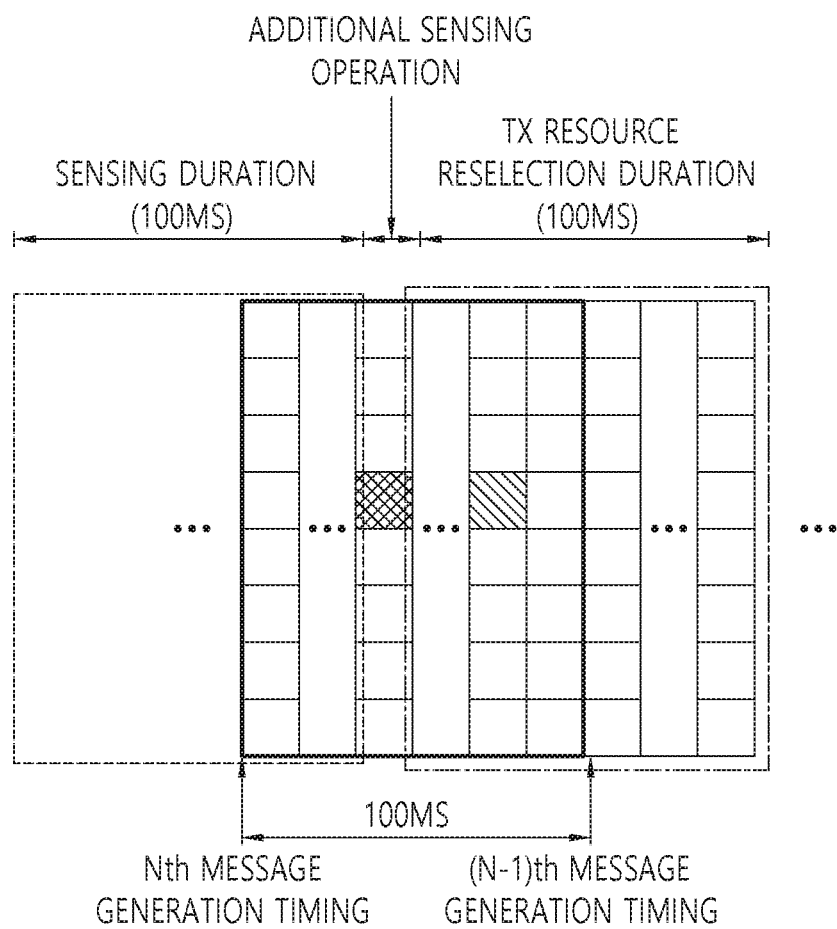

FIGS. 13 and 14 illustrates performing re-reservation (/selection) resource determination and (V2X MESSAGE) transmission immediately based on and the re-reserved (/selected) resource.

More particularly, FIG. 13 and FIG. 14, under the same situation of FIG. 11 and FIG. 12, respectively, shows the case that the V2X UE may omit (/stop) (V2X MESSAGE) transmission on "SF #K" (according to a predefined rule), and perform (V2X MESSAGE) transmission immediately based on an optimal re-reservation (/selection) resource decision and re-reserved (/selected) resource by sensing (/measuring) up to resource (SF #K) which has been used by the V2X UE (and/or reserved (/selected) in advance). Here, as an example, '(N+1)$^{th}$ V2X MESSAGE transmission' is performed through reselection resource (e.g., SF #(K+Z+ 100)).

[Proposed rule #2] For the purpose of sensing (/measuring) for a used (or previously reserved (/selected) resource (in [Proposed rule #1]), an omitted (/stopped) V2X MESSAGE transmission (e.g., 'N$^{th}$ V2X MESSAGE transmission, for the case of FIG. 13 and FIG. 14) may be retransmitted according to the following (a part of) rules.

(Example #2-1) (Without consideration for a retransmission of 'omitted (/stopped) V2X MESSAGE') after performing resource re-reservation (/selection) is performed according to 'sensing (/measurement) result' and 'predefined re-reservation (/selection) criterion (/rule)', in the case that '(SERVICE) LATENCY REQUIREMENT' is satisfied when the retransmission of 'omitted (/stopped) V2X MESSAGE' is performed through a reserved (/selected) resource, it may be defined that the retransmission of 'omitted (/stopped) V2X MESSAGE') is performed (immediately) (based on the corresponding reserved (/selected) resource. Here, as an example, on the other hand, in the case that '(SERVICE) LATENCY REQUIREMENT' is not satisfied when the retransmission of 'omitted (/stopped) V2X MESSAGE' is performed through a reserved (/selected) resource, it may be defined that the retransmission of 'omitted (/stopped) V2X MESSAGE' is not performed (based on the corresponding reserved (/selected) resource. As a particular example, in the case of FIG. 13 and FIG. 14, when the retransmission of 'omitted (/stopped) V2X MESSAGE' (SF #K)' is performed through the reserved (/selected) resource (SF #(K+Z), since '(SERVICE) LATENCY REQUIREMENT (100 MS)' cannot be satisfied, the retransmission of 'omitted (/stopped) V2X MESSAGE' is performed immediately (through reserved (/selected) resource (SF #(K+Z)).

(Example #2-2) For a V2X UE, considering only the 'candidate resources' of which retransmission of 'omitted (/stopped) V2X MESSAGE' may satisfy '(SERVICE) LATENCY REQUIREMENT', it may be defined to perform a resource re-reservation (/selection). In the case that such a rule is applied, for example, among 'the candidate resources', the V2X UE finally re-reserves (/selects) an optimal resource that satisfies a predefined re-reservation (/selection) criterion (/rule). Here, through the finally re-reserved (/selected) resource, not only the retransmission of 'omitted (/stopped) V2X MESSAGE', but also a transmission of 'future (generated) V2X MESSAGE(S)' is performed. The rule may guarantee a transmission of 'future (generated) V2X MESSAGE(S)' in high probability, for example. In order to guarantee the operation described above, for example, an area of 'TX RESOURCE (RE) SELECTION DURATION (R)' may be reduced. Through this, for example, only a neighboring resource on the omitted (/stopped) transmission time becomes selectable such that a currently omitted (/stopped) V2X MESSAGE(S) may be retransmitted while '(SERVICE) LATENCY REQUIREMENT' is satisfied. In such a case, for example, an area of 'SENSING DURATION (D)' becomes also selectable.

(Example #2-3) A resource (/POOL) for (only) a retransmission of 'omitted (/stopped) V2X MESSAGE' may be independently (/additionally) configured (/signaled) (in advance), or for a V2X UE, according to the following (a part of) rule (/criterion) which is predefined (/signaled), to select a resource for a retransmission of 'omitted (/stopped) V2X MESSAGE' additionally. Here, for example, (for latter case) the additionally selected resource may be used only for the retransmission of (previously) 'omitted (/stopped) V2X MESSAGE' temporarily (or limitedly).

(Example #2-3-1) Considering only the 'candidate resources' of which retransmission of 'omitted (/stopped) V2X MESSAGE' may satisfy '(SERVICE) LATENCY REQUIREMENT', an additional (retransmission) resource may be selected. As another example, not the retransmission of 'omitted (/stopped) V2X MESSAGE', a resource re-reservation (/selection) for a transmission of 'future (generated) V2X MESSAGE(S)' may be performed within 'TX RESOURCE (RE)SELECTION DURATION' which is predefined (/signaled). Here, for example, the re-reserved (/selected) resource for the use may be excluded from the candidate resource for a retransmission of 'omitted (/stopped) V2X MESSAGE' (although it satisfies '(SERVICE) LATENCY REQUIREMENT' when a retransmission of 'omitted (/stopped) V2X MESSAGE' is performed). That is, for example, it may be interpreted that a resource for the transmission of 'future (generated) V2X MESSAGE(S)' has (relatively) higher priority than the retransmission of 'omitted (/stopped) V2X MESSAGE' (or it may be interpreted that the transmission of 'future (generated) V2X MESSAGE(S)' is performed through (the best) optimal resource that satisfies a predefined (reservation (/selection)) rule (/criterion)).

[Proposed rule #3] (In [Proposed rule #1]) In the case that a single V2X MESSAGE is transmitted 'Q' times repeatedly, a BOUNDARY of a time domain when (resource (re)reservation (/selection) related) sensing operation is performed may be defined by the following (a part of) criterion (/rule). Here, for example, 'Q' value may be a positive integer greater than 1. Hereinafter, for the convenience of description, for example, it is assumed the situation that (one) V2X MESSAGE is 'transmitted repeatedly two times (e.g., SF #(N+K1) and SF #(N+K1))'.

(Example #3-1) (In the case that (a single) V2X MESSAGE is transmitted (repeatedly) through several SF(S), and/or independent resource allocation is not performed on each SF,) a first (or last) 'repetition transmission timing' (or 'SF') may be defined as a BOUNDARY of a time domain when (resource (re)reservation (/selection) related) sensing operation is performed. As a particular example, in the case that the first 'repetition transmission timing' (or 'SF') (e.g., SF #(N+K1)) is designated as a BOUNDARY of a time domain when a sensing operation is performed, "on the resource duration from SF #(N+K1−D) to SF #(N+K1) (or from SF #(N+K1−1−D) to SF #(N+K1−1)) (here, for example, "D" means a 'SENSING DURATION' which is preconfigured (/signaled)", after a V2X UE performs SENSING operation on remaining (resource) timings except (resource) timing when the V2X UE itself performs (actual) V2X MESSAGE TX operation, the V2X UE (re)reserves (/selects) its own V2X MESSAGE TX related resource(s) thereafter. Here, as another example, in the case that the last 'repetition transmission timing' (or 'SF') (e.g., SF #(N+K2)) is designated as a BOUNDARY of a time domain when sensing operation is performed, after a V2X UE performs SENSING operation on remaining (resource) timings except (resource) timing when the V2X UE itself performs (actual) V2X MESSAGE TX operation "on the resource duration from SF #(N+K2−D) to SF #(N+K2) (or from SF #(N+K2−1−D) to SF #(N+K2−1))", the V2X UE (re)reserves (/selects) its own V2X MESSAGE TX related resource(s) thereafter.

(Example #3-2) For the purpose of sensing (/measurement) for used (or previously reserved (/selected) resource, in the case that a part of transmission of 'Q' times is omitted (/stopped), a first (last) 'omitted (/stopped) transmission timing' (or 'SF') may be defined as a BOUNDARY of a time domain when (resource (re)reservation (/selection) related) sensing operation is performed.

(Example #3-3) In the case that a single V2X MESSAGE is transmitted 'Q' times repeatedly, for each transmission (or different 'RV (REDUNDANCY VERSION)' transmissions), (or between INITIAL transmission and RETRANSMISSION) the following (a part of) parameters may be differently (or independently) defined (/operated). As another example, for each 'size (/type)' and/or 'transmission (/generation) period' and/or 'PRIORITY' (or depending on whether predefined (/signaled) 'SECURITY information' is included and transmitted), the following (a part of) parameters may be independently (or differently) defined (/operated). Here, as a particular example, 'SENSING DURATION value' related to low (or high) priority of MESSAGE is configured as long and a resource re-reservation (/selection) frequency becomes smaller, and 'SENSING DURATION value' related to high (or low) priority of MESSAGE is configured as short and a resource re-reservation (/selection) frequency becomes greater.

(Example #3-3-1) 'SENSING DURATION value' (and/or 'resource re-reservation (/selection) performance related probability value' and/or 'resource re-reservation (/selection) performance related backoff value' and/or 'maximum reservation available (time) length (MAXIMUM RESERVATION TIME)' and/or 'MUTING (/SILENCING/transmission omission (/stop)) probability (/period/pattern/presence)')

As another example, through the following (a part of) rule, it is defined such that '(resource (re-)reservation (/selection) related) sensing operation' and/or 'resource re-reservation (/selection)' is performed.

[Proposed rule #4] Depending on "RANDOM MUTING (/SILENCING/transmission omission (/stop))" (or "predefined (/signaled) probability based MUTING (/SILENCING/transmission omission (/stop))"), when sensing operation for a resource used by the UE itself (or previously reserved (/selected) is performed, not MUTING (/SILENCING) all SF(S) used for (repeated) transmission of (a single) V2X MESSAGE (or not omitting (/stopping) all of 'Q' times repeated transmission related to (a single) V2X MESSAGE), but according to a predefined (/signaled) rule (/hopping) pattern, only a part of SFs (or repeated transmission) may be MUTING (/SILENCING) (or omitted (/stopped)) (periodically) alternately. Here, for example, the corresponding (hopping) pattern may be randomized based on an input parameter(s) such as '(SOURCE) UE ID' (and/or POOL (/resource) period index (in which V2X MESSAGE TX operation is performed)' and/or 'SA PERIOD index'), and the like. As another example, when "(RANDOM) MUTING (/SILENCING/transmission omission (/stop)" is performed, between an initial transmission and a retransmission, '(RANDOM) MUTING (/SILENCING/transmission omission (/stop) probability (/period/pattern)' may be differently (or independently) defined. Here, for example such a rule may be interpreted as '(RANDOM) MUTING (/SILENCING/transmission omission (/stop) probability (/period/pattern)' is differently (or independently) configured between 'RV 0' (initial transmission) and other 'RV' (retransmission) (or '(RANDOM) MUTING (/SILENCING/transmission omission (/stop) probability (/period/pattern)' is differently (or independently) configured for each 'RV'). As a particular example, it may be configured such that 'RV 0' (initial transmission) is '(RANDOM) MUTING (/SILENCING/transmission omitted (/stopped)" with relatively smaller probability than other 'RV' (retransmission).

[Proposed rule #5] (a single) V2X MESSAGE is (repeatedly) transmitted through several SF(S) (or (a single) V2X MESSAGE is repeatedly transmitted 'Q' times), not re-reserving (/selecting) all SF(S) (or 'Q' times of repeated transmission related resources) are re-reserved (/selected) at one time, but according to a predefined (/signaled) rule (/hopping) pattern, it may be configured such that only predefined (/signaled) 'T' SFs (or repetition transmission related resource) are re-reserved (/selected). Here, for example, 'T' value may be set to '1'. In addition, for example, the corresponding (hopping) pattern may be randomized based on an input parameter(s) such as '(SOURCE) UE ID' (and/or POOL (/resource) period index (in which V2X MESSAGE TX operation is performed)' and/or 'SA PERIOD index'), and the like. When the rule is applied, for example, the phenomenon that (all) resource re-reservation (/selection) makes abrupt changes in interference environment may be alleviated.

As another example, in the case that (semi-static) resource re-reservation (/selection) of V2X MESSAGE TX related resource(s) is performed, and "sensing operation" is performed through decoding for predefined (/signaled) channel (e.g., PSCCH (/SA (SCHEDULING ASSIGNMENT)), according to the following (a part of) rule, 'DATA (or PSSCH (PHYSICAL SIDELINK SHARED CHANNEL))' decoding operation may be performed.

[Proposed rule #6] In the case that SA (/PSCCH) decoding is successful in a specific period and a resource reservation is set (/on), (A) in the case that SA (/PSCCH) is successfully received in a next period, DATA (/PSSCH) decoding is performed according to the corresponding (successfully received) SA (/PSCCH), (B) (on the other hand) in the case that reception of SA (/PSCCH) is failed in a next period, it may be configured to attempt DATA (/PSSCH) decoding by reusing the existing (or successfully received the most recently) predefined (/signaled) several types of information of SA (/PSCCH) (e.g., RA (RESOURCE ALLOCATION), MCS (MODULATION AND CODING SCHEME), RS SEQUENCE SETTING, etc.).

[Proposed rule #7] In the case that there is 'maximum time' that may maintain once (re)reserved (/selected) resource (e.g., there is 'RESOURCE RESELECTION TIMER') or in the case that it is designated how long time (re)reserved (/selected) resource is maintained in 'RESERVATION FIELD' (on PSCCH (/SA) (or PSSCH (/DATA)), it may be configured for a RX V2X UE to attempt (DATA (/PSSCH) decoding based on PSCCH (/SA)) successfully received the most recently, and to avoid the corresponding resource position occupied (by another V2X UE) from 'RESOURCE (RE)ALLOCATION'.

As another example, a V2X UE has a reserved (/selected) resource, but when a better resource that satisfies predefine (/signaled) criterion (/rule) is discovered, the V2X UE may 're-reserve/(select)' the resource used by the V2X UE itself (or previously reserved (/selected) resource. As an additional example, for a V2X UE to sense (/measure) a resource currently (its own) reserved, instead of performing 'MUTING(/SILENCING)', a V2X UE moves temporally to a preconfigured (/signaled) other resource (/POOL) (and/or performs a transmission of V2X MESSAGE (on the moved resource (/POOL)) (interpretable as a type of 'V2X MESSAGE TX W/O RESERVATION', and return (again) after sensing (/measuring) (its own reserved resource). Here, for example, the 'time' for staying in other resource (/POOL) may be preconfigured (/signaled). When the rule is applied, for example, the phenomenon that V2X MESSAGE transmission is omitted (/stopped) due to 'MUTING(/SILENCING)' operation may be alleviated.

As another example, 'a BOUNDARY of a time domain when sensing operation is performed' of a specific V2X UE (in relation to resource (re)reservation (/selection)) may be defined as "PIVOT SF (or REFERENCE SF)" (SF #P) which is selected based on a predefined (/signaled) rule. Here, for example, when the rule is applied, on a resource duration "from "from SF #(P−Y1) to SF #(P+Y2) (here, for example, 'Y1=FLOOR ((D−1)/2)', 'Y2=CEILING ((D-Y1)/2)' (or 'Y1=CEILING((D−1)/2)', 'Y2=FLOOR ((D-Y1)/2)')) (or resource duration from SF #(P-D) to SF #P or from SF #(P−1−D) to SF #(P−1)", after a V2X UE performs sensing operation, the V2X UE (re)reserves (/selects) V2X MESSAGE TX related resource(s) thereafter. Here, "D" means a 'SENSING DURATION' which is preconfigured (/signaled), and 'CEILING (X)' and 'FLOOR (X)' means 'a function of deriving a minimum integer greater than or equal to 'X', 'a function of deriving a maximum integer smaller than or equal to 'X'. Here, for example, the corresponding "PIVOT SF (or REFERENCE SF)" may be randomly selected based on input parameter(s) such as '(SOURCE) UE ID' (and/or POOL (/resource) period index (in which V2X MESSAGE TX operation is performed)' and/or 'SA PERIOD index'), and the like. In addition, the proposed rule may be limitedly applied only for the case that INITIAL sensing operation is performed after (V2X UE) power is turned on and/or in a previous timing (or predefined (/signaled) length of (previous) duration (/window)) V2X MESSAGE transmission is not performed (any time).

As another example, it is assumed the situation that a V2X UE performs 'SA (/PSCCH)' transmission related to inter-linked 'DATA (/PSSCH)' transmission on 'SF #(N+D) 'in'SF #(N+C)' (e.g., "D≥C"). Here, as an example, in 'SF #(N+D)' when another 'TB' related 'POTENTIAL DATA (/PSSCH)' transmission is performed on 'SF #(N+E)' (e.g., 'D<E'), an 'intention' to reuse '(frequency) resource' (used for 'DATA (/PSSCH)' transmission on 'SF #(N+D)' may be informed through (predefined (/signaled) a channel (e.g., '(SA (/PSCCH)' ('SF #(N+C)') (or 'DATA (/PSSCH)')). Here, for example, for the convenience of description, the 'frequency resource' indicated (/signaled) that there is no reuse 'intention' (when another 'TB' related 'POTENTIAL DATA (/PSSCH)' transmission is performed on 'SF #(N+E)') by V2X UE #X is referred to as 'UN-BOOKING RESOURCE'. Here, for example, V2X UE #Y performs 'ENERGY MEASUREMENT (and/or SA DECODING)' based sensing operation, (in a current (e.g., 'SF #(N+D)') or sensing duration) '(frequency) resource' indicated as 'UN-BOOKING RESOURCE' by V2X UE #X in which high energy is measured may be assumed (/processed) according to the following (a part of) rule (when selecting (/reserving) its own resource). This is because, for example, the '(frequency) resource' indicated as 'UN-BOOKING RESOURCE' by V2X UE #X is not selected (/reserved) by V2X UE #Y owing to high energy measured (in a current (e.g., 'SF #(N+D)') or sensing duration) although the probability that the '(frequency) resource' is not used thereafter (during a predetermined time) (including 'SF #(N+E)'). Here, for example, the following rules may be extendedly applied when the V2X UE(S) informs that the V2X UE(S) itself does not use the reserved (/selected) resource previously on (resource (re)selection (/reservation) period) (referred to as 'UN-BOOKING RESOURCE' likewise) through a predefined (/signaled) channel (e.g., 'SA (/PSCCH)' (or 'DATA (/PSSCH)') (to another V2X UE(S)). Here, for example, the following rules may be limitedly applied only for the case that the V2X UE(S) performs the sensing operation based on 'ENERGY MEASUREMENT ONLY' or the sensing operation based on 'COMBINATION OF ENERGY MEASUREMENT AND SA DECODING' (e.g., the rules are not applied when the sensing operation based on 'SA DECODING ONLY' is performed).

[Proposed rule #8] The energy measurement value for '(frequency) resource' indicated as 'UN-BOOKING RESOURCE' is regarded (/assumed) as a remaining value of subtracting 'RSRP measurement value (from energy value measured in the corresponding '(frequency) resource') (or the remaining value of subtracting a preconfigured (/signaled) offset value), and 'RANKING' for the energy measurement value for each resource is performed. Here, for example, the corresponding 'RSRP measurement' may be performed based on a reference signal (e.g., 'DM-RS') on a preconfigured (/signaled) channel (e.g., 'PSBCH' (/'PSCCH'/'PSSCH')). Here, for example, in the case that 'SA (/PSCCH)' and'DATA (/PSSCH)' are being'FDM', '(frequency) resource' (or 'SA (/PSCCH)' or'DATA (/PSSCH)') related final subtracting 'RSRP (measurement) value' may be finally derived (/assumed) by compensating (or adding) (preconfigured (/signaled) 'MRP value' which is (differently) applied according to a separated distance between ('SA (/PSCCH)' and 'DATA (/PSSCH)' (from actually measured 'RSRP value').

[Proposed rule #9] The 'energy measurement value' or 'RANKING' value for '(frequency) resource' indicated as 'UN-BOOKING RESOURCE' may be regarded (/assumed) as a preconfigured (/signaled) value. Here, for example, the 'RANKING' value for '(frequency) resource' indicated as 'UN-BOOKING RESOURCE' may be configured (/signaled) as the lowest (e.g., the probability that the '(frequency) resource' is selected (/reserved) is low) (or the highest (e.g., the probability that the '(frequency) resource' is selected (/reserved) is high). As another example, a rule may be defined such that the '(frequency) resource' indicated as 'UN-BOOKING RESOURCE' is always excluded (or (preferentially) selected) when a resource is selected (/reserved)).

Meanwhile, a sensing operation of V2X UE(S) may be performed as below.

The following proposed methods proposes a (efficient) 'sensing method' for a V2X UE(s) to select 'V2X MESSAGE transmission (TX) related resource'. Here, for example, in the case that 'sensing' operation is applied, different V2X UE(S) (located in an adjacent distance) selects a transport resource of the same position, and accordingly, the problem of exchanging interference with each other (in performing actual transmission) may be alleviated. Here, for example, 'sensing' wording may be interpreted as (A) energy (or power) measurement operation and/or (B) decoding operation for a predefined (/signaled) channel (e.g., PSCCH (PHYSICAL SIDELINK CONTROL CHANNEL)). Here, for example, 'energy (or power) measurement' may be interpreted as (A) 'RSSI (RECEIVED SIGNAL STRENGTH INDICATOR) form (e.g., average of reception power measured in symbols (in which 'DM-RS' of predefined (/signaled) antenna port is transmitted or data is transmitted)' and/or (B) 'RSRP (REFERENCE SIGNAL RECEIVED POWER) form (e.g., average value of reception powers measured in 'RE (RESOURCE ELEMENT)' in which 'DM-RS' (of predefined (/signaled) antenna port)) is transmitted' and/or (C) form in which 'RSSI' and 'RSRP' are combined according to 'predefined (/signaled) rule (/formula) (e.g., form similar to 'RSRQ (REFERENCE SIGNAL RECEIVED QUALITY)'.

For example, in order to alleviate (A) problem that 'sensing' information becomes inaccurate since 'TOPOLOGY' of V2X UE(S) is changed and/or (B) 'HALF DUPLEX' problem, it may be considered that (in 'SINGLE V2X UE' aspect) 'control (/scheduling) information' and 'data (interlinked with the corresponding control (/scheduling) information)' are transmitted in 'FDM (FREQUENCY DIVISION MULTIPLEXING)' form on the same subframe (SF).

Figure 15:
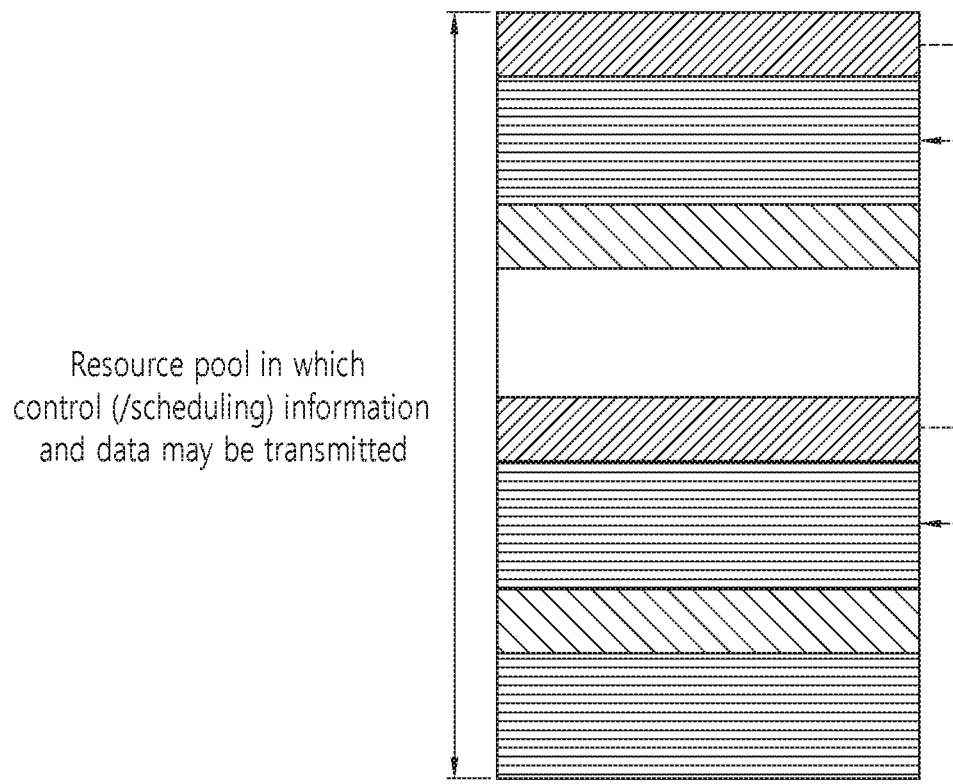
FIGS. 15 and 16 illustrates an example for the case that (in 'SINGLE V2X UE' aspect) 'control (/scheduling) information' and 'data (interlinked with the corresponding control (/scheduling) information)' are transmitted in 'FDM' form on the same subframe (SF).
Figure 16:
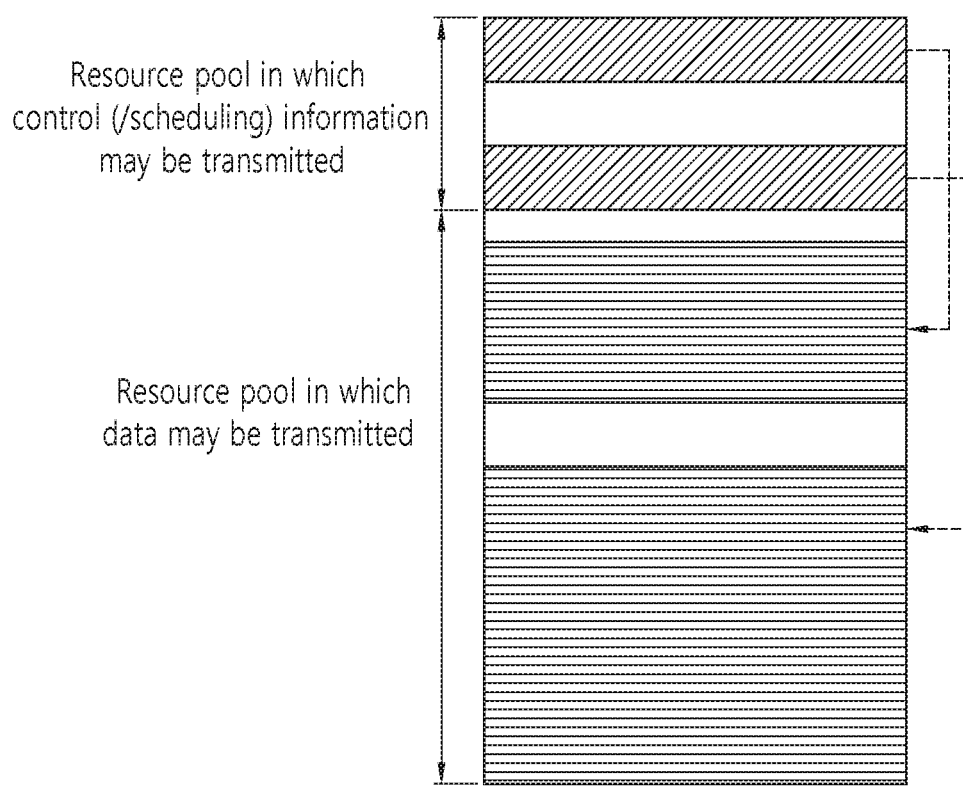

FIGS. 15 and 16 illustrates an example for the case that (in 'SINGLE V2X UE' aspect) 'control (/scheduling) information' and 'data (interlinked with the corresponding control (/scheduling) information)' are transmitted in 'FDM' form on the same subframe (SF).

Here, for example, FIG. 15 and FIG. 16 show 'the case that control (/scheduling) information and the interlinked data are transmitted on contiguous resource (RB (RESOURCE BLOCK))' and 'the case that control (/scheduling) information and the interlinked data are transmitted on non-contiguous resource (RB)', respectively. As another example, considering 'LINK BUDGET' of 'control (/scheduling) information', (in the aspect of 'SINGLE V2X UE') it may be considered that 'control (/scheduling) information' and 'data (interlinked with the corresponding control (/scheduling) information)' are transmitted in 'TDM (TIME DIVISION MULTIPLEXING)' on different SF.

Figure 17:
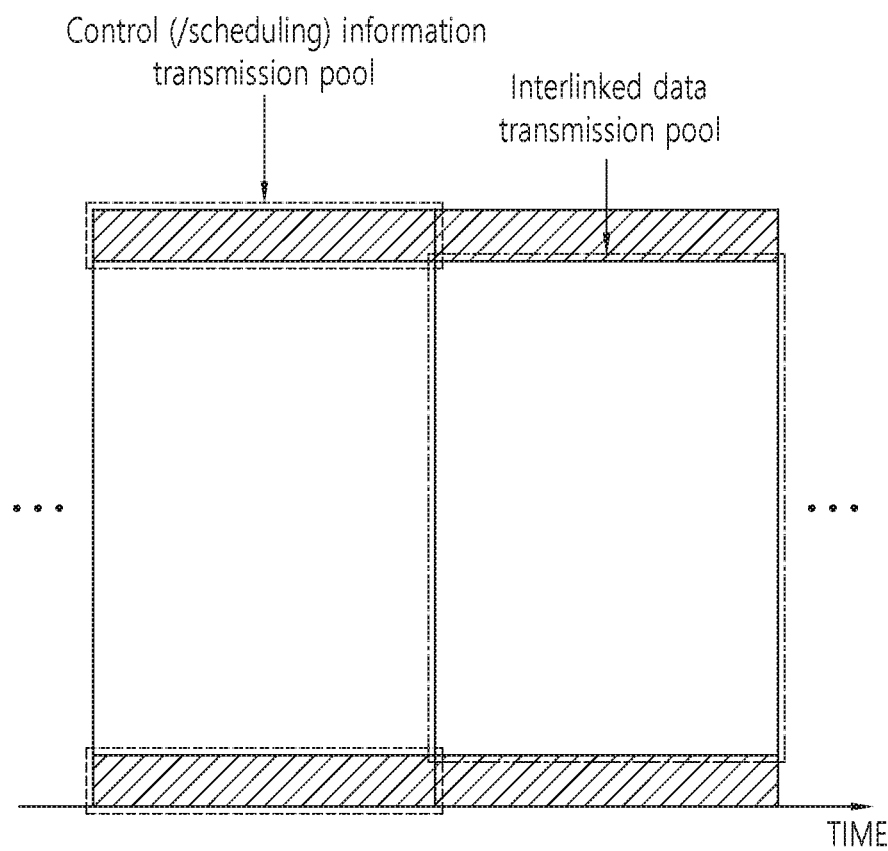
FIG. 17 illustrates an example of the case that (in the aspect of system) 'control (/scheduling) information transmission POOL' and 'data transmission POOL' are transmitted in 'FDM' form.

FIG. 17 illustrates an example of the case that (in the aspect of system) 'control (/scheduling) information transmission POOL' and 'data transmission POOL' are transmitted in 'FDM' form.

For example, in order to (A) satisfy 'LATENCY REQUIREMENT' of 'V2X SERVICE' (efficiently) and/or (B) distribute 'control (/scheduling) information transmission' on a time domain, (in the aspect of system) 'control (/scheduling) information transmission POOL' and 'data transmission POOL' may be configured (/constructed) in 'FDM' form. FIG. 17 shows an example of such a case. Here, for example, it is assumed that a specific 'control (/scheduling) information transmission POOL' and the interlinked 'data transmission POOL' are being 'TDM'.

Meanwhile, (basically) a UE performs sensing in (each of) sub-channel unit, but actual V2X MESSAGE transmission may be performed in multiple sub-channel units. In the case that there is a plurality of sub-channels used for actual V2X MESSAGE transmission (i.e., V2X MESSAGE transmission is performed in multiple sub-channel units, it is problematic for a UE how to perform sensing. Accordingly, hereinafter, in the case that the number of sub-channels used for V2X MESSAGE transmission is plural, a method for performing sensing is described.

[Proposed method] As an example, a rule may be defined such that a V2X UE(S) performs sensing operation in 'resource size unit' used for 'V2X MESSAGE TX' (by the V2X UE itself). Here, for example, in the case that the corresponding rule is applied, 'sensing resource unit size' of the V2X UE becomes the same as 'resource size' to be used for 'V2X MESSAGE TX' (by the V2X UE). For example, in the case that a UE performs energy measurement with the sensing operation, it may be problematic to perform the energy measurement in which resource unit/size. At this time, in the proposed method, the unit/size of energy measurement may be resource unit/size used for a UE to transmit data, for example, a sub-channel size. For example, in the case that a UE performs V2X MESSAGE transmission in a specific sub-channel size, the energy measurement for sensing operation may be performed in a resource unit of the specific sub-channel size. Hereinafter, the propose method is describe with reference to drawings.

Figure 18:
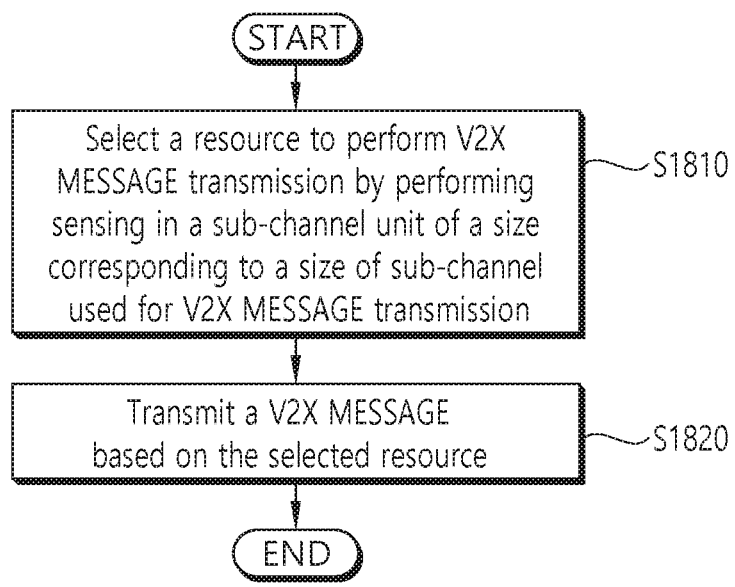
FIG. 18 is a flowchart of a method for performing sensing in the case that the number of sub-channels used for V2X MESSAGE transmission is plural according to an embodiment of the present disclosure.

FIG. 18 is a flowchart of a method for performing sensing in the case that the number of sub-channels used for V2X MESSAGE transmission is plural according to an embodiment of the present disclosure.

Referring to FIG. 18, a UE selects a resource to perform V2X MESSAGE transmission by performing sensing in a sub-channel unit of a size corresponding to a size of sub-channel used for V2X MESSAGE transmission (step, S1810). In this case, the UE may select the resource by configuring a SELECTION WINDOW within a range that satisfies LATENCY REQUIREMENT, and the V2X MESSAGE transmission may be performed in a plurality of sub-channel units, and based on sensing performed in a sub-channel unit of a size corresponding to a size of the plurality of sub-channel units, a resource for performing the V2X communication may be selected. The sensing area used when the sensing is performed may be an area of the size corresponding to a size of a plurality of sub-channel units. Furthermore, the UE may also perform sensing using an energy measurement average value of the sub-channels included in the plurality of sub-channels.

In summary, the UE may select the resource by configuring a Selection Window within the range that satisfies LATENCY REQUIREMENT as well as performing sensing in a plurality of sub-channel units, in the case that V2X transmission is performed in plurality of sub-channel units. Here, the example of selecting the resource by configuring a Selection Window within the range that satisfies LATENCY REQUIREMENT is as described above.

Hereinafter, in the case that V2X MESSAGE transmission is performed in plurality of sub-channel units, the example that a UE performs sensing in the in plurality of sub-channel units is mainly described.

A UE may perform sensing in a sub-channel unit of a size corresponding to a size of sub-channel used for V2X MESSAGE transmission, and the UE may select a resource for performing the V2X MESSAGE transmission based on the sensing result. In other words, sensing (e.g., ENERGY MEASUREMENT) may be performed in a sub-channel size of data that the UE is intended to transmit.

When sensing (e.g., ENERGY MEASUREMENT) is performed in a sub-channel size of data that the UE is intended to transmit, a LINEAR average value of sub-channels may be used. More particularly, for a candidate single subframe resource $R_{x,y}$ remained in set $S_A$ (which is a set of all candidate single subframe resources), a sensing are (e.g., matric $E_{x,y}$) may be defined as a linear average of S-RSSI measured in sub-channels x+k. Here, it may be defined as K=0, . . . , $L_{subCH}$–1, herein, $L_{subCH}$ may mean the number of sub-channels required when actual packet is sent. For the convenience of understanding, this content may be described as below with reference to drawings.

Figure 19:
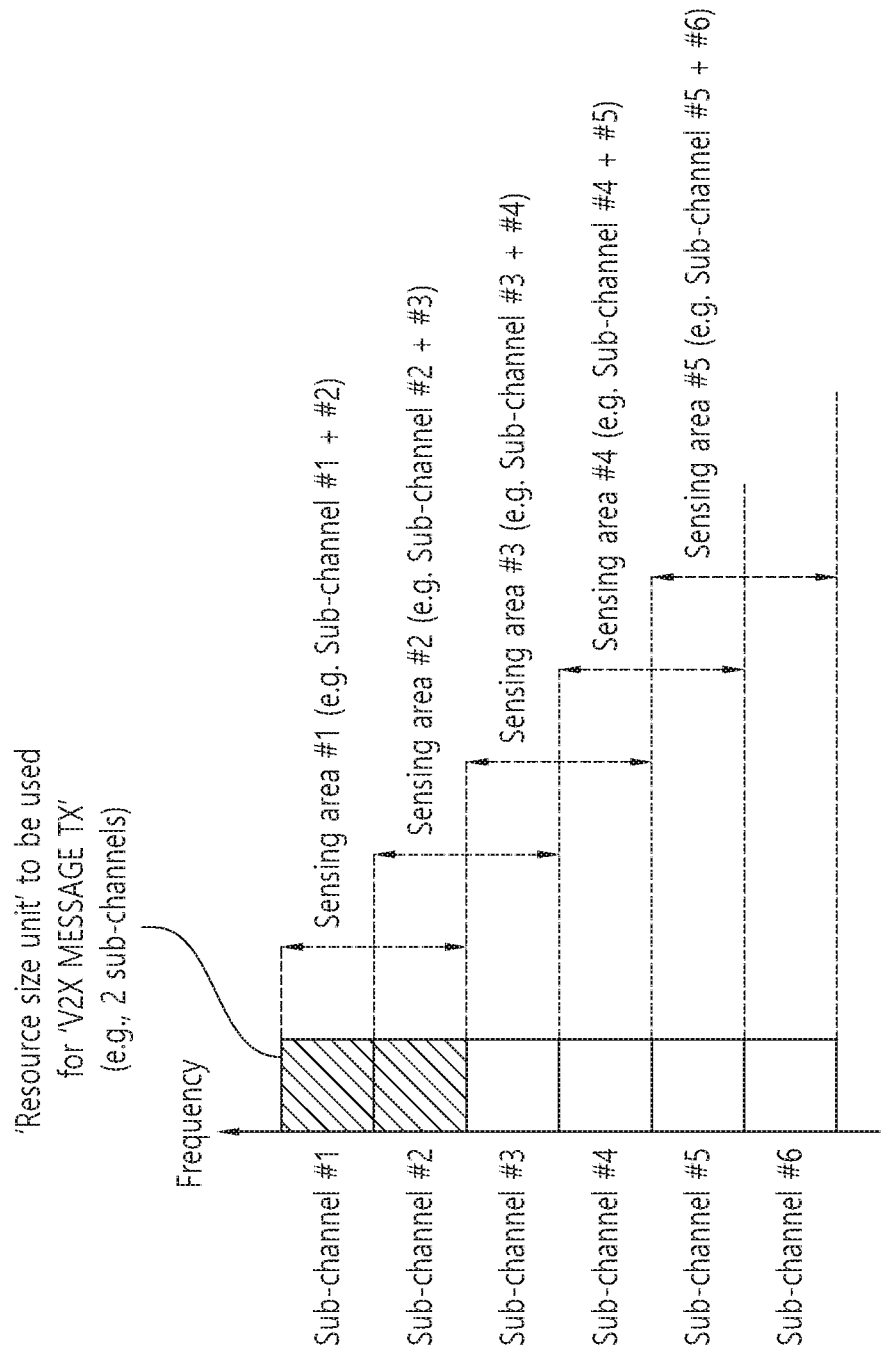
FIG. 19 illustrates an example that ENERGY MEASUREMENT (i.e., sensing) is performed in a sub-channel size of data that a UE is intended to transmit.

FIG. 19 illustrates an example that ENERGY MEASUREMENT (i.e., sensing) is performed in a sub-channel size of data that a UE is intended to transmit. In FIG. 19, it is assumed that a sub-channel size of V2X message (e.g., V2X data) that the UE is intended to transmit is 2 (i.e., $L_{subCH}$=2).

In the example of FIG. 19, the ENERGY MEASUREMENT may be performed in two sub-channel units corresponding to a sub-channel size of data that the UE is intended to transmit. For example, preferentially, by using average of energy sensing value in sensing are #1, that is, sub-channel #1 and sub-channel #2, the UE may determine a sensing value for sensing are #1. Furthermore, by using average of energy sensing value in sensing area #2, that is, sub-channel #2 and sub-channel #3, the UE may determine a sensing value for sensing area #2. Likewise, by using average of energy sensing value in sensing area #3, that is, sub-channel #3 and sub-channel #4, the UE may determine a sensing value for sensing area #3.

Although it is assumed that a sub-channel size of data that the UE is intended to transmit is 2 in the example of FIG. 19, but a sub-channel size of data that the UE is intended to transmit may have a value of 3 or more. It is not separately shown, but in the case that a sub-channel size of data that the UE is intended to transmit is 3, the UE may determine a sensing value for the sensing area by using average of energy sensing value in sub-channel #1 to sub-channel #3.

Referring to FIG. 18 again, the UE may transmit a V2X MESSAGE based on the selected resource (step, S1820). As described above (or below), the UE may select a subframe within a selection window based on the sensing result performed during a UE-specific sensing duration. The UE may determine transport reservation resources based on the selected subframe and perform V2X transmission based on the reserved resource. Since the particular example for the UE perform V2X transmission based on the reserved resource is as described above (or below), detailed content is omitted.

Figure 20:
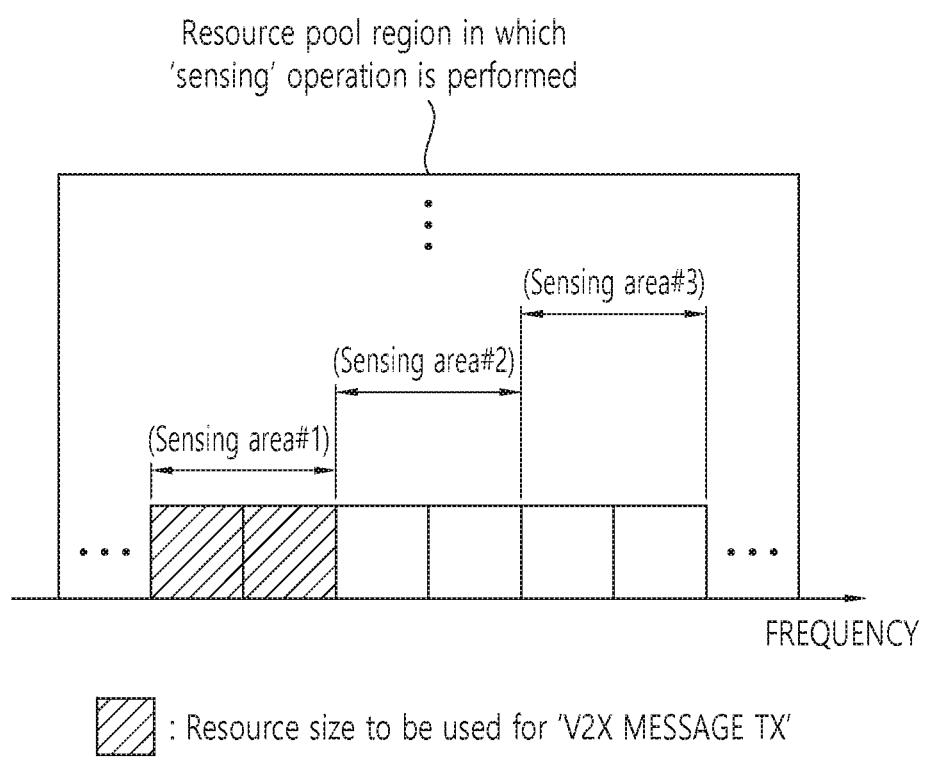
FIGS. 20 and 21 illustrate an example of 'PARTIALLY OVERLAPPED REGION BASED SENSING (or 'SLIDING WINDOW BASED SENSING') form.
Figure 21:
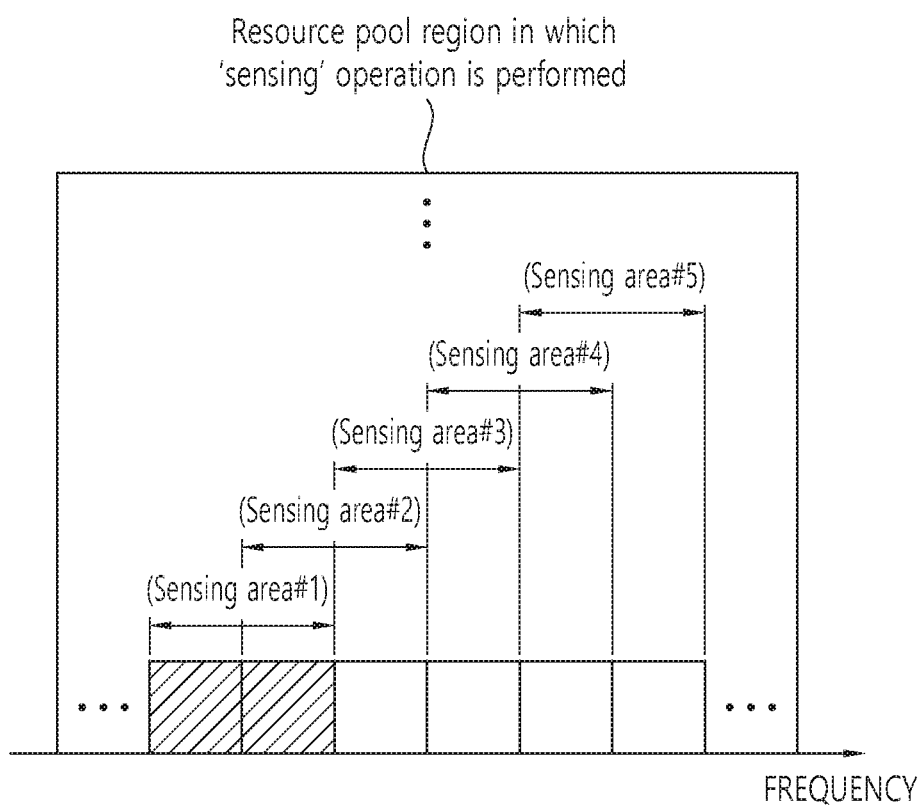

FIGS. 20 and 21 illustrate an example of 'PARTIALLY OVERLAPPED REGION BASED SENSING (or 'SLIDING WINDOW BASED SENSING') form.

As an example, the sensing operation may be implemented in (A) 'NON-OVERLAPPED REGION BASED SENSING' form (refer to FIG. 20) and/or (B) 'PARTIALLY OVERLAPPED REGION BASED SENSING' (or 'SLIDING WINDOW BASED SENSING') form (refer to FIG. 21). Here, for example, the former rule ('(A)') is applied, (contiguously) areas in which sensing operation is performed are not overlapped (e.g., it is shown that '(sensing area #1)', '(sensing area #2)' and '(sensing area #3)' are not overlapped with each other in FIG. 20). (On the contrary) In the case that the latter rule ('(B)') is applied, for example, (contiguously) areas in which sensing operation is performed are overlapped as much as preconfigured (/signaled) 'ratio' (or 'resource amount (/size)') (e.g., it is shown that '(sensing area #1) and (sensing area #2)', '(sensing area #2) and (sensing area #3)', '(sensing area #3) and (sensing area #4)' and '(sensing area #4) and (sensing area #5)' are overlapped as much as preconfigured (/signaled) 'ratio' (or 'resource amount (/size)'). As an example, the former rule ('(A)') may reduce 'complexity of performing sensing operation' rather than the latter rule ('(B)'). In other words, for 'total sensing count' required in the resource pool of the same size, that of the former rule ('(A)') may be relatively smaller than that of the latter rule ('(B)'). On the other hand, for example, the latter rule ('(B)') (may have more 'total sensing count' required in the resource pool of the same size) may search (/select) 'V2X MESSAGE TX' related available resource candidate position relatively more efficiently (or closely) in comparison with the former rule ('(A)').

As another example, for a V2X UE(S) to perform (preferentially) sensing operation in a preconfigured (/signaled) 'resource unit (/size)' (e.g., '1RB'), and then, '(weight) average value' (or 'SUM') (or maximum (or minimum or medium value) of a plurality of sensing (/measurement) values) of a plurality of sensing (/measurement) values corresponding to 'resource size (/unit)' to be used for its own 'V2X MESSAGE TX' may be regarded (/assumed) as representative sensing (/measurement) value for each 'resource size (/unit)' (to be used for 'V2X MESSAGE TX').

As another example, when a V2X UE(S) performs '(V2X) channel/signal transmission' (e.g., 'MULTI-CLUSTER TX' (or 'DVRB TX')) using (a plurality of) resources of 'non-contiguous position' on a 'frequency (resource) domain', after performing sensing (/measurement) operation (based on 'NON-OVERLAPPED REGION BASED SENSING' or 'PARTIALLY OVERLAPPED REGION BASED SENSING' (/'SLIDING WINDOW BASED SENSING') form) with a preconfigured (/signaled) 'sensing resource unit (/size)' (e.g., 'K' 'RBs' (or 'RBG (RESOURCE BLOCK GROUP)'), the V2X UE(S) may (finally) select its own 'V2X MESSAGE TX' related resources (among resources of (energy) measurement value which is smaller (or greater) than a preconfigured (/signaled) threshold value).

As another example, when a V2X UE(S) transmits '(SINGLE) V2X TB (/MESSAGE)', it is assumed that the V2X UE(S) performs 'K times' of repetition transmissions (e.g., 'K' value includes (both of) 'initial transmission' and 'retransmission'). Here, for example, for the convenience of description, 'K' value is assumed to be '4'. Here, for example, it is assumed that 'SA (/PSCCH)' transmission is performed in 'SF #(N+C)', and the interlinked ('4' times of) 'DATA (/PSSCH)' transmissions are performed in 'SF #(N+D)', 'SF #(N+D+K1)', 'SF #(N+D+K2)', and 'SF #(N+D+K3)' (e.g., 'C≤D', '0<K1<K2<K3'), respectively. Here, for example, on 'SA (/PSCCH)' ('SF #(N+C)'), a field for informing 'time resource positions' in relation to (A) 'K times' or (B) '(K−1) times' of repetition transmission, and for this, the following (a part of) rule may be applied. Here, for example, for the latter ('(B)') case, it may be interpreted that the corresponding field informs 'time resource positions' related to 'remaining ('(K−1) times') except 'initial (/first) transmission', and/or it may be interpreted that 'initial (/first) transmission' is performed (always) on the time resource (position) which is the same as 'SA (/PSCCH)' ('SF #(N+C)'), and/or it may be interpreted that 'time resource positions' related to 'initial (/first) transmission' is signaled with (other) field that informs an interval between (predefined) 'SA (/PSCCH)' ('SF #(N+C)') transmission timing and 'initial (/first) transmission' timing.

(Example #A) 'time resource positions' related to 'initial (/first) transmission' may be signaled with (different) 'FIELD #F' that informs an interval between (predefined) 'SA (/PSCCH)' ('SF #(N+C)') transmission timing and 'initial (/first) transmission' timing ('SF #(N+D)'), and 'time resource positions' related to 'remaining ('(K−1) times') (e.g., 'SF #(N+D+K1)', 'SF #(N+D+K2)', and 'SF #(N+D+K3)') may be signaled with (new) 'FIELD #S' of a size which is the same as the maximum interval (MAX_GAP) between a preconfigured (/signaled) 'first transmission' ('SF #(N+D)') timing and 'K$^{th}$ transmission' ('SF #(N+D+K3)') timing. Here, for example, 'FIELD #S' may be implemented in 'bitmap' format. Here, for example, 'bitmap' related to 'FIELD #S' may apply 'initial (/first) (DATA (/PSSCH)) transmission' ('SF #(N+D)') timing to a criterion (/starting point). Here, for example, when 'MAX_GAP' value is configured (/signaled) as '10', in the case that 'FIELD #S' is configured (/signaled) as '0100100100', 'second transmission', 'third transmission' and 'fourth transmission' are performed on 'SF #(N+D+2)', 'SF #(N+D+5)', and 'SF #(N+D+8)', respectively. As another example, 'K times' of repetition transmissions (e.g., 'SF #(N+D)', 'SF #(N+D+K1)', 'SF #(N+D+K2)', and 'SF #(N+D+K3)') related 'time resource positions' may be signaled with (new) 'FIELD #Q' of a size which is the same as the maximum interval (MAX_TVAL) between a preconfigured (/signaled) 'SA (/PSCCH)' ('SF #(N+C)') transmission timing and 'K$^{th}$ transmission' ('SF #(N+D+K3)') timing. Here, for example, 'FIELD #Q' may be implemented in 'bitmap' format. Here, for example, 'bitmap' related to 'FIELD #Q' may apply 'SA (/PSCCH)' ('SF #(N+C)') timing to a criterion (/starting point). Here, for example, when 'MAX_TVAL' value is configured (/signaled) as '10', in the case that 'FIELD #Q' is configured (/signaled) as '1100100100', 'first transmission', 'second transmission', 'third transmission' and 'fourth transmission' are performed on 'SF #(N+C+1)', 'SF #(N+C+2)', 'SF #(N+C+5)', and 'SF #(N+C+8)', respectively. In the example, in the case that 'FIELD #F' is defined on 'SA (/PSCCH)' ('SF #(N+C)'), 'FIELD #F' value may be configured as '1'. As another example, as a result of V2X communication related 'CONGESTION (/LOAD/MEASUREMENT) CONTROL', there may be a limitation for 'pattern (form/number)' (or '(maximum (/minimum)) value (/length)') that 'FIELD #S' (or 'FIELD #Q' (or 'FIELD #F')) may have, and/or '(maximum (/minimum) number of bits which may be configured as '1' (on bitmap)'. Here, for example, the corresponding (limitation) information may be determined by a V2X UE(S) by identifying 'CONGESTION (/LOAD/MEASUREMENT)' situation (according to preconfigured (/signaled) rule (/criterion)) or configured (/signaled) by a (serving) base station (based on 'CONGESTION (/LOAD/MEASUREMENT)' information reported by the V2X UE(S) or measured by the base station itself). Here, for example, as a result of V2X communication related 'CONGESTION (/LOAD/MEASUREMENT) CONTROL', there may be a limitation for '(maximum (/minimum)) value (/length)' that 'MAX_GAP' (or 'MAX_TVAL') may have (likewise).

(Example #B) 'K times' of repetition transmissions (e.g., 'SF #(N+D)', 'SF #(N+D+K1)', 'SF #(N+D+K2)', and 'SF #(N+D+K3)') related 'time resource positions' may be signaled with 'K' 'FIELD #F' defined on 'SA (/PSCCH)' ('SF #(N+C)') ('(Example #A)') (e.g., '(X$^{th}$ FIELD #F' informs an interval (on a time domain) between 'SA (/PSCCH)' ('SF #(N+C)') transmission timing and 'X$^{th}$ transmission' timing).

(Example #C) (Under a situation in which (a part of) the rules (e.g., (Example #A) and (Example #B)) in the case that 'SA (/PSCCH)' transmission is performed for each 'DATA (/PSSCH)' transmission (of 'K times' (e.g., of 'SF #(N+D)', 'SF #(N+D+K1)', 'SF #(N+D+K2)', and 'SF #(N+D+K3)')) (respectively), the following (a part of) rule may be applied. Here, for example, the following (a part of) rules may be limitedly applied only for the case that '(DATA/(PSSCH)) FREQUENCY HOPPING' is performed.

(Example #1) A part of 'SF PATTERN' information (/field) on 'SA (/PSCCH)' ('SF #(N+C)') related 'initial (/first) transmission' ('SF #(N+D)') and/or 'frequency resource (position)' information (/field) and/or 'MCS' information (/field) may be transmitted on 'remaining ('(K−1) times' of) transmissions' related 'SA (/PSCCH)' in the same way. Here, for example, for this classification, in the case that a single 'TB' is transmitted in several SF(S), 'COUNTER information' indicating the order of ((DATA/(PSSCH)) transmission) SF corresponding to 'SA (/PSCCH)' that schedules (DATA/(PSSCH) on each SF (or information (/field) indicating the order of transmission of 'DATA/ (PSSCH) transmission' or 'RV' information (/field) related to 'DATA/(PSSCH) transmission' may be included. Here, for example, in the 'initial (/first) transmission' ('SF #(N+D)') related 'SA (/PSCCH)' ('SF #(N+C)'), it may be defined (at least) 'initial (/first) transmission' related 'frequency resource (position)' information (/field) and/or 'MCS' information (/field) and/or (above described) 'FIELD #S' (or 'FIELD #Q') (or 'SF PATTERN' information (/field)) and/or 'FIELD #F' (e.g., this may be (extendedly) interpreted as a field informing an interval between 'X$^{th}$ transmission' related 'SA (/PSCCH)' transmission timing and 'X$^{th}$ transmission' timing) and/or information (/field) indicating the order of transmission of '(the corresponding) DATA/(PSSCH) transmission' (or 'RV' information (/field) related to '(the corresponding) DATA/(PSSCH) transmission') (and/or information (/field) on whether to apply '(DATA/(PSSCH)) FREQUENCY HOPPING'). Here, for example, in the case that the corresponding rule is applied, 'frequency resource (position)' information (/field) related to 'remaining ('(K−1) times' of) transmissions' may not be (directly) transmitted (/signaled) on the related 'SA (/PSCCH)' and/or although 'FIELD #F' values are identically configured with an interval between 'initial (/first) transmission' related 'SA (/PSCCH)' transmission timing and the 'initial (/first) transmission', but in the case that 'later transmission' related 'SA (/PSCCH)' reception (/decoding) is successful even in the case that a V2X UE(s) fails in 'previous transmission' related 'SA (/PSCCH)' reception (/decoding), the corresponding 'later transmission' related 'frequency resource (position)' information may be identified (/derived) (in reverse tracking form) by combining (A) '(DATA/(PSSCH)) FREQUENCY HOPPING pattern' information and/or (B) 'initial (/first) transmission' related 'frequency resource (position)' information on 'later transmission' related 'SA (/PSCCH)' and/or (C) 'FIELD #S' (or 'FIELD #Q') information (or 'SF PATTERN' information) and/or information indicating the order of transmission of 'DATA/(PSSCH) transmission' (or 'RV' information (/field) related to 'DATA/(PSSCH) transmission'). Here, for example, 'later transmission' related 'time resource (position)' information may be identified (/derived) through 'FIELD #F' on the 'later transmission' related 'SA (/PSCCH)'. Here, for example, in the case that the corresponding rule is applied (particularly, in the case that '(DATA/(PSSCH)) FREQUENCY HOPPING' operation is applied), the V2X UE(S) succeeded in 'initial (/first) transmission' related 'SA (/PSCCH)' reception (/decoding) may not attempt (a part of) 'remaining ('(K−1) times' of) transmissions' related 'SA (/PSCCH)' decoding (/reception). As another example, (in the proposed rule) 'FIELD #F' (e.g., this may be interpreted as 'TIMING GAP' between 'SA (/PSCCH)' transmission timing and 'interlinked DATA (PSSCH)' transmission timing) (or when performing other 'TB' related 'POTENTIAL DATA (/PSSCH)' transmission on future (specific timing), a field informing 'intention' on whether to reuse '(frequency) resource' used for a previous 'DATA (PSSCH)' transmission) may be independently (or (all) identically) configured (/signaled) for each 'SA (/PSCCH)' transmission. Here, for example, in the case that the corresponding rule is applied, a V2X UE(S) may attempt to decode (/receive) (all of) 'K times' of transmission related 'SA (/PSCCH)'. As another example, (in the proposed rule) (in the case that a V2X TX UE transmits a single 'TB' in several SF(S)) the V2X TX UE may perform 'RESOURCE RESELECTION' related operation according to the case that the V2X TX UE fails to satisfy a preconfigured (/signaled) rule (intermediately) (e.g., (in the case of detecting 'SA (/PSCCH)' (/'DATA (PSSCH)' of 'HIGHER PRIORITY' transmitted by other V2X UE(S)) in the case that 'CURRENT RESOURCE ALLOCATION' fails to satisfy a preconfigured (/signaled) 'REQUIREMENT' (e.g., LATENCY, RELIABILITY, PRIORITY, FAIRNESS, QOS). Accordingly, for example, in the case that 'later SA (/PSCCH)' performs scheduling different from 'previous SA (/PSCCH)', a V2X RX UE may follow the 'later SA (/PSCCH)'.

(Example #2) (In (Example #1)) In '$X^{th}$ transmission' (e.g., 'X>1') related 'SA (/PSCCH)' transmission, 'FIELD #S' (or 'FIELD #Q') assumes that the corresponding '$X^{th}$ transmission' is 'initial (/first) transmission', and 'FIELD #S' (or 'FIELD #Q') may be configured. As another example, in the case that 'frequency resource (position)' information (/field) is defined on 'SA (/PSSCH)' and '(DATA/(PSSCH)) FREQUENCY HOPPING' operation is performed, the 'frequency resource (position)' information (/field) value itself may be differently configured in every 'SA (/PSSCH)' transmission (considering the corresponding '(DATA/(PSSCH)) FREQUENCY HOPPING pattern'). This is because, for example, after '$N^{th}$ transmission' related 'SA (/PSSCH)' applies '(DATA/(PSSCH)) FREQUENCY HOPPING' in the 'frequency resource (position)', '$(N+1)^{th}$ transmission' related 'SA (/PSSCH)' should designate (/signal) (the corresponding) changed 'frequency resource (position)'.

As another example, a V2X UE(S) may reselect its own reserved (/selected) (transmission) resource (during a predetermined duration (/period)) whenever a preconfigured (/signaled) condition is satisfied. Here, for example, after the V2X UE(S) selects a COUNTER value in a predefined (/signaled) range ("C_RANGE"), when the COUNTER becomes '0' (or 'a value smaller than 0'), the V2X UE(S) may reselect its own reserved (/selected) (transport) resource (during a predetermined duration (/period)). Here, for example, (A) the COUNTER may be decreased (or increased) to a predefined (/signaled) value (e.g., '1') in every (new) TB transmission (e.g., the wording 'TB transmission' may be interpreted as only 'actually (successfully) performed TB transmission' and/or (owing to 'sensing result' and/or 'collision with a message transmission (of other V2X UE(S)) of relatively higher priority) interpreted to include 'omitted TB transmission') or (B) the COUNTER may be decreased (or increased) to a predefined (/signaled) value (e.g., '1') in every preconfigured (/signaled) (period) value (e.g., '100 MS'). Here, for example, the task of (re)selecting a COUNTER value within a predefined (/signaled) range (or task of 'RESETING' the COUNTER value) may be defined as the case that '(ALL) SEMI-PERSISTENTLY SELECTED RESOURCE(S)' related '(RESOURCE(S)) RESELECTION' is triggered. Here, for example, 'C_RANGE' value may be (partially) differently configured (/assumed) according to the following (a part of) parameters. Here, for example, 'C_RANGE' value (according to (specific) parameter range) may be predefined or signaled from a network.

(Example #1) 'V2X UE VELOCITY'. Here, for example, for a faster 'V2X UE VELOCITY' (relatively or than a preconfigured (/signaled) threshold value), (relatively) long (or short) 'C_RANGE' value may be applied.

(Example #2) '(TRANSMISSION) SYNCHRONIZATION REFERENCE TYPE' (e.g., 'eNB', 'GNSS', 'UE'). Here, for example, in the case that '(TRANSMISSION) SYNCHRONIZATION REFERENCE TYPE' is GNSS (or eNB or UE), 'C_RANGE' value (of which '(TRANSMISSION) SYNCHRONIZATION REFERENCE TYPE' is (relatively) longer (or shorter) than that of eNB (or UE or GNSS)) may be applied.

(Example #3) 'V2X MESSAGE TRANSMISSION (and/or GENERATION) PERIODICITY'. Here, for example, for long 'V2X MESSAGE TRANSMISSION (and/or GENERATION) PERIODICITY' (than relatively or than a preconfigured (/signaled) threshold value), (relatively) long (or short) 'C_RANGE' value may be applied.

(Example #4) 'V2X MESSAGE (and/or SERVICE) TYPE' (e.g., 'EVENT-TRIGGERED MESSAGE', 'PERIODIC MESSAGE' (or '(relatively) small LATENCY REQUIREMENT (and/or (relatively) high reliability (/QOS) REQUIREMENT and/or (relatively) high priority) of message', '(relatively) long LATENCY REQUIREMENT (and/or (relatively) low reliability (/QOS) REQUIREMENT and/or (relatively) low priority) of message'). Here, for example, for 'EVENT-TRIGGERED MESSAGE', (relatively) long (or short) (than the case of 'PERIODIC MESSAGE') 'C_RANGE' value may be applied.

(Example #5) 'V2X MESSAGE (and/or SERVICE) PRIORITY (and/or LATENCY REQUIREMENT and/or RELIABILITY REQUIREMENT and/or QOS REQUIREMENT)'. Here, for example, for (relatively) low 'V2X MESSAGE (and/or SERVICE) PRIORITY (and/or LATENCY REQUIREMENT and/or RELIABILITY REQUIREMENT and/or QOS REQUIREMENT)', (relatively) long (or short) 'C_RANGE' value may be applied.

As another example, a V2X TX UE(S) may perform (V2X MESSAGE) transport resource (re)reservation (/selection) operation according to the following (a part of or all) rule. Here, for example, the (corresponding) transport resource (re)reservation (/selection) operation may be (at least) triggered when a (transport resource (re)reservation) counter value (SEL_CNTVAL) randomly selected by the V2X TX UE(S) becomes "0" (and/or "negative integer value"). Here, for example, the (selected) counter value may be reduced as much as a preconfigured (/signaled) value (e.g., "1"), after regarding (/assuming) that transport resources (of resource reservation (interval) period "P") in every (actual) TRANSPORT BLOCK (TB) (/packet) transmission (and/or (without regard to (actual) TB (/packet) transmission) as much as (selected) counter value (/number), whenever the corresponding reserved (/selected) transport resource is passed and/or when there is (to be transmitted or generated (/received)) TB (/packet) is existed on (LOW LAYER) buffer (and/or PDCP LAYER). Here, for example, in the present disclosure, the term "(re)reservation (/selection)" may be (generally) interpreted as (A) in the case that the V2X TX UE(S) re-reserves (/selects) a transport resource (different from previous (or the same) case) based on a sensing result (in the case that the V2X TX UE(S) determines not to maintain (/reuse) the previously selected (transport) resource based on a preconfigured (/signaled) probability value (KEEP_P) (e.g., "STEP 3 described above") (e.g., it is regarded to maintain the previously selected (transport) resource only in the case that the value randomly selected between "0" and "1" is smaller than or equal to KEEP_P) (or without regard to the corresponding probability value (KEEP_P)) and/or (B) the V2X TX UE(S) maintains (/reuses) the previously selected (transport) resource based on a preconfigured (/signaled) probability value (KEEP_P) (or without regard to the corresponding probability value (KEEP_P)) and/or (C) the V2X TX UE(S) reserves (/selects) (again) subframes (or identical (to previous) resource) of a finite number as the same as previously (e.g., interpreted as a value greater (or greater or equal to) than a preconfigured (/signaled) (different) number (e.g., SEL_CNTVAL value (and/or a value induce from SEL_CNTVAL value)). Here, for example, in the case that (generally) "(re)reservation (/selection)" operation is performed, the V2X TX UE(S) may newly (randomly) select (transport resource (re)reservation) counter value (or the previous value (SEL_CNTVAL) (or the remaining value (or preconfigured (/signaled) (other) value) may be succeeded (/maintained/ applied) as the (transport resource (re)reservation) counter value (without newly (randomly) selecting).

(Example #1) For example, when performing (re)reserving (/selecting) a transport resource, after (preferentially) reserving (/selecting) an infinite number of subframes (/resources) (of resource reservation (interval) period "P"), a V2X TX UE(S) may use the (corresponding) reserved (/selected) resource until the transport resource (re)reservation (/selection) operation is triggered. However, for example, in the case that the corresponding rule is applied, "SFN (SYSTEM FRAME NUMBER) WRAP AROUND" problem may be occurred.

Hereinafter, for the convenience of understanding, an example that "SFN (SYSTEM FRAME NUMBER) WRAP AROUND" problem is occurred is described with reference to a drawing.

Figure 22:
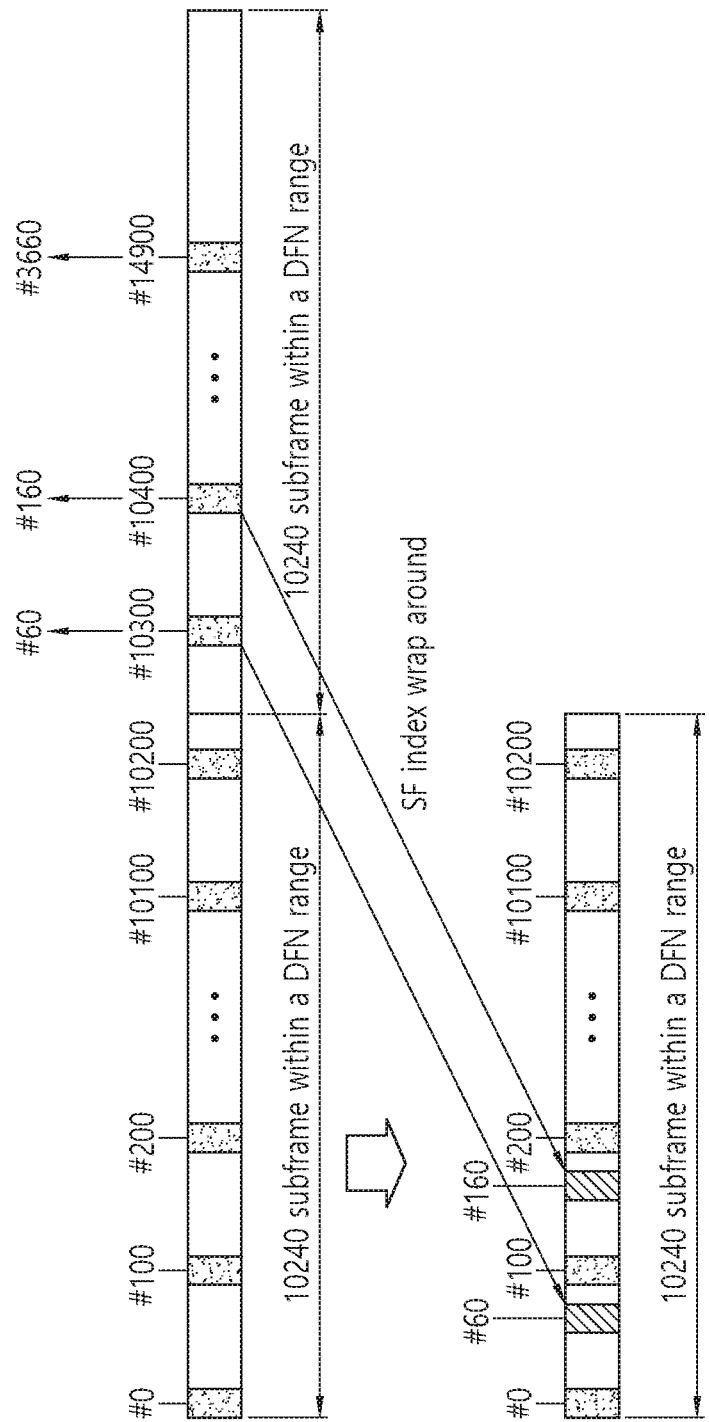
FIG. 22 schematically illustrates an example that "SFN (SYSTEM FRAME NUMBER) WRAP AROUND" problem is occurred.

FIG. 22 schematically illustrates an example that "SFN (SYSTEM FRAME NUMBER) WRAP AROUND" problem is occurred.

Referring to FIG. 22, for example, it is assumed that there is a V2X TX UE #X that is intended to perform transport resource (re)reservation (/selection) in a resource reservation (interval) period of "100 MS" on SUBFRAME #0 timing. Here, for example, it is assumed that all 10240 subframes are configured (/signaled) as V2X resources (pool). Here, for example, in such a case, the V2X TX UE #X selects SUBFRAME #60 (owing to limitation of SFN) in the case of selecting SUBFRAME #0, SUBFRAME #100, . . . , SUBFRAME #10200, and SUBFRAME #10300. As a result, for example, after (all) subframe selection of the V2X TX UE #X is finished, the second transmission occasion is occurred before SUBFRAME #100.

Meanwhile, in order to solve the problem, when performing transport resource (re)reservation (/selection), a V2X TX UE(S) may (preferentially) reserve (/select) subframes (/resources) of a finite number (FINI_SFNUM) (of resource reservation (interval) period "P"). Hereinafter, it is described an example for a UE to reserve a finite number of RESOURCES (i.e., 10*SL_RESOURCE_RESELECTION_ COUNTER) according to a predefined rule, with reference to a drawing.

Figure 23:
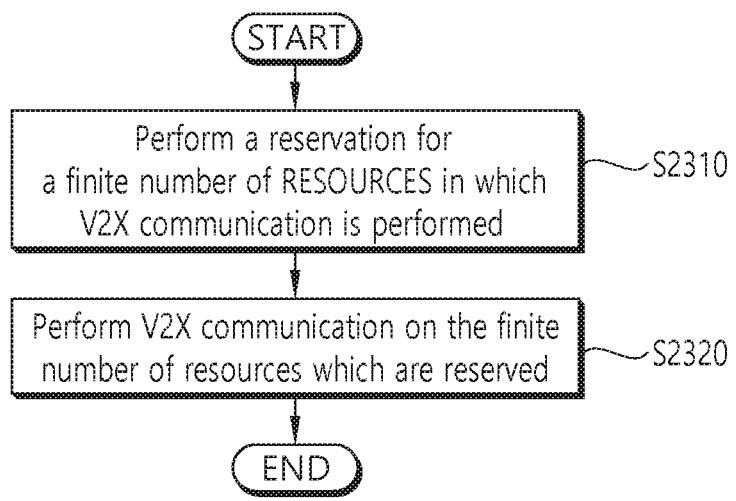
FIG. 23 is a flowchart illustrating a method for reserving a finite number of RESOURCES.

FIG. 23 is a flowchart illustrating a method for reserving a finite number of RESOURCES.

Referring to FIG. 23, a UE may perform a reservation for a finite number of RESOURCES in which V2X communication is performed (step, S2310). The UE may select resources on a selection window and perform a reservation for repeated resources based on a specific period from the selected resources, and in this case, the number of reserved resource(s) may be finite. In this case, the finite number may be proportional to a counter (e.g., SL_RESOURCE_RESELECTION_COUNTE) value which is randomly selected (or determined) by the UE, and the counter value may have a positive integer. In addition, the counter value may have a value of 5 or greater, and the counter value may have a value of 15 or smaller. Furthermore, the finite value may have a value which is ten times of the counter value which is randomly selected by the UE. Hereinafter, it is described an example that the UE reserves a finite number of resources in detail.

The UE may reserve a plurality of resources in which V2X communication is performed, and a plurality of resources which is reserved may have a finite number. When the UE reserves a finite number of resources, a predefined rule (e.g. 10*SL_RESOURCE_RESELECTION_ COUNTER) may be applied.

As a particular example of the predefined rule, the number of subframes in a set of time and frequency resources for PSSCH transmission occasion may be given as a specific value (e.g., $C_{resel}$). In this case, $C_{resel}$ may be defined as 10*SL_RESOURCE_RESELECTION_COUNTER (in the case that a specific counter (e.g., SL_RESOURCE_RESELECTION_COUNTER) is configured), and otherwise (e.g., SL_RESOURCE_RESELECTION_COUNTER) is not configured), $C_{resel}$ may be set to 1. Here, a random value of 5 or greater and 15 or smaller may be configured for SL_RESOURCE_RESELECTION_COUNTER.

For example, in the case that SL_RESOURCE_RESELECTION_COUNTER is 5, the number of subframes reserved for PSSCH transmission may be total 50, and for example, in the case that SL_RESOURCE_RESELECTION_COUNTER is 15, the number of subframes reserved for PSSCH transmission may be total 150.

Here, for example, the (corresponding) finite number may be defined as (A) total number (TNUM_V2XSF) of subframes (/resources) configured (/signaled) as V2X resource (pool) (here, for example, TNUM_V2XSF value may be interpreted as a positive integer value (including "0") which is smaller or equal to 10240) (or "FLOOR (TNUM_V2XSF/ resource reservation (interval) period (P))" (or "CEILING (TNUM_V2XSF/resource reservation (interval) period (P))" or "FLOOR (10240/resource reservation (interval) period (P))" or "CEILING (10240/resource reservation (interval) period (P))") (here, for example, FLOOR (X) and CEILING (X) represent a function of deriving a maximum integer value smaller than or equal to X, and a function of deriving a minimum integer value greater than or equal to X, respectively) or a ((preconfigured (/signaled)) value smaller than TNUM_V2XSF (or 10240) or smaller (or smaller or equal) value) and/or (B) a (preconfigured (/signaled) (specific) value (by a (serving) base station (or network)). Here, for example, the (corresponding) finite number (and/or TNUM_V2XSF value) may be interpreted as greater (or greater or equal) than SEL_CNTVAL value (and/or the (corresponding) finite number (and/or TNUM_V2XSF value) may be interpreted as (a type of) the number of maximum subframes (/resources) that may be reserved (/selected)). Here, for example, through the application of the rule, although the (selected) counter value is a positive integer state, the problem that all the reserved (/selected) subframes (resources) are passing (on time domain) may also be alleviated. Here, for example, the V2X TX UE(S) defines the (corresponding) finite number (e.g., this may be interpreted as (a type of) the number of maximum subframes (/resources) that may be reserved (/selected)), however, in the case that SEL_CNTVAL value (and/or a value induced from SEL_CNTVAL value) is smaller than the (corresponding) finite number, (exceptionally) the V2X TX UE(S) may reserve (/select) subframes (/resources) of the number of SEL_CNTVAL value (and/or value (/number) induced from SEL_CNTVAL value and/or smaller value (/number)).

The UE may perform V2X communication on the finite number of resources which are reserved (step, S2320). The performance of V2X communication on the reserved resources by the UE is as described above.

Meanwhile, the UE does not perform V2X transmission infinitely on the reserved resources. That is, the UE may reselect reserved resources, and as described above, the (corresponding) transport resource (re)reservation (/selection) operation may be triggered (at least) when the (transport resource (re)reservation) counter value (SEL_CNTVAL) that the V2X TX UE(S) randomly selects within a preconfigured (/signaled) range (e.g., "5 to 15") becomes "0" (and/or "negative integer value").

At this time, in the case that the reserved resources are not remained anymore, the V2X UE may perform resource reselection within the selection window. In addition, in the case that the V2X UE does not perform V2X transmission contiguously for 1 second, the V2X UE may perform resource reselection within the selection window, and in the case that the V2X UE does not perform V2X transmission contiguously during a preconfigured number of transmission occasions, the V2X UE may perform resource reselection within the selection window. As an example, although (all of) the (corresponding) finite number of (and/or TNUM_V2XSF number of) reserved (/selected) subframes (/resources) pass (on a time domain) (and/or although preconfigured (/signaled) subframe indexes (e.g., 10240 (or TNUM_V2XSF) pass), in the case that the (selected) counter value does not become "0" (and/or "negative integer value"), the V2X UE performs a transport resource (re) reservation (/selection) operation, but the V2X TX UE(S) may newly (randomly) select (transport resource (re)reservation) counter value (or the previous value (SEL_CNTVAL) (or the remaining value (or preconfigured (/signaled) (other) value) may be succeeded (/maintained/applied) as the (transport resource (re)reservation) counter value (without newly (randomly) selecting).

The detailed example for the UE to reselect a transport resource is described below.

Here, for example, the (corresponding) term "transport resource (re)reservation (/selection)" may be (generally) interpreted as (A) in the case that the V2X TX UE(S) re-reserves (/selects) a transport resource (different from previous (or the same) case) based on a sensing result (in the case that the V2X TX UE(S) determines not to maintain (/reuse) the previously selected (transport) resource based on a preconfigured (/signaled) probability value (KEEP_P) (or without regard to the corresponding probability value (KEEP_P)) and/or (B) the V2X TX UE(S) maintains (/reuses) the previously selected (transport) resource based on a preconfigured (/signaled) probability value (KEEP_P) (or without regard to the corresponding probability value (KEEP_P)) and/or (C) the V2X TX UE(S) reserves (/selects) (again) subframes (or identical (to previous) resource) of a finite number as the same as previously (e.g., interpreted as a value greater (or greater or equal to) than a preconfigured (/signaled) (different) number (e.g., SEL_CNTVAL value (and/or a value induce from SEL_CNTVAL value)).

(Example #2) As an example, (in the case that (Example #1 is applied)) for V2X TX UE #X (e.g., resource reservation (interval) period "P_X"), a determination on whether a transport resource of resource reservation (interval) period "P_Y" reserved (/selected) by V2X TX UE #Y (identified by PSCCH decoding) and the candidate resource that the V2X TX UE #X may reserve (/select) collide (/overlap) (e.g., "STEP 2" described above), when it is assumed (regarded as) that (finite) number (NUM_EXTX) of transmissions assumed (/regarded) by the V2X TX UE #X (on the corresponding candidate resource) are performed (or when it is assumed (regarded as) that the transmissions as much as its own reserved (/selected) the finite number of subframes (/resources) (of resource reservation (interval) period "P_X" is performed), may be determined according to whether collision (/overlap) occurs. Here, as an example (for the case that the corresponding rule is applied), in the case that V2X TX UE #Y identifies that the transport resources on SUBFRAME #(N−10), SUBFRAME #(N+990) are reserved (/selected) with a resource reservation (interval) period of "1000 MS", when V2X TX UE #X performs transport resource (re)reservation (/selection) on SUBFRAME #N (current timing) (with a resource reservation (interval) period of "100 MS"), in order to determine whether the candidate resource (of the same (frequency) position as V2X TX UE #Y) on SUBFRAME #(N+90) (within a preconfigured (/assumed) "(TX RESOURCE) SELECTION WINDOW"), V2X TX UE #X may perform monitoring in the form of "SUBFRAME #(N+90), SUBFRAME #(N+190), SUBFRAME #(N+290), SUBFRAME #(N+390), SUBFRAME #(N+490), SUBFRAME #(N+590), SUBFRAME #(N+690), SUBFRAME #(N+790), SUBFRAME #(N+890)(, SUBFRAME #(N+990))" (and/or "SUBFRAME #(N+(990−100*9)), SUBFRAME #(N+(990−100*8)), SUBFRAME #(N+(990−100*7)), SUBFRAME #(N+(990−100*6)), SUBFRAME #(N+(990−100*5)), SUBFRAME #(N+(990−100*4)), SUBFRAME #(N+(990−100*3)), SUBFRAME #(N+(990−100*2)), SUBFRAME #(N+(990−100))(, SUBFRAME #(N+990))"). Here, for example, in the corresponding form of monitoring, it may be seen that it may be decided (/determined) whether V2X TX UE #X may select the same (frequency) position of candidate resource (SUBFRAME #Z (e.g., "Z=(N+90)")) reserved (/selected) by V2X TX UE #Y (within a preconfigured (/assumed) "(TX RESOURCE) SELECTION WINDOW" according to whether an overlap is occurred between the resource (/subframe) timing that the (corresponding) V2X TX UE #Y (additionally) reserves (/selects) (based on "P_Y") (e.g., "G=(N+990)")) (e.g., may be interpreted as a type of "UPPER BOUND") and SUBFRAME #(Z+P_X*K) (here, for example, "a maximum (integer) M value satisfying the condition that "0≤K≤"(Z+P_X*M)" value is smaller than or equal to "G" value) (and/or whether an overlap is occurred between SUBFRAME #Z and SUBFRAME #(G-P_X*R) (here, for example, a maximum (integer) H value satisfying the condition that "0≤R≤"(G-P_X*H)" value is greater than or equal to a minimum subframe within (preconfigured (/assumed)) "(TX RESOURCE) SELECTION WINDOW"). Here, for example, in the case that the proposed rule (of (Example #2) is applied, it may be interpreted that the number of resources reserved (/selected) by the V2X TX UE(S) may be different from the number of resource that should be anticipated to determine collision (/overlap) (e.g., (Example #2)). Here, as another example (for the case that the corresponding rule is applied), in the case that it is identified that V2X TX UE #Y reserves (/selects) transport resources on SUBFRAME #(N−10), SUBFRAME #(N+990) with a resource reservation (interval) period "1000 MS" (by (SUBFRAME #(N−10) PSCCH decoding), it may be (finally) determined whether the candidate resource (of the (frequency) position the same as V2X TX UE #Y) is selected according to whether the candidate resource (of the (frequency) position the same as V2X TX UE #Y) collides (/overlaps) with the transport resource reserved (/selected) by V2X TX UE #Y (e.g., SUBFRAME #(N+990)), when the transmissions of (finite) number assumed (/regarded) by the V2X TX UE #Y (e.g., "9") (e.g., the corresponding (finite) number may be configured as a (maximum) (integer) value of maximum value of monitoring subframe index does not become greater than the transport resource reserved (/selected) by V2X TX UE #Y (e.g., SUBFRAME #(N+990)) (e.g., SUBFRAME #(N+90), SUBFRAME #(N+190), SUBFRAME #(N+290), SUBFRAME #(N+390), SUBFRAME #(N+490), SUBFRAME #(N+590), SUBFRAME #(N+690), SUBFRAME #(N+790), SUBFRAME #(N+890)) is performed. Here, for example, the corresponding example may be finally selected since it does not collide (/overlap). As an example, NUM_EXTX value and FINI_SFNUM value (refer to (Example #1)) may be independently (/differently) (or identically) configured (/signaled). Here, for example, FINI_SFNUM value may be configured (/signaled) as a common value (or independent value) between V2X UEs (GROUP) (sharing V2X resource pool on the same carrier (/frequency)) (and/or NUM_EXTX value may be configured (/signaled) as independent value (e.g., configured by a higher layer of the UE) (or a common value) between V2X UEs (GROUP) (sharing V2X resource pool on the same carrier (/frequency)).

(Example #3) For example, in the case that a (selected) counter value is decreased by as much as a preconfigured (/signaled) value (e.g., "1") in every (actual) TB (/packet) transmission, in the case that the TB (/packet) to be transmitted to V2X TX UE #M is not present (on (LOW LAYER) buffer (and/or PDCP LAYER)) (for a long time) (and/or in the case that (actual) TB (/packet) transmission is not present), decrease of the (selected) counter value may be stopped, and when the TB (/packet) to be transmitted is present again (after a long time) (and/or when (actual) TB (/packet) transmission is performed), it is regarded (/assumed) that the (corresponding) V2X TX UE #M (since the (selected) counter value is in a positive integer value state) still has the (previously) reserved (/selected) resources, and the V2X TX UE #M uses the (corresponding) resources in properly.

The UE may reselect reserved resources, and as described above, the (corresponding) transport resource (re)reservation (/selection) operation may be triggered (at least) when the (transport resource (re)reservation) counter value (SEL_CNTVAL) that the V2X TX UE(S) randomly selects within a preconfigured (/signaled) range (e.g., "5 to 15") becomes "0" (and/or "negative integer value"). Here, for example, when the UE performs an actual transmission, the UE may decrease the counter value by '1', and the UE may perform resource re-reservation operation when the counter value becomes 0. In other words, in this case, the transport resource re-reservation may be generated (triggered) only in the case that the UE performs actual transmission (on a reserved resource (in advance)).

As described above, the counter value (triggering resource re-reservation) is decreased only in the case that the UE performs actual transmission (on a reserved resource (in advance)), unless the corresponding counter value becomes "0" (and/or "negative integer value") although all reserved (finite) number of resources (in advance) are passed (on a time domain), Deadlock problem may occur (in which resource re-reservation is not triggered eventually).

Accordingly, in order to solve the problem occurred above, hereinafter, a method for performing resource re-reservation (i.e., resource reselection) (even in the case that the counter value does not become "0") with reference to a drawing.

Figure 24:
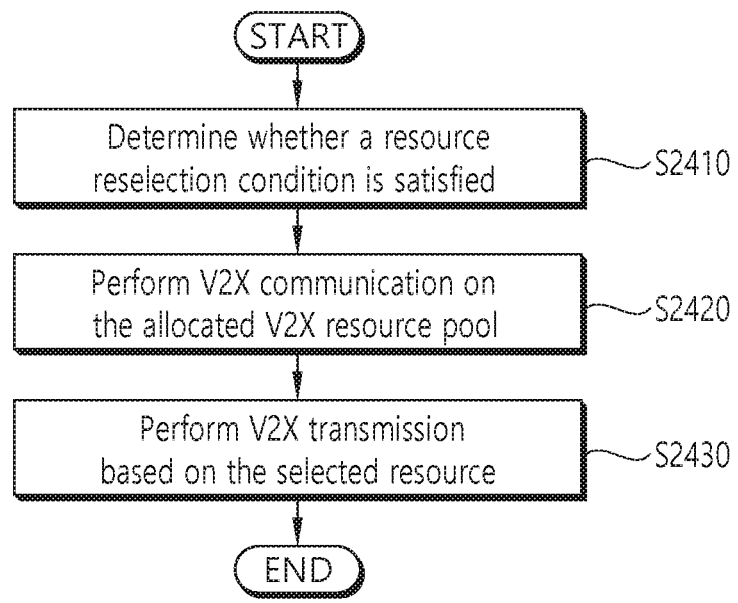
FIG. 24 is a flowchart illustrating a method for a UE to reselect a resource according to an embodiment of the present disclosure.

FIG. 24 is a flowchart illustrating a method for a UE to reselect a resource according to an embodiment of the present disclosure.

Referring to FIG. 24, a UE determines whether a resource reselection condition is satisfied (step, S2410). A plurality of resource reselection conditions may be present. In the case that the UE satisfies at least one of a plurality of resource reselection conditions, the UE may perform a resource reselection. Here, for example, (in order to solve the problem) in the case that a TB (/packet) to be transmitted with a preconfigured (/signaled) threshold (time) value or greater is not present (on (LOW LAYER) buffer (and/or PDCP LAYER)) (and/or (actual) TB (/packet) transmission is not performed (contiguously)) (and/or (current) subframe index exceeds 10240 (or TNUM_V2XSF) value and/or (all of) (finite number of) subframes (/resources) pass (on a time domain) reserved (/selected) by V2X TX UE #M itself), the V2X TX UE #M (of which (selected) counter value is in a positive integer state) performs a transport resource (re) reservation (/selection) operation, but the V2X TX UE #M may newly (randomly) select (transport resource (re)reservation) counter value (or the previous value (SEL_CNTVAL) (or the remaining value (or preconfigured (/signaled) (other) value) may be succeeded (/maintained/ applied) as the (transport resource (re)reservation) counter value (without newly (randomly) selecting).

In summary, the resource reselection condition of UE may include (A) a case that the resource for V2X transmission is no more remained (e.g., as described above 'the case that (all of) its own reserved (/selected) subframes (/resources) pass'), (B) a case that the UE does not perform a packet transmission during a contiguous 1 second (e.g., as described above 'the case that (contiguous) TB (/packet) transmission is not performed more than a preconfigured (/signaled) threshold time value), (C) a case that the UE skips a preconfigured number of contiguous transmission occasions (e.g., as described above 'the case that (contiguous) TB (/packet) transmission is not performed more than a preconfigured (/signaled) threshold value). Hereinafter, it is described a particular example of the resource reselection condition described above.

(A) The case that the resource for V2X transmission is no more remained

In the case that a resource related to a configured Sidelink grant is no more remained, the UE may perform the resource reselection. That is, in the case that a resource related to a configured Sidelink grant is no more remained and there is new MAC PDU to be transmitted to the UE, the resource reselection may be triggered (i.e., in the case described above, the UE may perform the resource reselection).

As an example, although (all of) the (corresponding) finite number of (and/or TNUM_V2XSF number of) reserved (/selected) subframes (/resources) pass (on a time domain) (and/or although preconfigured (/signaled) subframe indexes (e.g., 10240 (or TNUM_V2XSF) pass), in the case that the (selected) counter value does not become "0" (and/or "negative integer value"), the V2X UE performs a transport resource (re)reservation (/selection) operation, but the V2X TX UE(S) may newly (randomly) select (transport resource (re)reservation) counter value (or the previous value (SEL_CNTVAL) (or the remaining value (or preconfigured (/signaled) (other) value) may be succeeded (/maintained/ applied) as the (transport resource (re)reservation) counter value (without newly (randomly) selecting).

(B) The case that the UE does not perform a packet transmission during a contiguous 1 second In the case that a transmission or retransmission is not performed (by MAC entity) on a resource indicated in a configured Sidelink grant for 1 second, the UE may perform the resource reselection. That is, the UE does not perform a transmission or retransmission on a contiguous transmission occasion of 1 second, the resource reselection may be triggered.

(C) The case that the UE skips a preconfigured number of contiguous transmission occasions In the case that a preconfigured value is configured for a UE and the number of unused transmission occasions (on a resource indicated by a configured Sidelink grant) is the same as the preconfigured value, the UE may perform the resource reselection. In other words, in the case that a specific value is configured for the UE and the UE skips the preconfigured number of contiguous transmission occasions, the UE may perform the resource reselection.

That is, in the case that N (here, N is a positive integer) contiguous transmission occasions is skipped for the UE, the resource reselection may be triggered. Here, in the case that the condition is used, the N is configured for the UE, and the N may have a value of [1, 2, 3, 4, 5, 6, 7, 8, 9].

For example, in the case that '5' contiguous transmission occasions is skipped for the UE, in the case that the UE is configured to perform the resource reselection, the UE may perform the resource reselection when the UE does not perform a transmission during 5 contiguous transmission occasions.

Later, the UE may perform a reselection for a resource in which V2X transmission is performed in the case that the resource reselection condition is satisfied (step, S24030). In other words, in the case that the resource reselection condition is satisfied, the UE may reselect the resource in which V2X transmission is performed, and later, the UE may perform V2X transmission on the selected resource. For example, as described above, the UE may reselect a resource in which V2X transmission is performed in (A) a case that the resource for V2X transmission is no more remained (e.g., as described above 'the case that (all of) its own reserved (/selected) subframes (/resources) pass'), (B) a case that the UE does not perform a packet transmission during a contiguous 1 second (e.g., as described above 'the case that (contiguous) TB (/packet) transmission is not performed more than a preconfigured (/signaled) threshold time value), (C) a case that the UE skips a preconfigured number of contiguous transmission occasions (e.g., as described above 'the case that (contiguous) TB (/packet) transmission is not performed more than a preconfigured (/signaled) threshold value), and the UE may perform V2X transmission on the selected resource.

Next, the UE may perform V2X transmission based on the selected resource (step, S2430). Here, as described above, the selected resource may mean a resource determined based on SELECTION WINDOW configured within a range of satisfying LATENCY REQUIREMENT (i.e., a resource on a selection window satisfying LATENCY REQUIREMENT). In addition, as described above (or below), the UE may select a subframe within a selection window based on the sensing result performed during the UE-specific sensing duration, and the UE may determine transmission reservation resources based on the selected subframe and perform V2X communication based on the selected resource. Since the particular example that the UE performs V2X communication based on the selected resource is as described above (or below), the detailed description is omitted.

Here, for example, the (corresponding) term "transport resource (re)reservation (/selection)" may be (generally) interpreted as (A) in the case that the V2X TX UE(S) re-reserves (/selects) a transport resource (different from previous (or the same) case) based on a sensing result (in the case that the V2X TX UE(S) determines not to maintain (/reuse) the previously selected (transport) resource based on a preconfigured (/signaled) probability value (KEEP_P) (or without regard to the corresponding probability value (KEEP_P)) and/or (B) the V2X TX UE(S) maintains (/reuses) the previously selected (transport) resource based on a preconfigured (/signaled) probability value (KEEP_P) (or without regard to the corresponding probability value (KEEP_P)) and/or (C) the V2X TX UE(S) reserves (/selects) (again) subframes (or identical (to previous) resource) of a finite number as the same as previously (e.g., interpreted as a value greater (or greater or equal to) than a preconfigured (/signaled) (different) number (e.g., SEL_CNTVAL value (and/or a value induce from SEL_CNTVAL value)).

(Example #4) As an example, in the case that (when a V2X TX UE #U performs its own transport resource (re) reservation (/selection) and/or identifies subframe (/resource) position selected (/reserved) by other V2X TX UE #Z) (reservation (/selection)) subframes (/resources) of a finite (/infinite) number of a resource reservation (interval) period "P" exceeds (previous)$10240^{th}$ subframe (e.g., "$Z^{th}$" subframe (here, for example, "Z" is a positive integer value greater than "10240"), it may be regarded (/assumed) that a subframe (/resource) is reserved (/selected) with the resource reservation (interval) period "P" (again) from "MOD (Z, 10240) (here, for example, MOD (X, Y) represents a function of deriving a remainder value when X is divided by Y)$^{th}$" subframe.

(Example #5) As an example, (for (Example #1) and/or (Example #2) and/or (Example #3) and/or (Example #4)) (for a V2X UE(S)) a reservation (/selection) itself (of finite (/infinite) number of subframe (/resource)) is performed while departing a SFN range (or TNUM_V2XSF range) (with being SFN WRAP AROUNDED), but the V2X UE(S) may operate in the form of excluding (SKIPPING) a strange (timing of) subframe (/resource) (from a valid transmission subframe (/resource)) while keeping its own resource reservation (interval) period "P" (and/or in the form of performing (finite (/infinite) number of subframe (/resource)) reservation (/selection) with elongating the SFN range (or TNUM_V2XSF range) autonomously).

(Example #7) As an example, the following description represents a method for supporting an efficient (V2X MESSAGE (/TB) transmission operation of a V2X TX UE(S). Here, the UE may reserve 10*C subframes with the resource reservation interval P, and in this case, C may mean SL_RESOURCE_RESELECTION_COUNTER which is determined by MAC.

(A) As also mentioned above, the case that the UE reserves 10*C subframes with the resource reservation interval P may have the following two problems, mainly.

First, The UE reserves a finite number of subframes but SL_RESOURCE_RESELECTION_COUNTER decrements only after a MAC PDU is transmitted. Thus, in the case that a higher layer stops generating packets for a specific time duration and the UE skips transmissions in many reserved subframes, the UE runs out of reserved resources and no resource remains for the transmission of newly arrived packets.

In addition, in the case that the time range of the set of reserved subframes exceeds the DFN (D2D FRAME NUMBER) range (i.e., $10*C*P>T_{max}$ which is 10240 or 10176), the subframe number may not be divided by 100 in the second DFN range (i.e., a remainder may occur when the subframe number is divided by 100).

For example, as in the case of FIG. 22, in the case that a V2V subframe has an index range of 10240, when the UE reserves subframes for index {0, 100, . . . , 10200, 10300, . . . 14900}, since the subframe number from 10300 to 14900 corresponds to a range exceeding the DFN range, subframe for {0, 100, . . . , 10200, 60, 160, . . . , 3660} may be actually reserved.

(B) Therefore, hereinafter, it is provided a method for solving the two problems described above.

First, in order to solve the first problem, in the case that the UE has no more reserved resource but SL_RE- SOURCE_RESELECTION_COUNTER is still greater than zero, the UE may extend the resource reservation.

In order to solve the second problem, the number of reserved subframes may be independently configured from the counter number. Furthermore, the number of reserved subframes may be configured as smaller than the counter value. For example, the UE may reserve a set of subframes until the boundary of the current DFN range when resource reservation is triggered.

Figure 25:
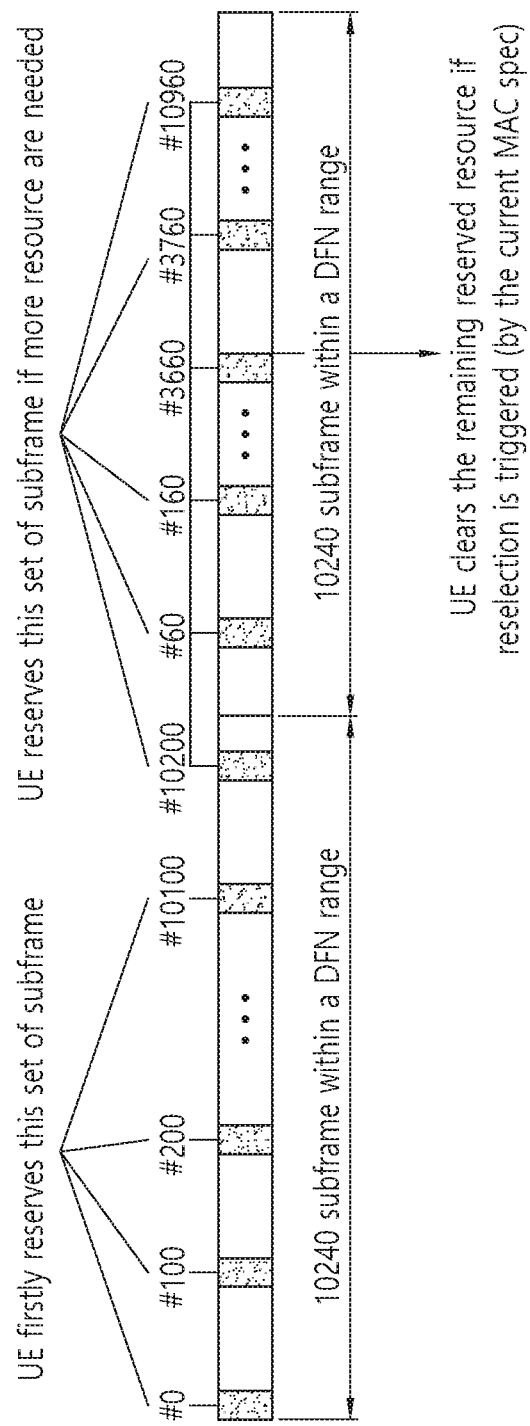
FIG. 25 illustrates an example of a method for performing resource reservation considering the proposal described above.

FIG. 25 illustrates an example of a method for performing resource reservation considering the proposal described above.

Referring to FIG. 25, considering two proposals described above together, a UE may determine a set of subframes which are ended before DFN boundary and repeat resource reservation in the same resource reservation interval, if more resources are required.

(C) The proposal described above is summarized as below.

Proposal 1: A UE has no more reserved resource, but SL_RESOURCE_RESELECTION_COUNTER is still greater than zero, the UE may extend the resource reservation.

Proposal 2: When resource reservation is triggered, a UE may reserve a set of subframes until the boundary of the current DFN range.

An example for transport resource (re)reservation (/selection) operation of a V2X TX UE(S) may be represented as Table 2 below.

TABLE 2

2. Content for transport resource (re)reservation (/selection) operation of a V2X TX UE(S)
2.1. UE procedure for determining subframes and resource blocks for transmitting PSSCH (Physical Sidelink Shared CHannel) and reserving resources
for sidelink transmission mode 4
The number of subframes in one set of the time and frequency resources for
transmission opportunities of PSSCH is given by $C_{resel}$. In this case, $C_{resel}$ is
set, it is given that $C_{resel} =$
[10*SL_RESOURCE_RESELECTION_COUNTER], and otherwise (i.e., in this case, $C_{resel}$ is not set, $C_{resel}$ may be set to 1.
In the case that a set of sub-channels in subframe $t_m^{SL}$ is determined as the
time and frequency resource for PSSCH transmission corresponding to the configured sidelink grant, the same set of sub-channels in subframes
$t_{m+P_{rsvp}*j}^{SL}$ may also be determined for PSSCH transmissions corresponding to
the same sidelink grant. Here, j = 1, 2, . . . , and $C_{resel} - 1$, $P_{rsvp}$ may be the
resource reservation interval determined by higher layers.
2.2. UE procedure for transmitting the PSCCH
For sidelink transmission mode 4, a UE may configure the content for SCI format 1 as below.
In the case that SL_RESOURCE_RESELECTION_COUNTER is greater than 1, the UE set the Resource reservation field to the Resource reservation
interval determined by higher layers divided by $P_{step}$. Here, $P_{step} = 100$. Otherwise, the UE set the Resource reservation field to zero.
2.3. UE procedure for determining the subset of resources to be excluded in
PSSCH resource selection in sidelink transmission mode 4
When requested by higher layers in subframe n, the UE determines the set of
resources to be excluded in PSSCH transmission according to the following
steps. Higher layers may determine the parameters $L_{subCH}$ the number of subchannels to be used for the PSSCH transmission in a subframe, $P_{rsvp\_TX}$ the TABLE 2-continued resource reservation interval determined by higher layers, $prio_{TX}$ the priority
to be transmitted in the associated SCI format 1 by the UE.
STEP 1) A candidate single-subframe resource for PSSCH transmission $R_{x, y}$
may be defined as a set of $L_{subCH}$ contiguous sub-channels with sub-channel
x + j in subframe $t_y^{SL}$. Here, j = 0, . . . , $L_{subCH} - 1$.
STEP 2) The UE monitors subframes n-1001, n-1000, n-999, . . . , n-2 except
for those in which its transmissions occur. The UE may perform the operation
in the following STEPs based on PSCCH decoded and S-RSSI measured in
the monitored subframes.
STEP 3) The parameter $Th_{a, b}$ may be set to the value indicated by the i-th SL-
ThresPSSCH-RSRP field in SL-ThresPSSCH-RSRP-List-r14. In this case,
i = a * 8 + b + 1.
STEP 4) The set $S_A$ may be initialized to the union of all the candidate single-
subframe resources. The set $S_B$ may be initialized to an empty set.
STEP 5) The UE excludes any candidate single-subframe resource $R_{x, y}$ from
the set $S_A$ in the case that the following conditions are satisfied.
The UE may receive an SCI format 1 in subframe $t_m^{SL}$. And, 'Resource
reservation' field and 'Priority' field in the received SCI format 1 may
indicate the values $P_{rsvp\_RX}$ and $prio_{RX}$, respectively.
PSSCH-RSRP measurement according to the received SCI format 1 may be
greater than $Th_{prio_{TX}, prio_{RX}}$.
The same SCI format 1 which is assumed to be received in subframe
$t_{m+P_{step}\cdot P_{rsvp\_RX}}^{SL}$ may determine according to the set of resource blocks and
subframes which overlaps with $R_{x, y+P_{rsvp\_TX}*j}$ for j = 0, 1, . . . , for $C_{resel} - 1$.
STEP 6) In the case that the number of candidate single-subframe resources
remaining in the set $S_A$ is smaller than $0.2 \cdot M_{total}$, then STEP 4 may be
repeated with $Th_{a, b}$ increased by 3 dB.
STEP 7) For a candidate single-subframe resource $R_{x, y}$ remaining in the set
$S_A$, the metric $E_{x, y}$ may be defined as the linear average of S-RSSI measured
in sub-channels x + k for k = 0, . . . , $L_{subCH} - 1$ in the monitored subframes in
STEP 2.
STEP 8) The UE may move the candidate single-subframe resource $R_{x, y}$ with
the smallest metric $E_{x, y}$ from the set $S_A$ to $S_B$. This step may be repeated
STEP 9) The set $S_C$ may be defined as the set of all the candidate single-
subframe resources not included in the set $S_B$.

(Example #6) As an example, a V2X TX UE(S) may perform transport resource (re)reservation (/selection) operation according to Table 2 (e.g., "STEP 2/3" described above (or below)). Here, for example, "RESOURCE RESERVATION FIELD (RR_FIELD)" value on SCI format may be designated as a quotient (/value) (I_VALUE) of (preconfigured (/signaled) from (UE) higher layer) "RESOURCE RESERVATION INTERVAL (RR_INV)" divided by a preconfigured (/signaled) (P_STEP) (e.g., "P_STEP=100"). Here, for example, the I_VALUE value may be configured (/signaled) in the range of (maximum) "1≤I_VALUE≤10". Here, for example, whether a specific I_VALUE is selectable (/allowable) may be designated in the form of "CARRIER(/POOL)-SPECIFIC NETWORK (PRE)CONFIGURATION" (through a predefined signaling (e.g., $X^{th}$ bit on 10-BIT BITMAP indicates whether $X^{th}$ I_VALUE is selectable (/allowable)). Here, for example, the selection limitation of a specific I_VALUE value may be interpreted as (A) RR_INV value of "I_RESVAL*P_STEP" is unable to be configured (/signaled) (by (UE) higher layer) and/or (B) other I_VALUE (not I_RESVAL) should be configured (/signaled), which may express a value which is closest to a (actually) desired RR_INV value (by (UE) higher layer).

Meanwhile, in the case that a transmission is performed while a UE performs sensing (in a sensing window), that is, for a subframe in which V2X transmission is performed in a sensing window, (owing to half-duplex problem) the UE may not perform sensing. At this time, on the subframe in which the UE is unable to perform sensing and the subframe corresponding to specific periods, in the case that the UE performs V2X message transmission, it may be caused a result that the UE transmits V2X message based on the subframe in which the UE is unable to perform sensing.

Accordingly, hereinafter, in order to solve the problem that the UE transmits V2X message based on the subframe in which the UE is unable to perform sensing, a method for excluding a subframe (in a selection window) related to the subframe in which the UE is unable to perform sensing is provided with reference to a drawing.

Figure 26:
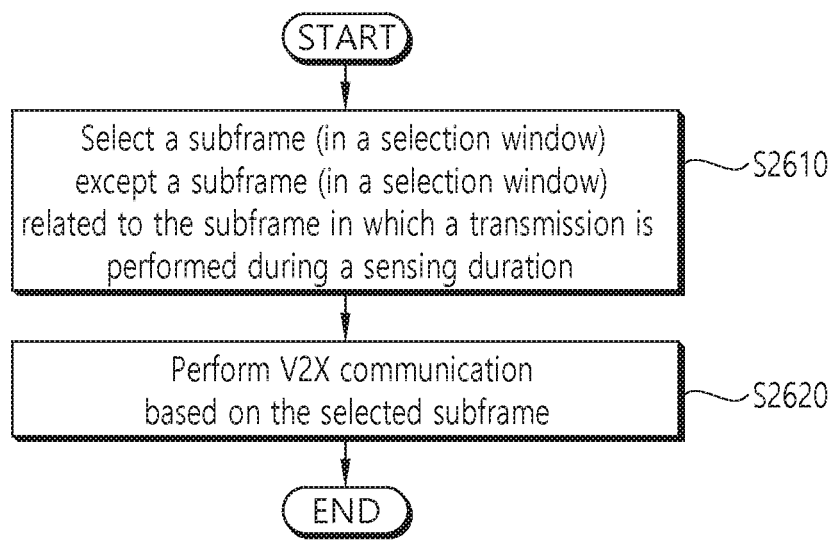
FIG. 26 is a flowchart illustrating a method for excluding a subframe (in a selection window) related to the subframe in which the UE is unable to perform sensing according to an embodiment of the present disclosure.

FIG. 26 is a flowchart illustrating a method for excluding a subframe (in a selection window) related to the subframe in which the UE is unable to perform sensing according to an embodiment of the present disclosure.

Referring to FIG. 26, a UE selects a subframe (in a selection window) except a subframe (in a selection window) related to the subframe in which a transmission is performed during a sensing duration (step, S2610). In other words, the UE may exclude a subframe in a selection window related to the subframe in which a transmission is performed during a sensing duration among a plurality of subframes in the selection window and select subframe except the excluded subframe in the selection window among a plurality of subframes.

Here, in the case that the UE selects the subframe in the selection window, the subframe in a selection window related to the subframe in which a transmission is performed during a sensing duration may mean the subframe in which a subframe according to a resource reservation period of the selected subframe is overlapped with the subframe in which the UE is unable to perform sensing and the subframe corresponding to specific periods. For the convenience of description, the contents are described with reference to a drawing as below.

Figure 27:
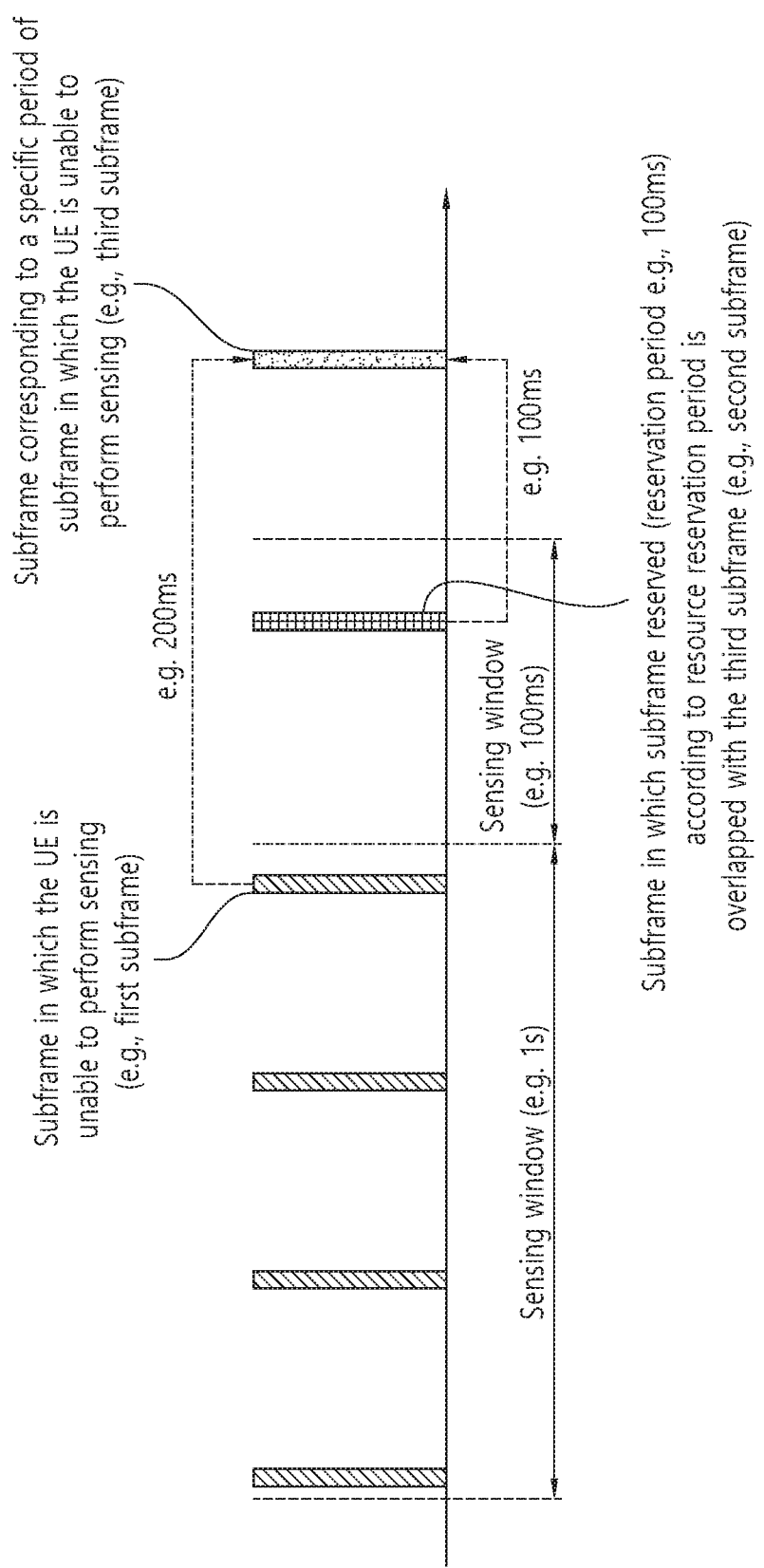
FIG. 27 illustrates an example of excluding a subframe (in a selection window) related to the subframe in which the UE is unable to perform sensing.

FIG. 27 is a flowchart illustrating an example of excluding a subframe (in a selection window) related to the subframe in which the UE is unable to perform sensing.

Referring to FIG. 27, for example, a first subframe may mean a subframe in which the UE is unable to perform sensing. It may be assumed that a subframe corresponding to a specific period of the first subframe is a third subframe.

Here, when a second subframe is selected in a selection window, in the case that there is a plurality of subframes reserved according to a resource reservation period for the selected second subframe, and one (or multiple) number of subframe among the reserved subframes is overlapped with the third subframe, the UE may not select the second subframe in the selection window (i.e., may exclude the selection).

Returning to FIG. 26 and when this is generalized, for example, in the case that the UE fails to perform sensing (since V2X message transmission is performed) in subframe #k (within the sensing window), and subframe #(y+P*j) and subframe #(k+100*i) are overlapped, the UE may exclude subframe #y within the selection window from resource reservation selection. Here, as described above, subframe #k may correspond to the subframe in which the UE is unable to perform sensing, and subframe #y may mean the subframe within the selection window. In addition, the P may mean a resource reservation period of the UE, for example, the P may have a value of 100 ms. The j may mean a value of 0, 1, 2, . . . , $C_{-resel}$−1, and $C_{-resel}$ may mean a value to which a specific counter value is proportional (e.g., 10*SL_RESOURCE_RESELECTION_COUNTER) as described above. Since the content for the specific counter (i.e., SL_RESOURCE_RESELECTION_COUNTER) is as described above, detailed description is omitted. Furthermore, i may mean an element in the set limited by a carrier-specific configuration. That is, i may mean a value for a base station to allow reservation and mean a value associated with a specific period (e.g., in the case that i is 2, the specific period (e.g., 1 hop) may be 100*i=200 ms). In this case, i may have a value of 2, 4, 6 and 8, for example.

Here, for example, in STEP 5 described in Table 2, in the case that SUBFRAME #($T_M^{SL}$) is unable to be monitored by its own V2X message transmission operation in STEP 2 (and/or in the case that other V2X TX UE(S) related PSCCH decoding and (the associated) PSSCH DM-RS RSRP (and/or S-RSSI) measurement operation are unable to be performed on SUBFRAME #($T_M^{SL}$)), and in the case that $R_{X,Y+RR\_INVTX*j}$ is overlapped with SUBFRAME #($T_{M+I\ CANVAL*P\ STEP}^{SL}$)(and/or (a part of) resource(s) that may be selected (/reserved) by other V2X TX UE(S) on SUBFRAME #($T_{M+I\ CANVAL*P\ STEP}^{SL}$)), a V2X TX UE(S) may exclude $R_{X,Y}$ from $S_A$ set (additionally). Here, for example, "j" value may be defined in the form of "0, 1, . . . , ($C_{RESEL}$−1) (refer to Table 2)". Here, for example, "RR_INVTX" may mean its own "RESOURCE RESERVATION INTERVAL" value (configured (/signaled) from a higher layer), and "I_CANVAL" may be (limitedly) interpreted as a value(s) belonged to "I_VALUE SET" which is selectable (/allowable) designated in the "CARRIER(/POOL)-SPECIFIC NETWORK (PRE)CONFIGURATION" form (in advance). Here, for example, in the case that the rule is applied, (since a resource that the V2X TX UE(S) is unable to monitor with its own V2X message transmission operation in STEP 2 (e.g., SUBFRAME #($T_M^{SL}$)) is occurred) when determining whether to exclude $R_{X,Y}$ from $S_A$ set (additionally), (on a specific carrier (/pool)) it may be interpreted that only (actually) selectable (/allowable) "I_VALUE SET" (and/or "RESOURCE RESERVATION INTERVAL") is considered.

Later, the UE may perform V2X communication based on the selected subframe (step, S2620). Here, as described above, the selected subframe (or resource) may mean a resource determined based on SELECTION WINDOW configured within the range that satisfies LATENCY REQUIREMENT (i.e., a resource on the SELECTION WINDOW that satisfies LATENCY REQUIREMENT). In addition, as described above (or below), the UE may select a subframe within the SELECTION WINDOW based on the sensing result performed during a UE-specific sensing duration, and the UE may determine transport reservation resources based on the selected subframe and perform V2X communication on the reserved resource. As described above, the performance of V2X communication on the reserved resources by the UE means the case that the UE is associated with the selected subframe and performs V2X communication based on the selected subframe. Since a particular example that the UE performs V2X communication based on the selected resource is as described above (or below), the detailed description is omitted.

Here, as another example, in STEP 5 described in Table 2, in the case that SUBFRAME #($T_M^{SL}$) is unable to be monitored by its own V2X message transmission operation in STEP 2 (and/or in the case that other V2X TX UE(S) related PSCCH decoding and (the associated) PSSCH DM-RS RSRP (and/or S-RSSI) measurement operation are unable to be performed on SUBFRAME #($T_M^{SL}$)), and in the case that $R_{X,Y+RR\_INVTX*j}$ is overlapped with SUB- FRAME #($T_{M+I\_CANVAL\_X*P\_STEP}^{SL}$)(and/or (a part of) resource(s) that may be selected (/reserved) by other V2X TX UE(S) on SUBFRAME #($T_{M+I\_CANVAL\_X*P\_STEP}^{SL}$)), a V2X TX UE(S) may exclude $R_{X,Y}$ from $S_A$ set (additionally). Here, as an example, "I_CANVAL" may be configured (/signaled) as a maximum (or minimum value or specific value) among a value(s) belonged to "I_VALUE SET" which is selectable (/allowable) designated in the "CARRIER(/POOL)-SPECIFIC NETWORK (PRE)CONFIGURATION" form (in advance). Here, as another example, in STEP 5 described in Table 2, in the case that SUBFRAME #($T_{Y-I\_CANVAL*P\_STEP}^{SL}$) is unable to be monitored by its own V2X message transmission operation in STEP 2 (and/or in the case that other V2X TX UE(S) related PSCCH decoding and (the associated) PSSCH DM-RS RSRP (and/or S-RSSI) measurement operation are unable to be performed on SUBFRAME #($T_{Y-I\_CANVAL*P\_STEP}^{SL}$)), a V2X TX UE(S) may exclude $R_{X,Y}$ from $S_A$ set (additionally). Here, as an example, it may be defined as "(N−1001)≤(Y−I_CANVAL*P_STEP)≤(N−2)" (here, for example, SUBFRAME #N timing may be interpreted as a timing when a (transport) resource (re)reservation (/selection) performance is configured (/signaled) (from a higher layer)) (and/or "P_STEP=100"). Here, as another example, in STEP 5 described in Table 2, in the case that SUBFRAME #($T_{Y-I\_CANVAL\_Q*P\_STEP*K}^{SL}$) is unable to be monitored by its own V2X message transmission operation in STEP 2 (and/or in the case that other V2X TX UE(S) related PSCCH decoding and (the associated) PSSCH DM-RS RSRP (and/or S-RSSI) measurement operation are unable to be performed on SUBFRAME #($T_{Y-I\_CANVAL\_Q*P\_STEP*K}^{SL}$)), a V2X TX UE(S) may exclude $R_{X,Y}$ from $S_A$ set (additionally). Here, as an example, it may be defined as "(N−1001)≤(Y−I_CANVAL_Q*P_STEP*K)≤(N−2)" (here, for example, SUBFRAME #N timing may be interpreted as a timing when a (transport) resource (re)reservation (/selection) performance is configured (/signaled) (from a higher layer)) (and/or "P_STEP=100"). Here, as an example, "I_CANVAL" may be configured (/signaled) as a maximum (or minimum value or specific value) among a value(s) belonged to "I_VALUE SET" which is selectable (/allowable) designated in the "CARRIER(/POOL)-SPECIFIC NETWORK (PRE)CONFIGURATION" form (in advance) (and/or a value(s) belonged to "I_VALUE SET" which is selectable (/allowable)). Here, as an example, in the case that the (part of) rule is applied, when it is determined whether $R_{X,Y}$ is excluded from $S_A$ set (additionally), (A) J value may be assumed to a preconfigured (/signaled) specific value(s) only (e.g., J value in which "J=1(/0)") (and/or "RR_INVTX*J" (or "P_STEP*J") becomes equal to (actually) selectable (/allowable) maximum (or minimum) "RESOURCE RESERVATION INTERVAL" (or a preconfigured (/signaled) specific "RESOURCE RESERVATION INTERVAL") and/or (B) RR_INVTX may be assumed to a preconfigured (/signaled) specific value(s) (e.g., "RR_INVTX=1000 MS") (and/or on (a specific carrier (/pool)) (actually) selectable (/allowable) maximum (or minimum) "RESOURCE RESERVATION INTERVAL" (or a value(s) which is smaller (or greater) than or equal to the corresponding maximum (or minimum) "RESOURCE RESERVATION INTERVAL"). Here, as an example, the proposed method may be limitedly applied only to the case that a priority value related to a message (/packet) to be transmitted by a V2X TX UE(S) (and/or CONGESTION LEVEL related to the (corresponding) carrier (/pool)) is smaller (or greater) than a preconfigured (/signaled) threshold value.

(Example #8) As an example, a method for V2X UE(S) to reflect a resource (/subframe) which is unable to be monitored (/sensed) owing to its own transmission operation efficiently in "RESOURCE EXCLUSION PROCEDURE (BASED ON PSSCH-RSRP MEASUREMENT)" is as below.

It may be hard to obtain the exact information of PSSCH-RSRP on the skipped subframe #k, when the single transmission of TB is performed by other UEs in the subframe #k. Accordingly, in the case that the subframe #(y+P*j) is overlapped with subframe #(k+100*i), it may be considered that UE #A may exclude subframe #k existed within its own selection window. In this case, as described above, P may mean the resource reservation interval of UE, and j may mean 0, 1, (10*SL_RESOURCE_RESELECTION_COUNTER−1). Further, i may mean (available) element in the set restricted by carrier-specific network (pre)configuration.

(Here, for example, "100" value on "SUBFRAME #(K+100*I)" may be designated as (preconfigured (/signaled)) different value (A) in the case that SHORTP_UE(S) performs sensing operation and/or (B) in the case that LONGP_UE(S) performs sensing operation (for SHORTP_UE(S)) (when V2X UE(S) of "SHORTER RESOURCE RESERVATION PERIOD(/INTERVAL)" (and/or V2X UE(S) performing V2X message (/traffic) transmission of (relatively) short period) (SHORTP_UE(S)) and V2X UE(S) of "(RELATIVELY) LONGER RESOURCE RESERVATION PERIOD(/INTERVAL)" (and/or V2X UE(S) performing V2X message (/traffic) transmission of (relatively) long period) (LONGP_UE(S)) are coexisted on a preconfigured (/signaled) (specific) resource pool).

Together with the approach method described above, the UE #A may exclude all the resources (within its own selection window) which is overlapped with other UE's transmission possibly scheduled from the skipped subframe #k. Hereinafter, this is described with reference to a drawing.

Figure 28:
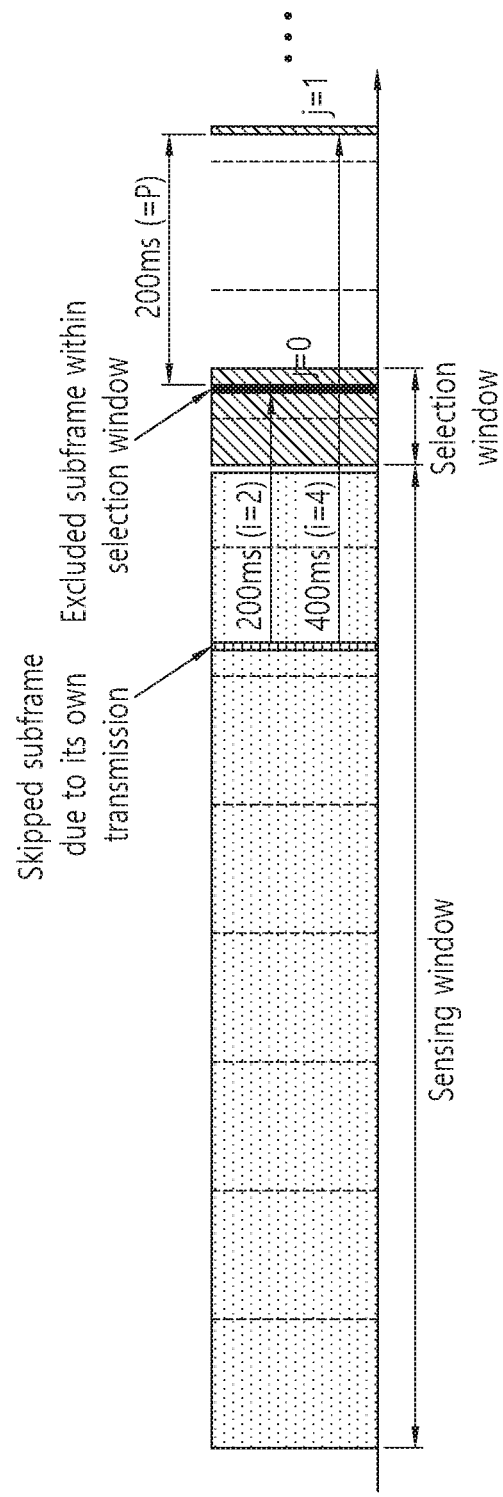
FIGS. 28 to 30 illustrate an example that it is reflected in "RESOURCE EXCLUSION PROCEDURE (BASED ON PSSCH-RSRP MEASUREMENT)".
Figure 29:
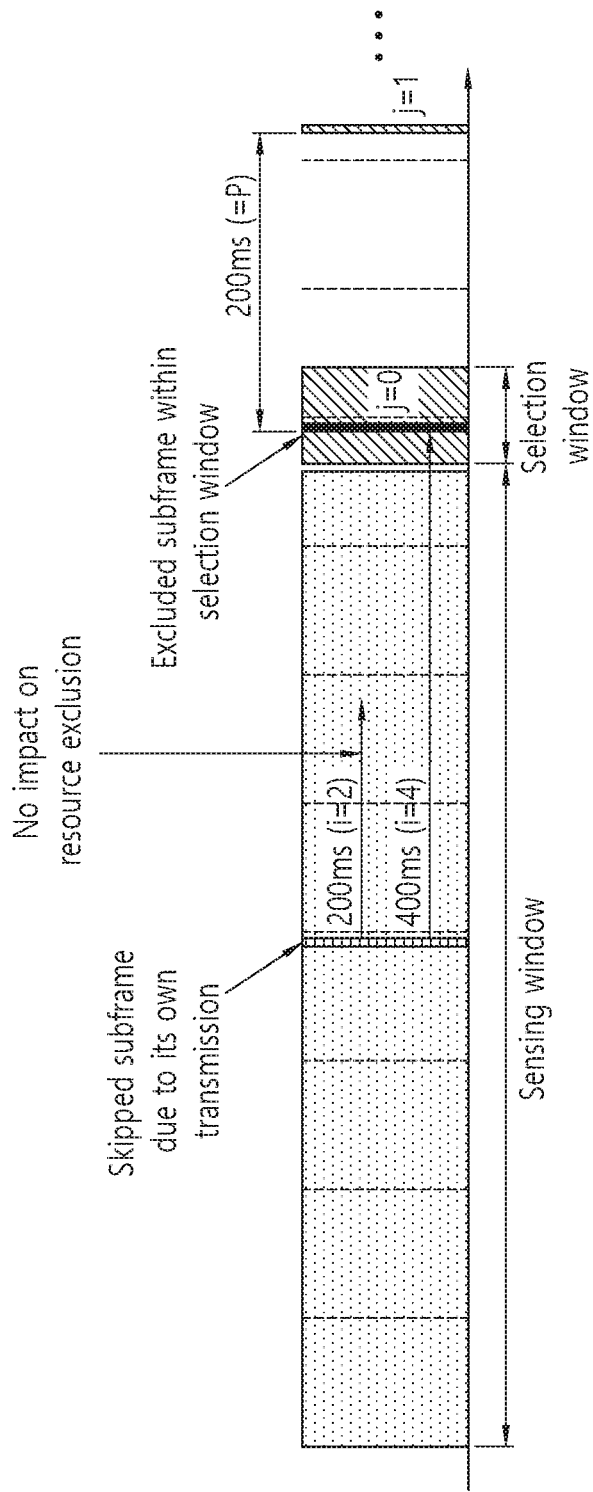
Figure 30:
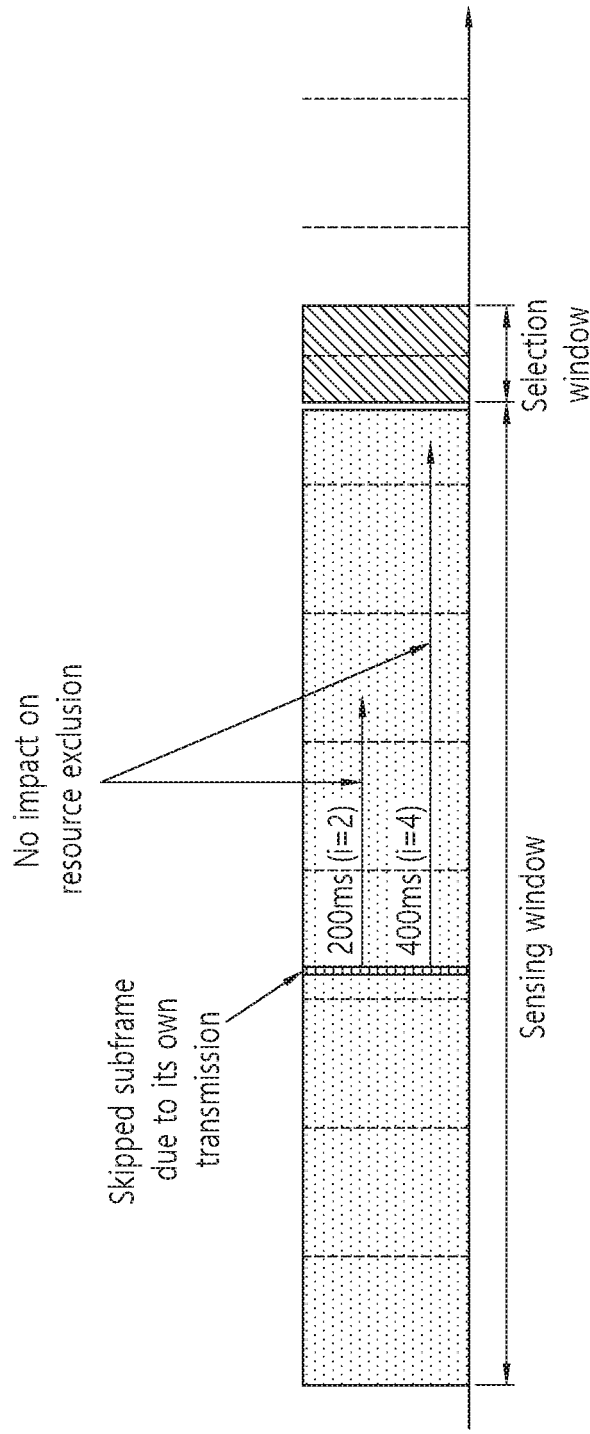

FIGS. 28 to 30 illustrate an example that it is reflected in "RESOURCE EXCLUSION PROCEDURE (BASED ON PSSCH-RSRP MEASUREMENT)".

Referring to FIG. 28 to FIG. 30, a set of i may be restricted as {2, 4}, and P and SL_RESOURCE_RESELECTION_COUNTER may be set to 200 ms and 5, respectively.

In the case of FIG. 28, due to "subframe #(k+100*2) (i.e., i=2) and subframe #(y+200*0) (i.e., j=0)", "subframe #(k+100*4) (i.e., i=4) and subframe #(y+200*1) (i.e., j=1)", subframe #k (within a selection window) may be excluded from a selection.

In the case of FIG. 29, due to, "subframe #(k+100*4) (i.e., i=4) and subframe #(y+200*0) (i.e., j=0)", subframe #k (within a selection window) may be excluded from a selection.

However, in the case of FIG. 30, since there is no subframe in the selection window in which overlap described above occurs, the excluded subframe may not exist within the selection window.

Consequently, the following proposal is provided.

Proposal: In order to handle the skipped subframe #k (due to its own transmission) in the resource exclusion procedure, the following solution may be proposed. UE #A needs to exclude the subframe #y within its own selection window in the case that the subframe #(y+P*j) may be overlapped with subframe #(k+100*i). Here, P may mean the resource reservation interval of the UE, j may be 0, 1, (10*SL_RESOURCE_RESELECTION_COUNTER−1), and i may be any (available) elements in the set restricted by carrier-specific network (pre)configuration.

As another example, in the case that a predesignated (/signaled) (specific) length (e.g., "16", "20", "100") of bitmap is repeatedly applied for V2X resource pool configuration, (particularly, since subframes configured (/signaled) for SLSS transmission use are excluded from (candidate) subframes which may be configured (/signaled) in V2X resource pool) a problem may occur that the bitmap (application) may be "TRUNCATED" in "DFN RANGE END". Here, as an example, in order to solve the problem, the (existing) "DFN RANGE" value (e.g., "10240" or "10176") may be increase (e.g., interpretable as a kind of HYPER-SFN (/HYPER-DFN) method). Here, for example, the (increased) "(maximum) DFN RANGE" value may be defined in the form of "10240 (/10176)*H_VAL" (or "10240 (/10176)*H_MAXVAL") (and/or "MAX DFN RANGE*H_VAL" (or "MAX DFN RANGE*H_MAXVAL")). Here, for example, (A) (currently applied) H_VAL value (/index) (B) configurable (/usable) H_VAL (index) range and/or (C) a maximum value (/maximum index) of H_VAL (H_MAXVAL) (and/or minimum value (/minimum index) (H_MINVAL)) and the like may be a preconfigured (/signaled) through a (higher (/physical) layer) signaling by a network (or serving cell) (and/or a (newly defined) field (or a predefined D2D channel (/signal) on PSBCH by a (SYNCH. SOURCE) UE (in "CARRIER (/POOL/CELL)-SPECIFIC (PRE)CONFIGURATION" for or as a way of "V2X POOL (PRE)CONFIGURATION").

Figure 31:
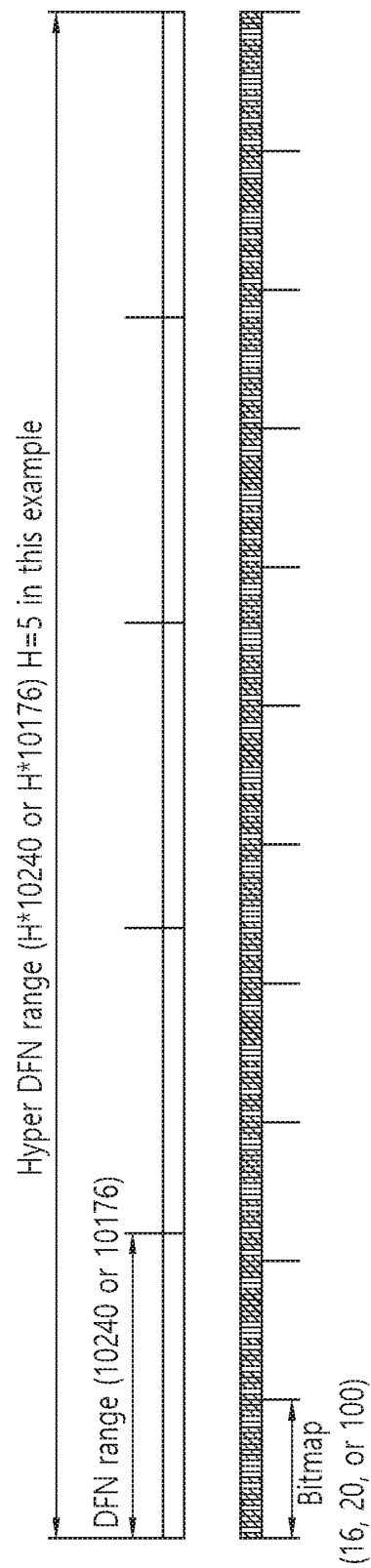
FIG. 31 illustrates an example for the case that the (existing) "DFN RANGE" (e.g., "10240" or "10176") may be increased.

FIG. 31 illustrates an example for the case that the (existing) "DFN RANGE" (e.g., "10240" or "10176") may be increased. Here, for example, it is assumed the situation that H_VAL (and/or H_MAXVAL) value (e.g., denoted by "H" in FIG. 31) is set to "5". Here, as an example, such that the (increase) "maximum DFN RANGE" value is commensurable by V2X resource pool configuration related (designated (/signaled)) bitmap length (without a remainder) (and/or such that a (correct) "WRAP AROUND" (on the (entire) subframes configured (/signaled) in V2X resource pool) (on a specific carrier (/pool)) (actually) selectable (/allowable) (maximum (or minimum) or preconfigured (/signaled)) of a period corresponding to a multiple of "RESOURCE RESERVATION INTERVAL" (e.g., "100 MS") is available), H_VAL (and/or H_MAXVAL) value (and/or V2X resource pool configuration related (designated (/signaled)) bitmap value) may be (limitedly) configured (/signaled). Here, for example, in the case that the rule is applied, whenever the (existing) "(maximum) DFN RANGE" value (e.g., "1024 (/10240)") passes, H_VAL value is increased as much as a preconfigured (/signaled) value (e.g., "1"), but subframes is used (/considered) for (V2X message) transmission (and/or V2X communication) from the (V2X) subframe of relatively smaller index within the same H_VAL value based (V2X) subframe (set). As another example, in an operation such as sensing, "SUBFRAME INDEX" uses "LOGICAL INDEX" in a (V2X) resource pool. Here, as an example, in the case that a (V2X) resource pool is being "TDM" with (preconfigured) other signal, a physical time gap may become relatively great. Here, for example, in such a case, a V2X TX UE(s) may use a smaller value as "RESOURCE RESERVATION INTERVAL" value.

Meanwhile, in the case that the rule described above is applied (e.g., as described above, the (existing) "DFN RANGE" value (e.g., "10240" or "10176") is increased (e.g., interpretable as a kind of HYPER-SFN (/HYPER-DFN) method, V2X communication may be performed as below.

(A) (e.g., a bitmap for V2X subframe is not repeated with an integer count within DFN period [RAN1, RAN2]), V2V may be multiplexed with another signal/channel.

(B) Currently, DFN range for V2V, that is, Tmax which means the number of subframes to be allocated to V2V may be 10240 or 10176 depending on SLSS resource configuration.

Meanwhile, a bitmap length which represents V2V subframe for a resource pool may be 16, 20 or 100. Accordingly, as described above (e.g., the case of FIG. 22), the case that DFN range is not divided by a unit of bitmap length may occur.

The fundamental solution for solving the problem may be changing DFN range (i.e., Tmax) so as to be divided by a bitmap length always. This may mean increasing DFN range so as to be a multiple of a bitmap length. Therefore, in order to increase SFN range, "Hyper SFN (H-SFN)" concept may be introduced.

Here, in the case that H-SFN is provided in SystemInformationBlockType1-BR, a modification period boundary for a BL UE and a UE in CE may be defined by SFN values for which (H-SFN*1024+SFN) mod m=0. Here, for NB-IoT, H-SFN may be always provided and the modification period boundary may be defined by SFN values for which (H-SFN*1024+SFN) mod m=0. The modification period may be configured by system information.

To enable system information update notification for RRC_IDLE UE using an eDRX cycle longer than or equal to the modification period, an eDRX acquisition period may be defined. The boundary of the eDRX acquisition period may be determined by H-SFN values for which H-SFN mod 256=0. Particularly, for NB-IoT, the boundary of the eDRX acquisition period may be determined by H-SFN values for which H-SFN mod 1024=0.

Figure 32:
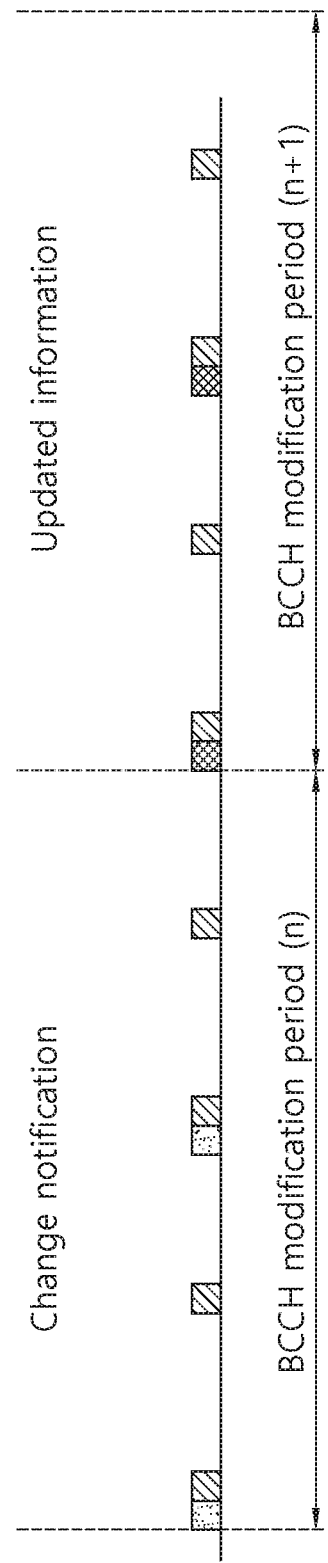
FIG. 32 illustrates an example of transmitting updated system information.

FIG. 32 illustrates an example of transmitting updated system information.

Referring to FIG. 32, when the network changes (a part of) the system information, it may first notify the UEs about this change. In the next modification period, the network may transmit the updated system information. Upon receiving a change notification, the UE using a DRX cycle that is smaller than or equal to the modification period may acquire new system information immediately from the start of the next modification period.

The transmitted system information, that is, SystemInformationBlockType1 may be defined as represented in Table 3 below.

TABLE 3

SystemInformationBlockType1-v1310-IEs ::= SEQUENCE {
hyperSFN-r13         BIT STRING (SIZE (10))    OPTIONAL, -- Need OR
eDRX-Allowed-r13     ENUMERATED {true}         OPTIONAL, -- Need OR Herein, 'hyperSFN' represents hyper SFN which increments by one when the SFN wraps around. For 'eDRX-Allowed', the presence of this field indicates whether idle mode extended DRX is allowed in a cell. The UE needs to stop use of extended DRX in idle mode in the case that eDRX-Allowed is not present.

Using a similar principle, "hyper DFN" may be defined to increase the DFN range. The V2V subframe index in the logical domain (i.e., excluding SLSS subframes) may be given by (H-DFN*$T_{max}$+DFN).

The maximum value of H-DFN, $H_{max}$, may be configured such that $H_{max}*T_{max}$, the total number of potential V2V subframes in the hyper DFN range, may be divided by the configured bitmap length.

Figure 33:
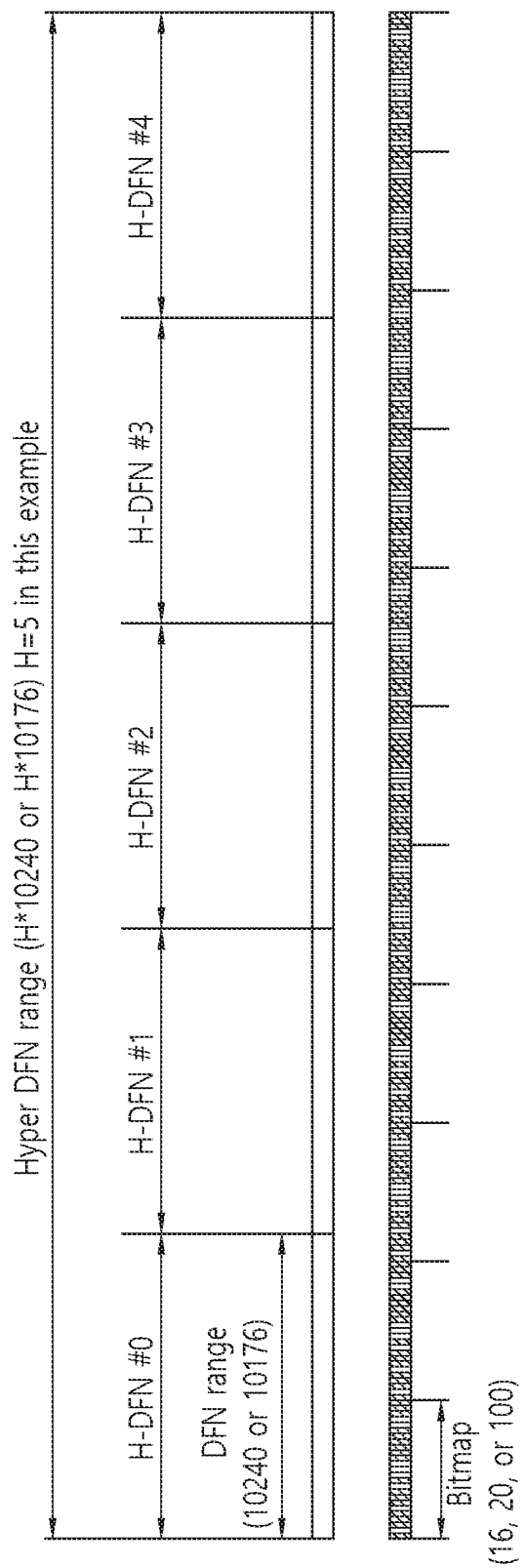
FIG. 33 illustrates an example of the hyper DFN.

FIG. 33 illustrates an example of the hyper DFN.

In this example, $H_{max}$ may be set to 5 (i.e., H-DFN #5 is reset to H-DFN #0). To support this hyper DFN, the current H-DFN index needs to be synchronized between eNB and UE as well as among UEs sharing the same resource pool. This may be signaled as a part of resource pool configuration between the eNB and the UE and also signaled via PSBCH. In the case that GNSS is the synchronization reference, H-DFN index may be derived from the current UTC value.

(C) Consequently, in order to handle the discontinuity of subframe bitmap repetition, hyper DFN may be proposed as follows.

Proposal 1: Hyper DFN may be defined to increase the DFN range by $H_{max}$ time. The V2V subframe index in the logical domain may be given by (H-DFN*$T_{max}$+DFN) where H-DFN increments after $T_{max}$ subframes with H-DFN=0, 1, . . . , $H_{max}$−1.

Proposal 2: $H_{max}$ may be configured such that $H_{max}*T_{max}$ is divided by the length of V2V subframe bitmap of a resource pool.

Proposal 3: The current H-DFN may be signaled as a part of resource pool configuration from eNB. And, the current H-DFN may also be signaled via PSBCH.

As another example, in the example described above, $H_{max}$ may be fixed to a predefined value (without needs of additional signaling) (in spec). Here, for example, $H_{max}$ value may be fixed to "25" (or "a multiple value of 25"). Table 4, Table 5 and Table 6 are analysis materials for the case described above.

TABLE 4

| 1 SLSS SF | | 10176 Bit-map length candidates | | |
|---|---|---|---|---|
| | | 16 | 20 | 100 |
| H_max | 1 | 0 | 16 | 76 |
| | 2 | 0 | 12 | 52 |
| | 3 | 0 | 8 | 28 |
| | 4 | 0 | 4 | 4 |
| | 5 | 0 | 0 | 80 |
| | 6 | 0 | 16 | 56 |
| | 7 | 0 | 12 | 32 |
| | 8 | 0 | 8 | 8 |
| | 9 | 0 | 4 | 84 |
| | 10 | 0 | 0 | 60 |
| | 11 | 0 | 16 | 36 |
| | 12 | 0 | 12 | 12 |
| | 13 | 0 | 8 | 88 |
| | 14 | 0 | 4 | 64 |
| | 15 | 0 | 0 | 40 |
| | 16 | 0 | 16 | 16 |
| | 17 | 0 | 12 | 92 |
| | 18 | 0 | 8 | 68 |
| | 19 | 0 | 4 | 44 |
| | 20 | 0 | 0 | 20 |
| | 21 | 0 | 16 | 96 |
| | 22 | 0 | 12 | 72 |
| | 23 | 0 | 8 | 48 |
| | 24 | 0 | 4 | 24 |
| | 25 | 0 | 0 | 0 |
| | 26 | 0 | 16 | 76 |
| | 27 | 0 | 12 | 52 |
| | 28 | 0 | 8 | 28 |
| | 29 | 0 | 4 | 4 |
| | 30 | 0 | 0 | 80 |
| | 31 | 0 | 16 | 56 |
| | 32 | 0 | 12 | 32 |
| | 33 | 0 | 8 | 8 |
| | 34 | 0 | 4 | 84 |
| | 35 | 0 | 0 | 60 |
| | 36 | 0 | 16 | 36 |
| | 37 | 0 | 12 | 12 |
| | 38 | 0 | 8 | 88 |
| | 39 | 0 | 4 | 64 |
| | 40 | 0 | 0 | 40 |
| | 41 | 0 | 16 | 16 |
| | 42 | 0 | 12 | 92 |
| | 43 | 0 | 8 | 68 |
| | 44 | 0 | 4 | 44 |
| | 45 | 0 | 0 | 20 |
| | 46 | 0 | 16 | 96 |
| | 47 | 0 | 12 | 72 |
| | 48 | 0 | 8 | 48 |
| | 49 | 0 | 4 | 24 |
| | 50 | 0 | 0 | 0 |
| | 51 | 0 | 16 | 76 |
| | 52 | 0 | 12 | 52 |
| | 53 | 0 | 8 | 28 |
| | 54 | 0 | 4 | 4 |
| | 55 | 0 | 0 | 80 |
| | 56 | 0 | 16 | 56 |
| | 57 | 0 | 12 | 32 |
| | 58 | 0 | 8 | 8 |
| | 59 | 0 | 4 | 84 |
| | 60 | 0 | 0 | 60 |
| | 61 | 0 | 16 | 36 |
| | 62 | 0 | 12 | 12 |
| | 63 | 0 | 8 | 88 |
| | 64 | 0 | 4 | 64 |
| | 65 | 0 | 0 | 40 |
| | 66 | 0 | 16 | 16 |
| | 67 | 0 | 12 | 92 |
| | 68 | 0 | 8 | 68 |
| | 69 | 0 | 4 | 44 |
| | 70 | 0 | 0 | 20 |
| | 71 | 0 | 16 | 96 |
| | 72 | 0 | 12 | 72 |
| | 73 | 0 | 8 | 48 |
| | 74 | 0 | 4 | 24 |
| | 75 | 0 | 0 | 0 |
| | 76 | 0 | 16 | 76 |
| | 77 | 0 | 12 | 52 |
| | 78 | 0 | 8 | 28 |
| | 79 | 0 | 4 | 4 |
| | 80 | 0 | 0 | 80 |
| | 81 | 0 | 16 | 56 |
| | 82 | 0 | 12 | 32 |
| | 83 | 0 | 8 | 8 |
| | 84 | 0 | 4 | 84 |
| | 85 | 0 | 0 | 60 |
| | 86 | 0 | 16 | 36 |
| | 87 | 0 | 12 | 12 |
| | 88 | 0 | 8 | 88 |
| | 89 | 0 | 4 | 64 |
| | 90 | 0 | 0 | 40 |
| | 91 | 0 | 16 | 16 |
| | 92 | 0 | 12 | 92 |
| | 93 | 0 | 8 | 68 |
| | 94 | 0 | 4 | 44 |
| | 95 | 0 | 0 | 20 |

TABLE 4-continued

| 1 SLSS SF | 10176 Bit-map length candidates | | |
|---|---|---|---|
| | 16 | 20 | 100 |
| 96 | 0 | 16 | 96 |
| 97 | 0 | 12 | 72 |
| 98 | 0 | 8 | 48 |
| 99 | 0 | 4 | 24 |
| 100 | 0 | 0 | 0 |

TABLE 5

| 2 SLSS SF | | 10112 Bit-map length candidates | | |
|---|---|---|---|---|
| | | 16 | 20 | 100 |
| H_max | 1 | 0 | 12 | 12 |
| | 2 | 0 | 4 | 24 |
| | 3 | 0 | 16 | 36 |
| | 4 | 0 | 8 | 48 |
| | 5 | 0 | 0 | 60 |
| | 6 | 0 | 12 | 72 |
| | 7 | 0 | 4 | 84 |
| | 8 | 0 | 16 | 96 |
| | 9 | 0 | 8 | 8 |
| | 10 | 0 | 0 | 20 |
| | 11 | 0 | 12 | 32 |
| | 12 | 0 | 4 | 44 |
| | 13 | 0 | 16 | 56 |
| | 14 | 0 | 8 | 68 |
| | 15 | 0 | 0 | 80 |
| | 16 | 0 | 12 | 92 |
| | 17 | 0 | 4 | 4 |
| | 18 | 0 | 16 | 16 |
| | 19 | 0 | 8 | 28 |
| | 20 | 0 | 0 | 40 |
| | 21 | 0 | 12 | 52 |
| | 22 | 0 | 4 | 64 |
| | 23 | 0 | 16 | 76 |
| | 24 | 0 | 8 | 88 |
| | 25 | 0 | 0 | 0 |
| | 26 | 0 | 12 | 12 |
| | 27 | 0 | 4 | 24 |
| | 28 | 0 | 16 | 36 |
| | 29 | 0 | 8 | 48 |
| | 30 | 0 | 0 | 60 |
| | 31 | 0 | 12 | 72 |
| | 32 | 0 | 4 | 84 |
| | 33 | 0 | 16 | 96 |
| | 34 | 0 | 8 | 8 |
| | 35 | 0 | 0 | 20 |
| | 36 | 0 | 12 | 32 |
| | 37 | 0 | 4 | 44 |
| | 38 | 0 | 16 | 56 |
| | 39 | 0 | 8 | 68 |
| | 40 | 0 | 0 | 80 |
| | 41 | 0 | 12 | 92 |
| | 42 | 0 | 4 | 4 |
| | 43 | 0 | 16 | 16 |
| | 44 | 0 | 8 | 28 |
| | 45 | 0 | 0 | 40 |
| | 46 | 0 | 12 | 52 |
| | 47 | 0 | 4 | 64 |
| | 48 | 0 | 16 | 76 |
| | 49 | 0 | 8 | 88 |
| | 50 | 0 | 0 | 0 |
| | 51 | 0 | 12 | 12 |
| | 52 | 0 | 4 | 24 |
| | 53 | 0 | 16 | 36 |
| | 54 | 0 | 8 | 48 |
| | 55 | 0 | 0 | 60 |
| | 56 | 0 | 12 | 72 |
| | 57 | 0 | 4 | 84 |
| | 58 | 0 | 16 | 96 |
| | 59 | 0 | 8 | 8 |
| | 60 | 0 | 0 | 20 |
| | 61 | 0 | 12 | 32 |
| | 62 | 0 | 4 | 44 |
| | 63 | 0 | 16 | 56 |
| | 64 | 0 | 8 | 68 |
| | 65 | 0 | 0 | 80 |
| | 66 | 0 | 12 | 92 |
| | 67 | 0 | 4 | 4 |
| | 68 | 0 | 16 | 16 |
| | 69 | 0 | 8 | 28 |
| | 70 | 0 | 0 | 40 |
| | 71 | 0 | 12 | 52 |
| | 72 | 0 | 4 | 64 |
| | 73 | 0 | 16 | 76 |
| | 74 | 0 | 8 | 88 |
| | 75 | 0 | 0 | 0 |
| | 76 | 0 | 12 | 12 |
| | 77 | 0 | 4 | 24 |
| | 78 | 0 | 16 | 36 |
| | 79 | 0 | 8 | 48 |
| | 80 | 0 | 0 | 60 |
| | 81 | 0 | 12 | 72 |
| | 82 | 0 | 4 | 84 |
| | 83 | 0 | 16 | 96 |
| | 84 | 0 | 8 | 8 |
| | 85 | 0 | 0 | 20 |
| | 86 | 0 | 12 | 32 |
| | 87 | 0 | 4 | 44 |
| | 88 | 0 | 16 | 56 |
| | 89 | 0 | 8 | 68 |
| | 90 | 0 | 0 | 80 |
| | 91 | 0 | 12 | 92 |
| | 92 | 0 | 4 | 4 |
| | 93 | 0 | 16 | 16 |
| | 94 | 0 | 8 | 28 |
| | 95 | 0 | 0 | 40 |
| | 96 | 0 | 12 | 52 |
| | 97 | 0 | 4 | 64 |
| | 98 | 0 | 16 | 76 |
| | 99 | 0 | 8 | 88 |
| | 100 | 0 | 0 | 0 |

TABLE 6

| NO SLSS SF | | 10240 Bit-map length candidates | | |
|---|---|---|---|---|
| | | 16 | 20 | 100 |
| H_max | 1 | 0 | 0 | 40 |
| | 2 | 0 | 0 | 80 |
| | 3 | 0 | 0 | 20 |
| | 4 | 0 | 0 | 60 |
| | 5 | 0 | 0 | 0 |
| | 6 | 0 | 0 | 40 |
| | 7 | 0 | 0 | 80 |
| | 8 | 0 | 0 | 20 |
| | 9 | 0 | 0 | 60 |
| | 10 | 0 | 0 | 0 |
| | 11 | 0 | 0 | 40 |
| | 12 | 0 | 0 | 80 |
| | 13 | 0 | 0 | 20 |
| | 14 | 0 | 0 | 60 |
| | 15 | 0 | 0 | 0 |
| | 16 | 0 | 0 | 40 |
| | 17 | 0 | 0 | 80 |
| | 18 | 0 | 0 | 20 |
| | 19 | 0 | 0 | 60 |
| | 20 | 0 | 0 | 0 |
| | 21 | 0 | 0 | 40 |
| | 22 | 0 | 0 | 80 |
| | 23 | 0 | 0 | 20 |

TABLE 6-continued

| NO SLSS SF | 10240 Bit-map length candidates | | |
|---|---|---|---|
| | 16 | 20 | 100 |
| 24 | 0 | 0 | 60 |
| 25 | 0 | 0 | 0 |
| 26 | 0 | 0 | 40 |
| 27 | 0 | 0 | 80 |
| 28 | 0 | 0 | 20 |
| 29 | 0 | 0 | 60 |
| 30 | 0 | 0 | 0 |
| 31 | 0 | 0 | 40 |
| 32 | 0 | 0 | 80 |
| 33 | 0 | 0 | 20 |
| 34 | 0 | 0 | 60 |
| 35 | 0 | 0 | 0 |
| 36 | 0 | 0 | 40 |
| 37 | 0 | 0 | 80 |
| 38 | 0 | 0 | 20 |
| 39 | 0 | 0 | 60 |
| 40 | 0 | 0 | 0 |
| 41 | 0 | 0 | 40 |
| 42 | 0 | 0 | 80 |
| 43 | 0 | 0 | 20 |
| 44 | 0 | 0 | 60 |
| 45 | 0 | 0 | 0 |
| 46 | 0 | 0 | 40 |
| 47 | 0 | 0 | 80 |
| 48 | 0 | 0 | 20 |
| 49 | 0 | 0 | 60 |
| 50 | 0 | 0 | 0 |
| 51 | 0 | 0 | 40 |
| 52 | 0 | 0 | 80 |
| 53 | 0 | 0 | 20 |
| 54 | 0 | 0 | 60 |
| 55 | 0 | 0 | 0 |
| 56 | 0 | 0 | 40 |
| 57 | 0 | 0 | 80 |
| 58 | 0 | 0 | 20 |
| 59 | 0 | 0 | 60 |
| 60 | 0 | 0 | 0 |
| 61 | 0 | 0 | 40 |
| 62 | 0 | 0 | 80 |
| 63 | 0 | 0 | 20 |
| 64 | 0 | 0 | 60 |
| 65 | 0 | 0 | 0 |
| 66 | 0 | 0 | 40 |
| 67 | 0 | 0 | 80 |
| 68 | 0 | 0 | 20 |
| 69 | 0 | 0 | 60 |
| 70 | 0 | 0 | 0 |
| 71 | 0 | 0 | 40 |
| 72 | 0 | 0 | 80 |
| 73 | 0 | 0 | 20 |
| 74 | 0 | 0 | 60 |
| 75 | 0 | 0 | 0 |
| 76 | 0 | 0 | 40 |
| 77 | 0 | 0 | 80 |
| 78 | 0 | 0 | 20 |
| 79 | 0 | 0 | 60 |
| 80 | 0 | 0 | 0 |
| 81 | 0 | 0 | 40 |
| 82 | 0 | 0 | 80 |
| 83 | 0 | 0 | 20 |
| 84 | 0 | 0 | 60 |
| 85 | 0 | 0 | 0 |
| 86 | 0 | 0 | 40 |
| 87 | 0 | 0 | 80 |
| 88 | 0 | 0 | 20 |
| 89 | 0 | 0 | 60 |
| 90 | 0 | 0 | 0 |
| 91 | 0 | 0 | 40 |
| 92 | 0 | 0 | 80 |
| 93 | 0 | 0 | 20 |
| 94 | 0 | 0 | 60 |
| 95 | 0 | 0 | 0 |
| 96 | 0 | 0 | 40 |
| 97 | 0 | 0 | 80 |
| 98 | 0 | 0 | 20 |
| 99 | 0 | 0 | 60 |
| 100 | 0 | 0 | 0 |

As another example, (A) in the case that a preconfigured (/signaled) a (specific) length of bitmap is repeatedly applied and V2X resource pool is designated and/or (B) in the case that "RESOURCE RESERVATION INTERVAL" based (periodic) transport resource(s) (configured (/signaled) from (UE) higher layer) is reserved (/selected), (a part of) V2X resource designated by (the corresponding) bitmap and/or reserved (/selected) (by V2X TX UE(S)) (a part of) (periodic) transport resource may be located on WAN communication related DL (time (/frequency)) resource (e.g., "DL SF" and/or "(TDD) SPECIAL SF" (and/or "DWPTS")).

Meanwhile, when a UE performs V2X message transmission on a specific carrier, the UE may not perform V2X message transmission using all subframes on the carrier. Accordingly, an example for a UE to transmit V2X message considering a subframe in which V2X message transmission is not performed is described with reference to a drawing.

Figure 34:
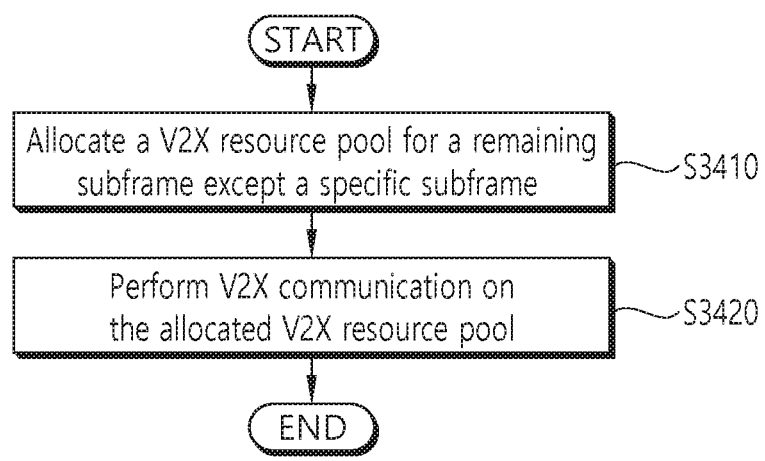
FIG. 34 is a flowchart illustrating a method for performing V2X communication on an allocated V2X resource pool according to an embodiment of the present disclosure.

FIG. 34 is a flowchart illustrating a method for performing V2X communication on an allocated V2X resource pool according to an embodiment of the present disclosure.

Referring to FIG. 34, a UE may allocate a V2X resource pool for a remaining subframe except a specific subframe (step, S3410). In this case, the specific subframe may mean (A) SLSS subframe, (B) for TDD shared carrier, DL and S (SPECIAL) subframe, or (C) reserved subframes. Hereinafter, a more detailed example for determining a subframe excluded from V2X transmission is described.

(A) for SLSS Subframe

First, the UE may allocate a V2X resource pool for a remaining subframe except SLSS subframe.

Particularly, SLSS subframe may be excluded from mapping according to (repeated) V2V pool bitmap (i.e., a bitmap (or information) indicating a subframe in which a V2X pool may be allocated), and in this case, the bitmap length may mean 16, 20 or 100. The bitmap may define which subframe the subframe in which V2V SA and/or data transmission and/or reception is allowed. An example that SLSS subframe is excluded from V2X transmission is described with reference to a drawing as below.

Figure 35:
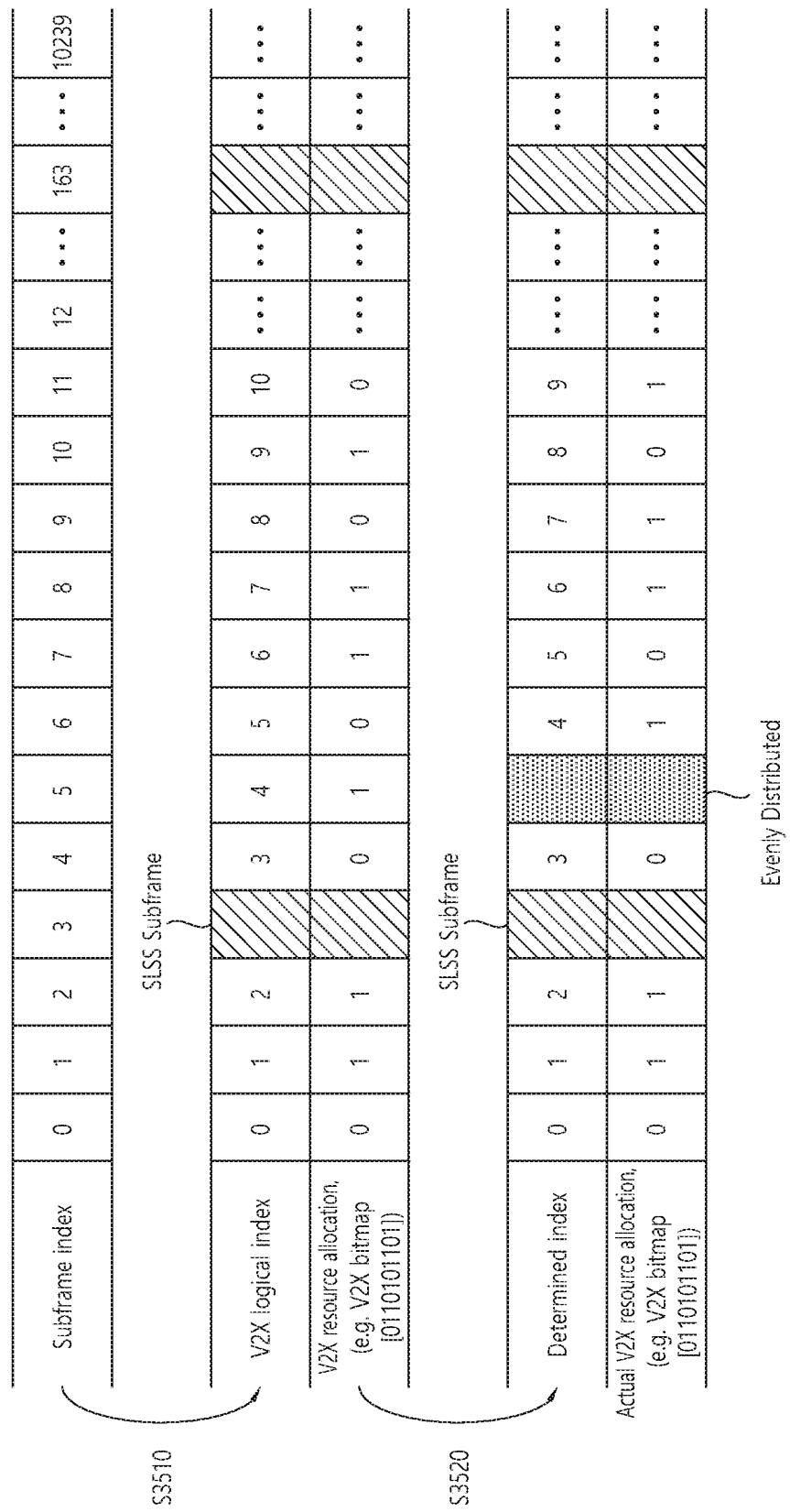
FIG. 35 schematically illustrates an example that SLSS subframe is excluded from V2X transmission.

FIG. 35 schematically illustrates an example that SLSS subframe is excluded from V2X transmission.

In FIG. 35, it is assumed that subframe number may have 0, 1, . . . , 10239 (i.e., total number of subframes is 10240), and it is assumed that V2X bitmap is repeated in every 10-subframe unit, and V2X bitmap is [0110101101].

When allocating V2X logical index, the UE may allocate V2X logical index for subframes excluding SLSS subframe. For example, assuming that each of subframe indexes #3, #163, and the like correspond to SLSS subframes (it is assumed that SLSS subframe is repeated 160-subframe unit), a V2X UE may allocate V2X logical index for the remaining subframes except subframe indexes #3, #163, and the like (i.e., the remaining subframes except SLSS subframes) (step, S3510). Here, it may be assumed that the UE allocates V2X resource according to V2X bitmap for the subframe in which V2X logical index is allocated.

In this case, the V2X logical index derived as described above may not correspond to an integer multiple of V2X bitmap. For example, in the case that SLSS subframe is allocated in 160-subframe unit, as described above, 64 SLSS subframes may be present in 10240 subframes, and accordingly, V2X logical index may be allocated to 10176 subframes corresponding to 10240-64.

As such, V2X logical index may be allocated to 10176 subframes, and in the case that V2X bitmap period is 10, the logical index is not divided by V2X bitmap period. That is, in the case of allocating V2X bitmap having a period of 10 for 10176 subframes, the case that a bit is not allocated for 6 subframes may occur.

Therefore, the UE may exclude the subframes as much as the number of subframes failed to be allocated from V2X logical index allocation (step, S3520). In this case, the subframes failed to be allocated may be EVENLY DISTRIBUTED.

(B) For DL and S (SPECIAL) subframe

For TDD (shared) carrier, DL and/or S (SPECIAL) subframe may be excluded from mapping according to (repeated) V2V pool bitmap. An example that DL and/or S (SPECIAL) subframe may be excluded from V2X transmission is described with reference to a drawing as below.

Figure 36:
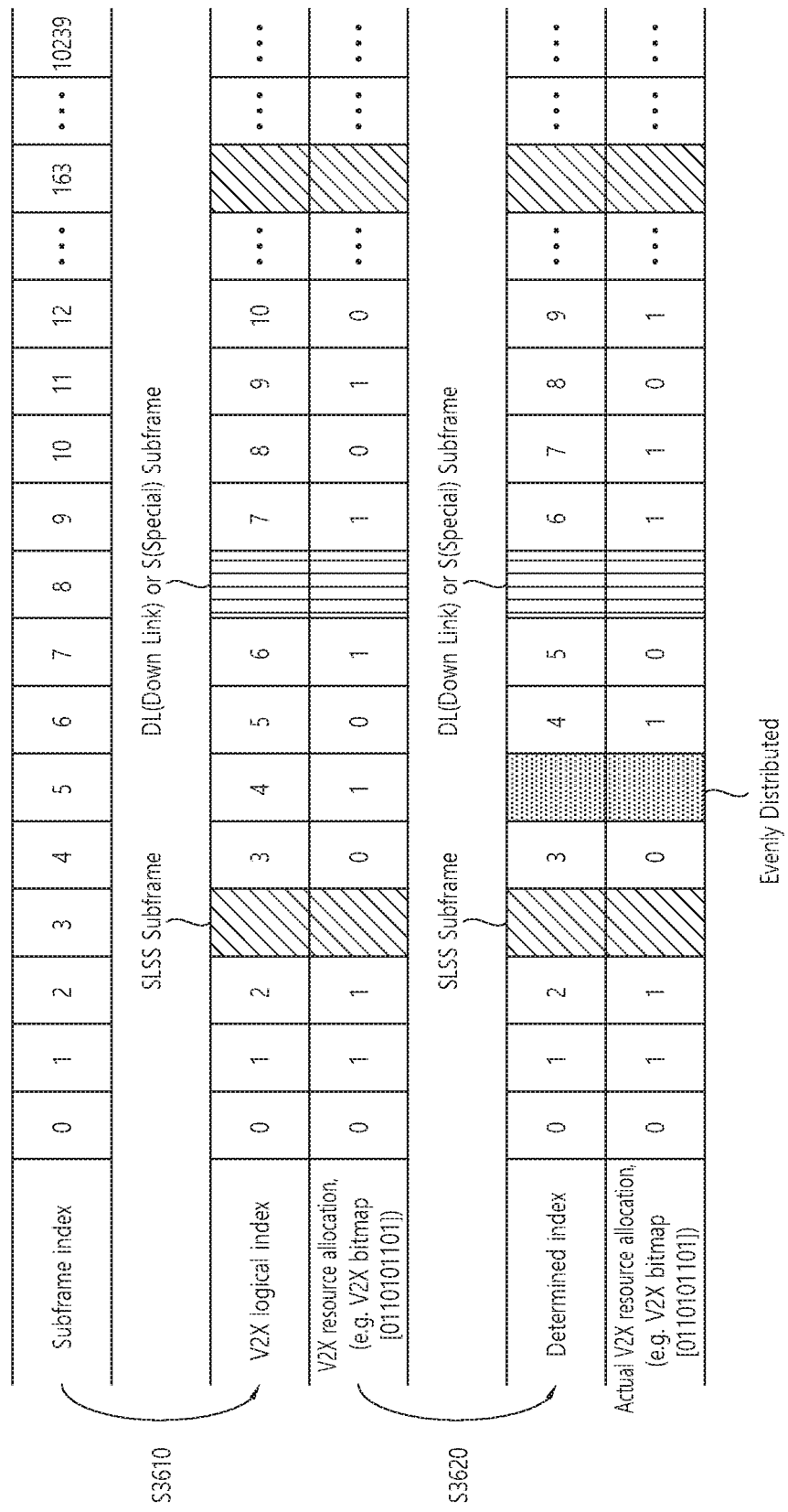
FIG. 36 schematically illustrates an example that DL and S (SPECIAL) subframes are excluded from V2X transmission.

FIG. 36 schematically illustrates an example that DL and S (SPECIAL) subframes are excluded from V2X transmission.

In FIG. 36, it is assumed that subframe number may have 0, 1, . . . , 10239 (i.e., total number of subframes is 10240), and it is assumed that V2X bitmap is repeated in every 10-subframe unit, and V2X bitmap is [0110101101].

When allocating V2X logical index, the UE may allocate V2X logical index for subframes excluding DL and S (SPECIAL) subframes (and/or SLSS subframe). For example, assuming that subframe index #7, and the like corresponds to DL and S (SPECIAL) subframes, a V2X UE may allocate V2X logical index for the remaining subframes except subframe index #7, and the like (step, S3610). Here, the UE allocates V2X resource according to V2X bitmap for the subframe in which V2X logical index is allocated.

Later, the UE may exclude the subframes as much as the number of subframes failed to be allocated from V2X logical index allocation (step, S3620). In this case, the subframes failed to be allocated may be EVENLY DISTRIBUTED.

(C) For a reserved subframe, a resource pool includes several reserved subframes such that a bitmap is repeated in an integer within a specific range (e.g., DFN (D2D Frame Number) range). For example, here, V2X (e.g., V2V) logical subframe index may not be allocated to the reserved subframe. Furthermore, a position of the reserved subframe may be indicated in an implicit method.

In summary, here, for example, the reason why the corresponding problem occurs is because a bitmap for V2X resource pool configuration is applied without discrimination for WAN communication related DL/UL (time (/frequency)) resources, except (preconfigured (/signaled) V2X SYNCH. SIGNAL transmission related (time (/frequency)) resources) (e.g., V2X SYNCH. SUBFRAME(S)) (and/or because of DFN WRAP AROUND problem (/phenomenon)). Here, for example, in order to solve the problem, a V2X TX UE(S) may (A) assume that on (a part of) V2X resource on WAN communication related DL (time (/frequency)) resource (designated by bitmap) is not valid (in the aspect of ((V2X pool related) "LOGICAL INDEXING") and/or (B) omit (V2X message (/TB)) transmission operation in (a part of) (periodic) transport resource which is reserved (/selected) (by V2X TX UE(S)) on WAN communication related DL (time (/frequency)) resource (and/or may not omit (V2X message (/TB)) transmission operation, but restart V2X message (/TB) transmission operation on the later (closest) valid (/usable) V2X resource). Here, for example, for the former case, it may be interpreted that (V2X pool related) "LOGICAL INDEXING" is performed with including (or excluding) the invalid resource (e.g., DL (time (/frequency)) resource) (e.g., when a transmission timing of a specific period is determined based on "LOGICAL INDEXING", a problem that an actual transmission period becomes great (excessively) than an intended (target) period may be alleviated). As another example, when a bitmap of a preconfigured (/signaled) (specific) length is repeatedly applied, WAN communication related DL (time (/frequency)) resource (e.g., "DL SF" and/or "(TDD) SPECIAL SF" (and/or "DWPTS")) is (additionally) excluded (e.g., it may be interpreted that in the (additionally) excluded resource, (V2X pool related) "LOGICAL INDEXING" is not performed (/applied) and applied (considering WAN communication related DL (time (/frequency)) resource only). Here, for example, the rule may be limitedly applied only to "IN-COVERAGE" environment (and/or TDD system).

Returning to FIG. 34, the UE may perform V2X communication on the allocated V2X resource pool (step, S2420). A particular example that the UE may perform V2X communication is as described above.

Here, for example, the rule may be extendedly applied not only to the case that (a part of) V2X resource (designated by a bitmap) and/or (a part of) (periodic) transport resource reserved (/selected) (by a V2X TX UE(S)) is located on WAN communication related DL (time (/frequency)) resource, but also to the case that (a part of) V2X resource (designated by a bitmap) and/or (a part of) (periodic) transport resource reserved (/selected) (by the V2X TX UE(S)) is located on a resource in which (preconfigured (/signaled)) V2X communication performance is not proper (e.g., (time (/frequency)) resource) (and/or a resource in which (specific) V2X channel (/signaling) transmission (/reception) of relatively high priority (than the priority related to V2X message to be transmitted) is configured except "UL SF" (and/or "UPPTS")).

As another example, a V2X UE(S) (in base station coverage) may transmit "GNSS based DFN #0 offset value" which is signaled (/configured) in advance (from (serving) base station) to another V2X UE(S) (out of base station coverage) through a predefined channel (e.g., PSBCH).

As another example, in the case that, on V2X resource pool (and/or (V2X) carrier), a selectable (/allowable) I_VALUE (range) value and/or "RESOURCE RESERVATION INTERVAL" (range) value is restricted (in the form of "CARRIER (/POOL)-SPECIFIC NETWORK (PRE)CONFIGURATION"), the V2X TX UE(S) may perform sensing operation (e.g., STEP 5 of Table 2) (and/or energy measurement operation (e.g., STEP 8 of Table 2) based on (A) a period value (e.g., "I_MINVAL*P_STEP") which may be derived (/calculated) as a minimum value of I_VALUE (I_MINVAL) (or maximum value) (or a preconfigured (/signaled) (specific) I_VALUE value) and/or (B) a minimum (or maximum) period value of "RESOURCE RESERVATION INTERVAL" (or preconfigured (/signaled) (specific) "RESOURCE RESERVATION INTERVAL" value). Here, for example, in the case that a specific V2X resource pool is configured (/allowed) only for a P-UE(S) that performs V2X message transmission with relatively long period (e.g., "500 MS") (than V-UE(S)) and the rule is applied, the P-UE(S) performs a sensing operation (and/or energy measurement operation) based on the (corresponding) period (e.g., "500 MS").

Meanwhile, as described above, for example, the UE may select a random value in an interval from 5 to 15 in a relatively long resource reservation period (e.g., resource reservation period of 100 ms or longer) (referred to as "L_PER") and reserve resources as much as a value of the selected value multiplied by 10. However, application of the resource reservation method described above to a relatively short resource reservation period (e.g., 20 ms, 50 ms (shorter than 100 ms) (referred to as "S_PER") may be improper for L_PER UE to sense S_PER UE which are coexisted in the same resource pool.

Therefore, in order for the UE to support V2X message (/traffic) transmission of (relatively) short period, in the case that (relatively) "SHORTER RESOURCE RESERVATION PERIOD(/INTERVAL)" (e.g., "20 MS") is introduced, the following (a part of) parameter may be differently (or independently) configured (/signaled) (in comparison with the case of V2X message (/traffic) transmission of (relatively) long period (or a preconfigured (/signaled) (threshold) period value) (e.g., "100 MS")). Here, for example, in may be interpreted that the following (a part of) parameter may be applied to (A) the case that SHORTP_UE(S) performs sensing operation and/or (B) the case that LONGP_UE(S) performs sensing operation (for SHORTP_UE(S)) (when V2X UE(S) of "SHORTER RESOURCE RESERVATION PERIOD(/INTERVAL)" (and/or V2X UE(S) performing V2X message (/traffic) transmission of (relatively) short period) (SHORTP_UE(S)) and V2X UE(S) of "(RELATIVELY) LONGER RESOURCE RESERVATION PERIOD(/INTERVAL)" (and/or V2X UE(S) performing V2X message (/traffic) transmission of (relatively) long period) (LONGP_UE(S)) are coexisted on a preconfigured (/signaled) (specific) resource pool).

Figure 37:
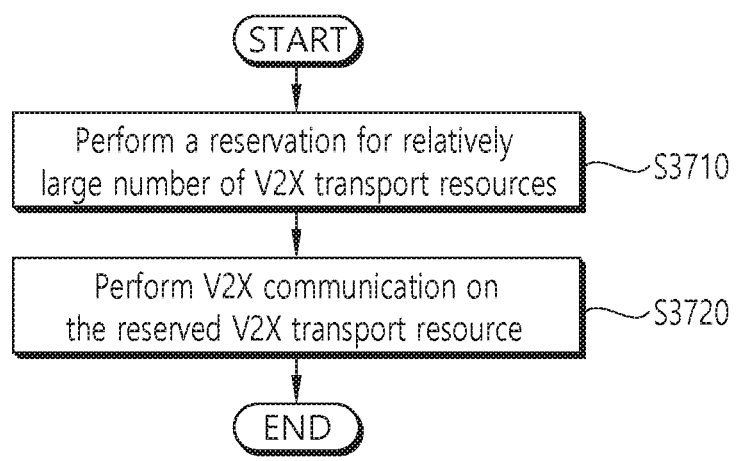
FIG. 37 is a flowchart illustrating a method for performing a reservation for V2X transport resource in the case that a resource reservation of a relatively short period (e.g., 20 ms, 50 ms (shorter than 100 ms) is configured according to an embodiment of the present disclosure.

FIG. 37 is a flowchart illustrating a method for performing a reservation for V2X transport resource in the case that a resource reservation of a relatively short period (e.g., 20 ms, 50 ms (shorter than 100 ms) is configured according to an embodiment of the present disclosure.

Referring to FIG. 37, in the case that a resource reservation of a relatively short period is configured, a UE may perform a reservation for relatively large number of V2X transport resources (step, S3710). Here, the reservation of relatively large number of V2X transport resources does not mean that the UE selects a random value in an interval from 5 to 15 and reserves resources as much as a value of the selected value multiplied by 10, but means that the UE selects a random value in an interval from 5*K (herein, K is a positive integer of 2 or greater) to 15*K and reserves resources as much as a value of the selected value multiplied by 10.

That is, for the relatively short period (e.g., 20 ms, 50 ms), resources as much as a value of the counter value (a value from 5 to 15) multiplied by, for example, 5 or 2, and then additionally multiplied by 10 may be reserved.

For example, in the case that a resource reservation period is "20 ms", the UE may select a random value in an interval [5*5, 15*5] (i.e., 5*2 or more, 15*5 or less) and reserve resources as much as a value of the selected value multiplied by 10 additionally. According to this example, the UE may reserve resources of 250 or more and 750 or less.

For another example, in the case that a resource reservation period is "50 ms", the UE may select a random value in an interval [5*2, 15*2] and reserve resources as much as a value of the selected value multiplied by 10 additionally. According to this example, the UE may reserve resources of 100 or more and 300 or less.

(Example #1) When performing (re)reserving (/selecting) a transport resource, assumed (/used) finite subframe number (of resource reservation (interval) period) (and/or $C_{resel}$ value on Table 2 (e.g., "[10*SL_RESOURCE_RESELECTION_COUNTER]")). Here, for example, for (relatively) short period of V2X message (/traffic) transmission, the corresponding finite subframe number value (of resource reservation (interval) period) (and/or $C_{resel}$ value) may be configured (/signaled) relatively shortly (e.g., this has an effect of preventing excessive resource reservation (/selection) (in a short time duration)).

Later, the UE may perform V2X communication on the reserved V2X transport resource (step, S3720). A particular example for the UE to perform V2X transmission on the reserved V2X transport resource is as described above FIG. 38 is a flowchart illustrating a method for performing sensing with relatively short period in the case that a resource reservation of short period is configured according to an embodiment of the present disclosure.

Figure 38:
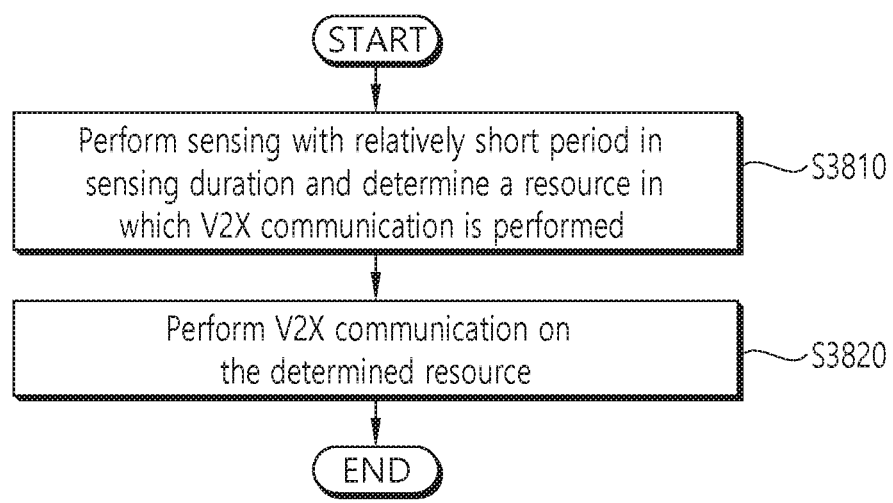
FIG. 38 is a flowchart illustrating a method for performing sensing with relatively short period in the case that a resource reservation of short period is configured according to an embodiment of the present disclosure.

Referring to FIG. 38, in the case that a resource reservation of short period is configured, a UE may perform sensing with relatively short period in sensing duration and determine a resource in which V2X communication is performed (step, S3810). That is, as described above, in the case that a resource reservation of short period is configured for the UE (e.g., a resource reservation is configured with a unit of duration shorter than 100 ms), a sensing (i.e., S-RSSI measurement) duration may be configured as the resource reservation duration used for a transmission of the UE. In other words, in the case that a resource reservation of short period is configured, the UE may perform sensing according to the short period used for resource reservation. This is described in more detail as below.

(Example #2) V2X message priority (e.g., may be configured (/signaled) as relatively low (or high) priority) and/or "PSSCH-RSRP MEASUREMENT" on Table 2 STEP 5 (and/or interpreted as a coefficient (/ratio) value in relation to "$0.2*M_{total}$" on Table 2 STEP 6 (/8) (e.g., a ratio value for deriving (/determining) a minimum (candidate) resource number that should be remained after performing STEP 5 of Table 2 (among the entire (candidate) resources) (within $S_A$ set) and/or a ratio value for deriving (/determining) a minimum (candidate) resource number that should be remained within $S_B$ set after performing STEP 8 of Table 2) may be configured (/signaled) as different (or independent) value and/or "PSSCH-RSRP MEASUREMENT" increment value which is applied in the case that a minimum (candidate) resource number that should be remained after performing STEP 5 of Table 2 (among the entire (candidate) resources) within $S_A$ set is not satisfied (e.g., "3 DB") and/or a period value used for sensing operation (e.g., STEP 5 of Table 2) (and/or a period value used for energy measurement operation (e.g., STEP 8 of Table 2) (e.g., "100 MS" value may be changed (to relatively short (or long) value) in STEP 8 of Table 2))).

(Example #3) I_VALUE (range) value and/or P_STEP value selectable (/allowable) on V2X resource pool (and/or (V2X) carrier)

(Example #4) Transmission power related (OPEN-LOOP) parameter (/value) (e.g., "Po", "ALPHA", etc.) and/or V2X resource pool (/carrier)

As another example, a V2X UE(S) may perform (transport) resource (re)selection as below.

A V2X UE may select a transport resource in the following method.

It is assumed a mode in which a UE performs resource selection autonomously. In the mode, when selection/reselection is triggered for V2X message transmission, the UE performs sensing and select/reselect a resource based on the sensing. The UE may transmit scheduling assignment (SA) indicating the selected/reselected resource.

For example, in subframe #n (also referred to as TTI), resource selection/reselection may be triggered in UE. Then, the UE may perform sensing between subframe #n-a and subframe #n-b (a and b are integers with a>b>0), and based on the result, the UE may select/reselect a resource for V2X message transmission.

The values a and b may be common for V2X UEs or independent for each of the V2X UEs.

Alternatively, the values a and b may be common for V2X UEs, for example, this may be the relation such as 'a=1000+b'. That is, in the case that the UE is triggered so as to select a resource for V2X message transmission autonomously, the UE may perform sensing operation for 1 second (1000 ms=1000 subframes=1000 TTIs).

The UE may consider all SA transmissions decoded in the duration from subframe #n-a to subframe #n-b. The decoded SA may be associated with a data transmission from subframe #n-a to subframe #n-b, and the decoded SA transmitted before in subframe #n-a may also be considered.

The UE unable to perform sensing operation in subframe #m may exclude subframe #(m+100*k) from resource selection/reselection (e.g., due to the reason why a signal needs to be transmitted in subframe #m). Meanwhile, the UE may not perform sensing operation in subframes used for transmitting a signal by the UE itself, but skip the sensing operation.

After performing the sensing, the UE selects time/frequency resource for sidelink data channel.

The UE may transmit scheduling assignment (SA) in subframe #n+c. The c is an integer of 0 or greater, which may be a fixed value or a variable. In subframes of which c value is smaller than $c_{min}$, the scheduling assignment transmission (i.e., PSCCH transmission) may not be required. The $c_{min}$ may be a fixed value or a value configured by a network.

The scheduling assignment (SA) transmitted in subframe #n+c may indicate associated data transmitted in subframe #n+d. d may be an integer of c or greater (d≥c). Both c and d may be values of 100 or smaller.

Meanwhile, when any one of the following conditions is satisfied, reselection of V2X resource may be triggered.

(A) A counter meets an expiration condition, the value of counter decreases in every transport block transmission, and the value may be reset when reselection is triggered for all the semi-persistently selected resources. The reset value may be uniformly randomly selected within a specific range, for example, between 5 and 15.

(B) The case that the transport block is not fit within the current resource allocation even in the case of using the maximum allowed modulation and coding scheme (MCS).

(C) The case indicated by a higher layer, and the like.

Meanwhile, in the case that all PSCCH/PSSCH transmissions have the same priority, selection/reselection of PSSCH resource may be performed through the following procedures.

(A) Step 1:

After regarding all the resources are considered selectable first, (B) Step 2:

The UE excludes specific resources based on scheduling assignment decoding and additional conditions. In this case, the UE may select one between the following two options.

The first option is that a resource is excluded if it is indicated or reserved by a decoded scheduling assignment and the received DM-RS power in the associated data resource is above a threshold.

The second option is that a resource is excluded if it is indicated or reserved by a decoded scheduling assignment and the energy measured in the associated data resources is above a threshold.

(C) Step 3:

The UE may select a V2X transport resource from the resources which are not excluded.

For example, after the UE measures and ranks the remaining PSSCH resources based on total received energy, the UE may select a subset. The UE may compare the energy on the currently selected resources with the energy in the subset. In the case that the energy of the current selected resources is greater than a threshold in comparison with the energy in the subset, then the UE may select one among the subset of resources. The UE may randomly select one resource from the subset.

Alternately, after the UE measures and ranks the remaining PSSCH resources based on total received energy, the UE may select a subset. The UE may randomly select one resource from the subset.

Alternately, after the UE measures and ranks the remaining PSSCH resources based on total received energy, the UE may select a subset. The UE may select the resource that minimizes the frequency resource fragmentation from the subset.

As an example, in the case that (transport) resource (re)selection operation is performed according to Table 2 above, the following (a part of) rules may be additionally applied.

[Proposed rule #10] As an example, depending on the 'LATENCY (/QOS) REQUIREMENT' (and/or 'PRIORITY' and/or 'SERVICE TYPE') (to be transmitted or generated), '(D(/C)–M)' (interpretable as a timing when a packet (/message) ((to be transmitted or generated) is arrived (/received) on ((maximum (/minimum) range) (e.g., interpretable as 'TX RESOURCE (RE)SELECTION DURATION(/RANGE/WINDOW)') (e.g., 'M' value is '(LOW LAYER) buffer' (and/or 'PDCP LAYER'), and in addition, (here) 'D (/C)' wording may be interpreted as transmission timing (of (initial) data (PSSCH) (/control information (/PSSCH)) after (exceptionally) resource (re)selection (/reservation) operation is triggered). As another example, 'C' and/or 'D' ((maximum (/minimum) range) value (e.g., interpretable as 'TX RESOURCE (RE)SELECTION DURATION(/RANGE/WINDOW)') should be determined to satisfy (or by considering) 'SERVICE TYPE' (and/or 'LATENCY(/QOS) REQUIREMENT' that may be different depending on 'PRIORITY LEVEL'). Here, for example, 'UPPER LIMIT (/LOWER BOUND)' (e.g., interpretable as 'TX RESOURCE (RE)SELECTION DURATION(/RANGE/WINDOW)') of 'C' and/or 'D' value may not be fixed. Here, for example, the 'UPPER LIMIT (/LOWER BOUND)' may be differently configured (/signaled) depending on 'PRIORITY LEVEL' (and/or 'SERVICE TYPE' and/or 'LATENCY(/QOS) REQUIREMENT'). Here, for example, in the case that the currently selected 'D' value (or 'SUBFRAME #D') has a problem in satisfying 'LATENCY (/QOS) REQUIREMENT' of a newly arrived (/generated (/received)) packet (/message), (transport) resource (re)selection operation may be triggered. Here, for example, a maximum value (and/or minimum value) or range of 'D' (and/or 'C') (e.g., interpretable as 'TX RESOURCE (RE) SELECTION DURATION(/RANGE/WINDOW)') may be determined by considering a timing when a packet (/message) (to be transmitted or generated) is arrived (/received) on 'LOW LAYER buffer' (or a timing when packet (/message) is generated) ('M') and/or (since a predefined (/signaled) condition is satisfied) a timing when (transport) resource (re)selection operation is triggered ('N') and/or 'LATENCY REQUIREMENT' ('L') (e.g., '100 MS') and/or 'PPPP' of the packet (/message) (e.g., in the case that (a part of) different 'PPPP' value is configured (/allowed) for each of packets (/messages) of different 'LATENCY REQUIREMENTS'). Here, as particular example, the maximum value (and/or minimum value) of 'D' (and/or 'C') may be determined as '(L−ABS(M−N))' or determined as 'MIN(L, (L−ABS(M−N)))' (here, for example, 'MIN(X, Y)', 'ABS (Z)' means the function of deriving a minimum value between 'X' and 'Y' and the function of deriving an absolute value of 'Z', respectively), or the range of 'D' (and/or 'C') may be designated as '(L−ABS (M−N))<D (/C)<100 (/'LATENCY REQUIREMENT')' (or '(L−ABS (M−N))≤D(/C) ≤100 (/'LATENCY REQUIREMENT')'). Here, for example, considering retransmission of a specific (single) 'TB (/packet/message)', when calculating (/determining) the maximum value (and/or minimum value) of 'D' (and/or 'C'), it may be required that a predefined (/signaled) 'MARGIN(/OFFSET)' value ('MAG_VAL') is subtracted from 'L' value. Here, for example, when the rule is applied, the maximum value (and/or minimum value) of 'D' (and/or 'C') may be determined as '((L−MAG_VAL)−ABS (M−N))' or 'MIN ((L−MAG_VAL), ((L−MAG_VAL)−ABS (M−N)))'. Here, for example, the 'MAG_VAL' value may have 'DEPENDENCY' upon retransmission count (e.g., 'MAG_VAL' value becomes greater as the retransmission count increases). Here, for example, the rule may be limitedly applied only to the case that (as a predefined (/signaled) condition is satisfied) '(transport) resource (re)selection operation' is triggered) a packet (/message) (to be transmitted or generated) packet (/message) is existed on '(LOW LAYER) buffer' (and/or 'PDCP LAYER') (or a packet (/message) is generated). Here, as another example, ((as a predefined (/signaled) condition is satisfied) '(transport) resource (re)selection operation' is triggered, but) in the case that a packet (/message) (to be transmitted or generated) is not existed on '(LOW LAYER) buffer' (and/or 'PDCP LAYER') (or there is no generated packet (/message)), '(N=M)' (e.g., this may be interpreted that the timing ('N') when (transport) resource (re)selection operation' is triggered is assumed (/regarded) as the timing ('M') when a packet (/message) (to be transmitted or generated) is received on '(LOW LAYER) buffer' (and/or 'PDCP LAYER'), or (transport) resource (re)selection operation is delayed until a packet (/message) (to be transmitted or generated) is actually arrived (/received) on '(LOW LAYER) buffer' (and/or 'PDCP LAYER') (or actual packet (/message) is generated or the (transport) resource (re) selection operation is performed by assuming that a packet (/message) (to be transmitted or generated) is actually arrived (/received) (/existed) on '(LOW LAYER) buffer' (and/or 'PDCP LAYER'). As another example, it is assumed (/regarded) that the later resources including (or not including) the timing corresponding to (above described) the maximum value of 'D' (and/or 'C') (e.g., '(L−ABS (M−N))', '100 (/'LATENCY REQUIREMENT')') is unavailable and excluded (from (re)selectable candidate resources (on 'STEP 3 (/2)'). As an additional example, previous resources including (or not including) the timing (e.g., '(C+C_MIN)') corresponding to a minimum value (C_MIN) (e.g., the 'minimum value' may be determined considering 'PROCESSING TIME' of a UE (e.g., '4 MS')) of 'C' (and/or 'D') value (e.g., 'C' timing may be interpreted as the timing when (first) control (/scheduling) information (PSCCH) transmission is performed after (transport) resource (re)selection operation is triggered ('N')) (or the resources between 'N' timing and '(C+C_MIN)' timing may be include (or not included)) is assumed (/regarded) as unavailable and excluded (from (re)selectable candidate resources (on 'STEP 2 (/3)'). As another example, according to (a part of) the proposed rule described in the present disclosure (e.g., [Proposed rule #1], [Proposed rule #10], etc.), in the case that 'TX RESOURCE (RE)SELECTION DURATION(/RANGE/WINDOW)' ((maximum value (/minimum value)) range is differently considered (/changed) considering 'PRIORITY LEVEL' (and/or 'SERVICE TYPE' and/or 'LATENCY(/QOS) REQUIREMENT'), according to whether a predefined condition is satisfied, sensing operation (and/or (transport) resource (re) selection operation (and/or V2X message transmission)) related following (a part of) parameter may be differently designated. Here, for example, the (corresponding) condition may be defined as (A) the case of transmitting a V2X message of 'LATENCY REQUIREMENT' which is shorter (or longer) than a preconfigured (/signaled) threshold value (and/or the case of transmitting a V2X message of 'PPPP' which is greater (or smaller) than a preconfigured (/signaled) threshold value) and/or (B) the case that (selectable) (candidate) resource (e.g., subframe) of the number which is smaller (or greater) than a preconfigured (/signaled) threshold value is existed (/remained) (and/or the case that a minimum value (/maximum value) of 'TX RESOURCE (RE)SELECTION DURATION(/RANGE/WINDOW)' is smaller (or greater) than a preconfigured (/signaled) threshold value).

(Example #10-1) (V2X message related) PPPP value (/range) (e.g., in the case of a V2X message of shorter (or longer) (than preconfigured (/signaled) threshold value) 'LATENCY REQUIREMENT', a relatively high (or low) PPPP value (/range) is selected, and accordingly, the corresponding transmission may be protected. Here, for example, the transmission based on high (or low) PPPP value (/range), when determining whether the resource used for the corresponding transmission by another UE is selectable (or IDLE/BUSY), is determined with relatively low (or high) PSSCH-RSRP threshold value) (and/or even in the case of the same PPPP value (/range), for a V2X message of long (or short) 'LATENCY REQUIREMENT', relatively low (or high) PSSCH-RSRP threshold value is configured (/signaled), and accordingly, a V2X message transmission of shorter (or longer) (than preconfigured (/signaled) threshold value) 'LATENCY REQUIREMENT' may be protected) and/or ((maximum value (/minimum value) duration (range) (SELECTION WINDOW) and/or a range of selecting (or picking) a random value for determining a maintaining duration of (re)selected (/reserved) resource (and/or (for deriving C_RESEL value [1/2/3]) a coefficient multiplied to the selected random value) and/or resource reservation period and/or a minimum the candidate (transport) resource ratio (number) that should be remained at the least after PSSCH-RSRP threshold value based candidate (transport) resource exclusion operation (and/or in the case that the remaining candidate (transport) resource ratio (/number) is smaller than a preconfigured (/signaled) threshold value, an offset value added to the (related) PSSCH-RSRP threshold value) and/or the candidate (transport) resource ratio (/number) that should be remained at the least after S-RSSI based candidate (transport) resource exclusion operation (e.g., in the case of a V2X message of shorter (or longer) (than a preconfigured (/signaled) threshold value) 'LATENCY REQUIREMENT' (and/or in the case of transmitting a V2X message which is high (or low) (than a preconfigured (/signaled) threshold value) and/or within 'TX RESOURCE (RE)SELECTION DURATION(/RANGE/WINDOW)', in the case that (selectable) (candidate) resources of the number which is smaller (or greater) than a preconfigured (/signaled) threshold value is existed (/remained) and/or in the case that a minimum value (/maximum value) of 'TX RESOURCE (RE)SELECTION DURATION(/RANGE/ WINDOW)' is smaller (or greater) than a preconfigured (/signaled) threshold value, (A) the candidate (transport) resource ratio (number) that should be remained at the least after PSSCH-RSRP threshold value based candidate (transport) resource exclusion operation and/or (B) the offset value added to the (related) PSSCH-RSRP threshold value, in the case that the remained candidate (transport) resource ratio (number) is smaller than a preconfigured (/signaled) threshold value and/or (C) the candidate (transport) resource ratio (/number) that should be remained at the least after S-RSSI based candidate (transport) resource exclusion operation may be designated relatively high (e.g., effect of alleviating collision probability increase)) and/or CBR threshold value used for determining (sub) channel BUSY (/IDLE) and/or RADIO-LAYER PARAMETER SET allowed (/restricted) (for each PPPP/CBR) (e.g., maximum transmission power, retransmission count value (/range) per TB, MCS value (/range), maximum limit (CR_LIMIT) of OCCUPANCY RATIO, etc.) [1/2/3])

[Proposed rule #11] As an example, the (transport) resource (re)selection related '(TIMER) EXPIRATION CONDITION' may be defined as the case that the following (a part of) rules are satisfied (simultaneously). Here, for example, it may be interpreted that a V2X UE(S) may perform the (transport) resource (re)selection operation (actually) (by regarding (/assuming) that the (transport) resource (re)selection operation is triggered).

(Example #11-1) The case that a counter value (decreased by a preconfigured value (e.g., '1') in every TB transmission) is changed to '0' (and/or 'negative value')

(Example #11-2) The case that there is a packet (/message) on '(LOW LAYER) buffer' (and/or 'PDCP LAYER') (to be transmitted or generated (/received) (and/or packet (/message) is generated)

[Proposed rule #12] As an example, a counter value (decreased by a preconfigured value (e.g., '1') in every TB transmission) satisfies 'EXPIRATION CONDITION' (e.g., the counter value satisfies is changed to '0' (and/or 'negative value')) (and/or (as a predefined (/signaled) condition is satisfied) '(transport) resource (re)selection operation' is triggered), but in the case that a packet (/message) (to be transmitted or generated (/received)) is not existed on '(LOW LAYER) buffer' (and/or 'PDCP LAYER') (or in the case that a packet (/message) is not generated), a V2X UE(S) may assume that (the most recent) packet (message) is arrived (/generated (received)) with a previously (/recently) observed 'INTERVAL(/PERIODICITY)', and after performing (transport) resource (re)selection operation, in the case that a problem is actually occurred (e.g., the case that 'LATENCY(/QOS) REQUIREMENT' is not satisfied with the (re)selected (transport) resource, the V2X UE(S) may perform (transport) resource (re)selection operation additionally.

As an example, (together with the rule described in Table 2) according to the following method, a V2X UE(S) may perform (transport) resource (re)selection.

d may be a value of $d_{max}$ or smaller. $d_{max}$ may be dependently determined upon a priority such as UE/data/ service type, and the like.

The UE may inform whether to reuse the frequency resource for a signal transmitted in subframe #n+d for a potential transmission of another transport block in subframe #n+e. Here, e is an integer, and is in the relation: d<e. The UE may inform whether to reuse explicitly or implicitly. The e value may be a single value or multiple values. In addition, additionally, it may be informed that subframe #n+e and the next subframes may not use the frequency resource for a signal transmitted in subframe #n+d.

The RX UE that receives a V2X signal decodes a scheduling assignment (SA) transmitted by a TX UE that transmits the V2X signal. In this case, it may be assumed that the same frequency resource is reserved in subframe #n+d+P*j (j=i, 2*i, . . . , J*i) by the scheduling assignment. The P may be 100. The J value may be signaled explicitly by the scheduling assignment or a fixed value (e.g., 1). The i value may be explicitly by the scheduling assignment, a preconfigured value or a fixed value. Alternatively, the i value may be an integer between 0 and 10.

[Proposed rule #13] As an example, a V2X TX UE(S) may signal "I" value (refer to I described above) through SA field, and the V2X RX UE(S) may identify on which timing the V2X TS UE(S) (additionally) reserves (/uses) the same frequency resource which is designated (scheduled) through the (corresponding) SA (e.g., in the case that the V2X RX UE(S) signals "I" value as "2", the V2X RX UE(S) may assume that the same frequency resource which is designated (scheduled) through the (corresponding) SA on "TTI #(N+D)", "TTI #(N+D+2*P)". Here, for example, for the convenience of description, it is assumed that "I" value is selected (4 bits) within preconfigured (/signaled) "[0, 1, . . . , 10]" range and/or "J" value (refer to J described above) is fixed to "1". Here, for example, according to a predefined parameter (e.g., velocity/(progressing) direction variance, etc.), in the case that the V2X TX UE(S) is hard to expect (its own) V2X MESSAGE generation period accurately, a V2X MESSAGE generation period is changed, it may not be efficient to reserve (future) resource according to the method above. Here, for example, as a method that may solve the corresponding problem, in the case that a specific V2X TX UE(S) signals "I" value (on SA field as "2", the V2X RX UE assume that the same frequency resource (HARD_RSC) designated (scheduled) through the (corresponding) SA on "TTI #(N+D)", "TTI #(N+D+2*P)" is reserved in "EXPLICIT (or HARD)" manner, but the same frequency resource (SOFT_RSC) (designated (scheduled) through the (corresponding) SA) on the timing based on remaining "I" value (e.g., "TTI #(N+D+1*P)", "TTI #(N+D+3*P)", "TTI #(N+D+4*P)", "TTI #(N+D+5*P)", "TTI #(N+D+6*P)", "TTI #(N+D+7*P)", "TTI #(N+D+8*P)", "TTI #(N+D+9*P)", "TTI #(N+D+10*P)") (which is not signaled through SA (field)) is reserved in "POTENTIAL (or SOFT)" manner. Here, for example, the rule (and/or SOFT_ RSC reservation) may be applied only for a specific RESOURCE ALLOCATION MODE which is preconfigured (/signaled) (e.g., not applied for MODE 1 and/or RESOURCE SELECTION based on RESOURCE SELECTION (/PARTIAL SENSING)). Here, for example, in the case that the rule is applied, when the V2X TX UE(S) determines whether the HARD_RSC and SOFT_RSC of another V2X TX UE(S) (determined based on SA decoding) is selectable candidate resource or resource to be excluded depending on "DM-RS POWER/ENERGY MEASUREMENT" value (STEP 2 of Table 2), the V2X TX UE(S) may apply a preconfigured (/signaled) different (DM-RS POWER/ENERGY MEASUREMENT) threshold values. Here, for example, the threshold value (HARD_TH) related to HARD_RSC may be configured (/signaled) as lower (or higher) than that (SOFT_TH) of SOFT_RSC (e.g., this may be interpreted that HARD_RSC is protected with relatively higher priority than SOFT_RSC). Here, for example, the threshold value related to SOFT_RSC may be configured (/signaled) in the form of the offset value (HARD_THOFF) for that of HARD_RSC (and/or the threshold value related to HARD_RSC may be configured (/signaled) in the form of the offset value (SOFT_THOFF) for that of SOFT_RSC. Here, for example, (A) when HARD_THOFF value is set (/signaled) to "0", other V2X TX UE(S) determines whether to exclude HARD_RSC and SOFT_RSC with the same priority depending on "DM-RS POWER/ENERGY MEASUREMENT" value (STEP 2 of Table 2) (or interpreted that the (corresponding) V2X TX UE(S) is intended to reserve the same frequency resource which is designated (/scheduled) through the (corresponding) SA) on the timing based on all "1" values), (B) when HARD_THOFF value is set (/signaled) to "infinite (or relatively greater value)", other V2X TX UE(S) determines that SOFT_RSC (of the corresponding V2X TX UE(S)) is selectable candidate resource always (or with very high probability) (STEP 2 of Table 2). Here, for example, the (corresponding) threshold value (e.g., HARD_TH, SOFT_TH) (or offset value (e.g., HARD_THOFF (or SOFT_THOFF)) may be adjusted) depending on (A) V2X MESSAGE PRIORITY of other V2X TX UE(S) identified based on SA decoding (and/or V2X MESSAGE PRIORITY to be transmitted by the V2X TX UE(S) itself) and/or (B) the (corresponding) threshold value (e.g., HARD_TH, SOFT_TH) for each (measured) "CONGESTION LEVEL" is differently configured (/signaled) (and/or (C) V2X MESSAGE PRIORITY of other V2X TX UE(S) identified based on SA decoding (and/or V2X MESSAGE PRIORITY to be transmitted by the V2X TX UE(S) itself) and/or (D) (measured) "CONGESTION LEVEL". Here, for example, the V2X TX UE(S) applies a preconfigured (/signaled) different offset values to "DM-RS POWER/ENERGY MEASUREMENT" value related to HARD_RSC and SOFT_RSC of other V2X TX UE(S) (determined based on SA decoding), and accordingly, the V2X TX UE(S) may determine whether it is selectable candidate resource or resource to be excluded (STEP 2 of Table 2). Here, for example, the offset value related to HARD_RSC (e.g., assumed to be "negative value") may be configured (/signaled) to be greater (or smaller) than that of SOFT_RSC (e.g., (e.g., this may be interpreted that HARD_RSC is protected with relatively higher priority than SOFT_RSC). Here, for example, only the offset value for "DM-RS POWER/ENERGY MEASUREMENT" value related to SOFT_RSC (or HARD_RS) may be preconfigured (/signaled). Here, for example, the (corresponding) offset value may be adjusted according to (A) V2X MESSAGE PRIORITY of other V2X TX UE(S) identified based on SA decoding (and/or V2X MESSAGE PRIORITY to be transmitted by the V2X TX UE(S) itself) and/or (B) the (corresponding) offset value is differently configured for each (measured) "CONGESTION LEVEL (and/or (C) V2X MESSAGE PRIORITY of other V2X TX UE(S) identified based on SA decoding (and/or V2X MESSAGE PRIORITY to be transmitted by the V2X TX UE(S) itself) and/or (D) (measured) "CONGESTION LEVEL". Here, for example, the V2X TX UE(S) selects (/reserves) SA TX related resource, for the SA transport resource(s) interlinked with data transmission(s) on HARD_RSC and SOFT_RSC of other V2X TX UE(S), (likewise) the V2X TX UE(S) applies a preconfigured (/signaled) different "DM-RS POWER/ENERGY MEASUREMENT" threshold values, and accordingly, the V2X TX UE(S) may determine whether it is selectable candidate resource or resource to be excluded. Here, for example, (A) "TIME GAP" (range) value between SA transmission timing and the interlinked data transmission timing may be differently configured (/signaled) depending on a resource type of the corresponding data (e.g., HARD_RSC, SOFT_RSC) and/or (B) data related (transmission) power value (/(transmission) power control parameter) transmitted through different resource types (and/or (maximum allowable) MCS value) may be differently (or independently) configured (/signaled). As an example, the V2X message transmission period of PEDESTRIAN UE (P-UE) (e.g., "1000 MS") may be configured (/signaled) relatively longer than that of VEHICLE UE (V-UE) (e.g., "100 MS") (considering relatively slow moving speed and/or power saving requirement). Here, for example, when a P-UE transmits a V2X message, "1" value on the SA field value indicates a preconfigured (/signaled) specific value (or "RESERVED STATE"), and accordingly, other V2X TX UE(S) may (A) interpret that the (corresponding) SA (and/or interlinked data) transmission is performed by the P-UE and/or (B) interpret that the (corresponding) SA based (scheduled) resource is reserved with (different) period (relatively longer (than the case of V-UE)) which is preconfigured (/signaled).

[Proposed rule #14] As an example, (A) in the case that a V2X TX UE(S) operates (or activates) (different service types and/or V2X MESSAGE PRIORITY related) multiple (SIDELINK (SL)) SPS PROCESS (/CONFIGURATION) at the same time, when selecting a specific (SL) SPS PROCESS (/CONFIGURATION) related transport resource, it may be interpreted that the V2X TX UE(S) excludes a previously (or already) selected other (SL) SPS PROCESS (/CONFIGURATION) related resource (here, resource may also be interpreted as a subframe) from (selectable) candidate resource (STEP 2 of Table 2) and/or (B) it may be defined that the V2X TX UE(S) excludes a preconfigured (/signaled) synchronization signal (PRIMARY SIDELINK SYNCHRONIZATION SIGNAL (PSSS)/SECONDARY SIDELINK SYNCHRONIZATION SIGNAL (SSSS)) (and/or PHYSICAL SIDELINK BROADCAST CHANNEL (PSBCH)) transport (time (/frequency)) resource (e.g., "subframe") from (selectable) candidate resource (STEP 2 of Table 2).

[Proposed rule #15] As an example, in the case that a V2X (TB) transmission operation is omitted on a specific timing according to a preconfigured (/signaled) "(DROPPING) PRIORITY" (e.g., "WAN UL TX(S)" (and/or "synchronization signal transport (resource)") and a V2X (MESSAGE) TX(S) are (partially or entirely) overlapped in a time (/frequency) domain, a resource reselection related counter (Table 2) value may be defined to be decreased without any reason (and/or defined to be resource reselection operation is triggered). As an example, when "SYNCHRONIZATION SOURCE" of a V2X TX UE(S) itself is changed, for the V2X TX UE(S), it may be defined that the resource reselection operation is triggered (and/or it may be defined that a difference between the changed "SYNCHRONIZATION SOURCE" related time (/frequency) synchronization value and the existing "SYNCHRONIZATION SOURCE" related time (/frequency) synchronization value is greater than a preconfigured (/signaled) (maximum allowable) threshold value). For example, when "SYNCHRONIZATION SOURCE" of a V2X TX UE(S) itself is changed, (A) it may be defined that (in the case that a remaining "LATENCY" value is smaller than a preconfigured (/signaled) threshold value) the V2X TX UE(S) randomly selects (/reserves) a transport resource (e.g., it may be defined that the randomly selected resource is used only for a preconfigured (/signaled) number of "TRANSPORT BLOCK (TB)" transmissions, and "TB" transmission is performed through a sensing based selected (/reserved) resource thereafter) and/or (B) it may be defined that after the V2X TX UE(S) performs sensing operation during a preconfigured (/signaled) (time) duration, the V2X TX UE(S) selects (/reserves) a transport resource. Here, for example, after the V2X TX UE(S) performs sensing operation for (preconfigured (/signaled) value based) multiple (different) "SYNCHRONIZATION SOURCE" related communications, when "SYNCHRONIZATION SOURCE" is changed to one of them, the V2X TX UE(S) may select (/reserve) a transport resource by using the corresponding (changed "SYNCHRONIZATION SOURCE" related) sensing result value.

[Proposed rule #16] As an example, (A) it may be defined to (independently) report whether there is a simultaneous reception (/transmission) capability for a few carriers of which (time (/frequency)) synchronization is the same (or (time (/frequency)) synchronization difference is smaller than a preconfigured (/signaled) threshold value) and/or whether there is a simultaneous reception (/transmission) capability for a few carriers of which (time (/frequency)) synchronization is the same (or (time (/frequency)) synchronization difference is greater than a preconfigured (/signaled) threshold value). Here, for example, the (serving) base station that receives such (capability) information, considering the capability of the (corresponding) V2X UE(S), may configure (/signal) a proper number of carriers for V2X communication (reception (/transmission)) use. For example, for MODE 1 V2X communication, a (serving) base station may signal the related information such that V2X TX operation of different MCS (range) values and/or RESOURCE BLOCK (RB) number and/or (HARQ) retransmission count is performed according to an absolute velocity of V2X UE(S) and/or "SYNCHRONIZATION SOURCE TYPE (e.g., GNSS, ENB)". For example, the (serving) base station may adjust "position based pool size" based on the velocity (/position) information reported from the V2X UE(S) (located in its own coverage). Here, for example, the (serving) base station may differently configure (/signal) "position based pool size" information for each velocity (/position) to the V2X UE(S) (located in its own coverage, and the V2X UE(S) may perform V2X communication by using the "position based pool size" information that corresponds to its own velocity.

[Proposed rule #17] As an example, (considering (A) HARQ COMBINING operation for a specific TB related different REDUNDANCY VERSION (RV) (data) reception and/or (B) PSCCH payload size (increase) required for data (re)transmission related (time) resource position information signaling) a V2X TX UE(S) selects a specific (single) TB related multiple number (NUM_RETX) of data (re)transmission related time resources within a preconfigured (/signaled) duration (LIM_TIMEWIN). Here, for example, in the case that the rule is applied, the V2X TX UE(S) may perform sensing based resource (re)selection (e.g., STEP 2/3 of Table 2) according to the following (a part of) method. Here, for example, LIM_TIMEWIN value may be adjusted (or differently configured (/signaled) depending on (A) V2X MESSAGE PRIORITY that the V2X TX UE(S) is intended to transmit and/or (B) (measured) CONGESTION LEVEL and/or (C) V2X MESSAGE (/SERVICE) related TARGET LATENCY (/RELIABILITY) REQUIREMENT.

(Example #17-1) As an example, as a result of performing (Table 2) STEP 2 (e.g., OPTION 2-1), among the derived (not excluded) resources (NOEX_RSC) in the case that it is unable to select (all) (specific TB related) NUM_RETX number of data (re)transmission related time resources within LIM_TIMEWIN (or in the case that the number of candidates selectable within LIM_TIMEWIN is smaller than a preconfigured (/signaled) threshold value), (A) it may be defined that (all) (specific TB related) NUM_RETX number of data (re)transmission are omitted and/or (B) it may be defined that (specific TB related) data (re)transmission is (partially) performed using only the (maximum number of) time resources which are selectable within LIM_TIMEWIN and/or (C) (so as to be used (/applied) in this case) it may be defined that (specific TB related) NUM_RETX number of data (re)transmission related time resources are selected within an additionally configured (/signaled) duration value (FLIM_TIMEWIN) (e.g., "FLIM_TIMEWIN>LIM_TIMEWIN") in advance (e.g., may be omitted in the case that a selectable candidate is not present within FLIM_TIMEWIN) and/or (D) it may be defined that (resource exclusion related) PSSCH DM-RS RSRP THRESHOLD of STEP 2 is increased by a preconfigured (/signaled) offset value until (all) (specific TB related) NUM_RETX number of data (re)transmission related time resources are selected within LIM_TIMEWIN (or FLIM_TIMEWIN) (or until the number of candidate which is selectable within LIM_TIMEWIN becomes greater than a preconfigured (/signaled) threshold value. For example, ((according to the rule) after (Table 2) STEP 2 is performed) when (specific TB related) NUM_RETX number of data (re)transmission related time resources are selected according to a predefined rule (e.g., random selection method) among the resources in which lower (or higher) X % of PSSCH DM-RS RSRP values are measured, in the case that the selected (a part of) time resources are not existed within LIM_TIMEWIN (or FLIM_TIMEWIN), (A) it may be defined to perform reselection (until the condition is satisfied) and/or (B) it may be defined to omit (all) (specific TB related) NUM_RETX number of data (re) transmission and/or (C) it may be defined to perform (specific TB related) data (re)transmission (partially) by using the time resources located within LIM_TIMEWIN (or FLIM_TIMEWIN).

[Proposed rule #18] As an example, PSCCH DM-RS related CYCLIC SHIFT (CS) (and/or OCC) value is fixed to a predefined (/signaled) (specific) value (e.g., "CS INDEX=0", "OCC=[+1+1]"). Here, for example, in the case that the rule is applied, when PSCCH transports are (partially) overlapped among different V2X UE(S), a problem occurs that PSCCH related reception performance may not be guaranteed. Here, for example, in order to alleviate the problem, a V2X TX UE(S) may select (one) CS (and/or OCC) value according to a predefined rule (e.g., random selection method) within a preconfigured (/signaled) CS SET (and/or OCC SET). Here, for example, the CS (INDEX) SET may be configured (/signaled) with "CS INDEX 0, 3, 6, 9". Here, for example, (since it is unknown the value selected by a V2X TX UE(S)) a V2X RX UE(S) performs blind detection (BD) operation for (all) CSs (and/or OCCs) in the corresponding CS SET (and/or OCC SET). Here, for example, the CS (and/or OCC) value within CS SET (and/or OCC SET) selected by the V2X TX UE(S) may be defined to be randomized (/hopping) by (A) (V2V) subframe (/slot) index and/or (B) V2X TX UE ID (or (TARGET) V2X RX UE ID) and/or (C) function (/equation) having (X-bit) ID transmitted on PSCCH as an input parameter (/seed value) (and/or CS SET (and/or OCC SET) (configuration) of the V2X TX US(S) may be defined to be randomized (/changed) by (D) (V2V) subframe (/slot) index and/or (E) V2X TX UE ID (or (TARGET) V2X RX UE ID) and/or (F) function (/equation) having (X-bit) ID transmitted on PSCCH as an input parameter (/seed value)). Here, for example, the CS SET (and/or OCC SET) (configuration) may be differently configured (/signaled) depending on V2X MESSAGE PRIORITY and/or (measured) CONGESTION LEVEL (that the V2X TX UE(S) is intended to transmit). Here, for example, (in the case that the rule is applied) in order to reduce the complexity in relation to (PSCCH DM-RS) CS (and/or OCC) BD operation of the V2X RX UE(S), (from (serving) base station) a maximum BD count that should be performed (by the V2X RX UE(S)) within a single subframe may be configured (/signaled). Here, for example, the V2X UE(S) may report the BD count information that the V2X UE(S) may perform in a single subframe through a predefined signaling (from (serving) base station). Here, for example, PSCCH SCRAMBLING SEQUENCE GENERATOR may be initialized according to (all) CS (and/or OCC) values (and/or preconfigured (/signaled) C_INIT value (e.g., "510") within (preconfigured (/signaled) CS SET (and/or OCC SET) selected by the V2X TX UE(S). Here, for example, (in the case that the rule is applied) a CS field (e.g., "3 bits") may be defined on PSCCH, and CS field value may be designated by (a single) CS value (SELCS_VAL) which is selected according to a predefined rule (e.g., random selection method) within (preconfigured (/signaled) CS SET by the V2X TX UE(S) (and/or a predefined (randomized (/hopping)) function based derivation (/calculation) value (in the same way) having SELCS_VAL as an input parameter), and PSSCH DM-RS CS value (interlinked with PSCCH) may be configured (/determined) depending on the (designated) CS field value. Here, for example, in the case that the rule is applied, when the interference on PSCCH DM-RS (CS) is alleviated (/randomized), the interference on the (interlinked) PSSCH DM-RS (CS) may also be alleviated (/randomized) (in the same way). Here, for example, (in the case that the rule is applied) the PSSCH DM-RS CS value (interlinked with PSCCH) may be (identically) configured by (a single) PSCCH DM-RS CS value (SELCS_VAL) that the V2X TX UE(S) selects according to a predefined rule (e.g., random selection method) within a preconfigured (/signaled) CS SET (and/or a predefined (randomized (/hopping)) function based derivation (/calculation) value having SELCS_VAL as an input parameter) (without defining CS field (e.g., "3 bits") on PSCCH additionally). Here, for example, PSSCH SCRAMBLING SEQUENCE GENERATOR may be initialized according to CS field value (on PSCCH) (and/or V2X TX UE ID (on PSCCH) (or (TARGET) V2X RX UE ID (or ID of X bits)) and/or (V2V) subframe (/slot) index).

For example, when a V2V communication is performed, PSSCH and/or (the interlinked) PSSCH related (A) DM-RS) SEQUENCE GENERATION RULE and/or (B) (DM-RS) CS(/OCC) INDEX SELECTION(/DETERMINATION) RULE and/or (C) GROUP/SEQUENCE HOPPING RULE, and the like may be defined as represented in Table 7 and Table 8. As an example, the following (a part of) proposed methods propose method for (DM-RS) SEQUENCE (/CS (/OCC) INDEX) (and/or interference) randomizing operation being performed efficiently, in the case that PSCCH and/or PSSCH transport resources between different UEs are (partially or entirely) overlapped.

Hereinafter, with reference to Table 7 and Table 8, when a V2V communication is performed, it is described an example for PSSCH and/or (the interlinked) PSSCH related (A) DM-RS) SEQUENCE GENERATION RULE and/or (B) (DM-RS) CS(/OCC) INDEX SELECTION(/DETERMINATION) RULE and/or (C) GROUP/SEQUENCE HOPPING RULE, and the like. In this case, in V2V WI, only a normal CP may be supported, and a destination ID may not be delivered through SA. Furthermore, 16 CRC bits from SA may be used for generating PSSCH DMRS sequence and data scrambling sequence.

TABLE 7

| Parameter | | PSCCH |
|---|---|---|
| Group hopping | u | disabled 8 |
| Sequence hopping | | Disabled |
| Cyclic shift | $n_{cs,\lambda}$ | Chosen randomly out of (0, 3, 6, 9) by a transmitter, The chosen value is applied to all DMRSs for SA within a subframe |
| Orthogonal sequence | $\lfloor w^\lambda(0)\ w^\lambda(1)\ w^\lambda(2)\ w^\lambda(3) \rfloor$ | [+1 +1 +1 +1] |
| Reference signal length | $M_{sc}^{RS}$ | $M_{sc}^{PSCCH}$ |
| Number of layers | $\upsilon$ | 1 |
| Number of antenna ports | P | 1 |

Herein, it may be that $r_{PSCCH}^{(\lambda)}(m \cdot M_{sc}^{RS}+n)=w^{(\lambda)}(m)r_{u,v}^{(\alpha_\lambda)}(n)$, m=0, 1, 2, 3.

TABLE 8

| Parameter | | PSSCH |
|---|---|---|
| Group hopping | $n_{ID}^{RS}$ $n_s$ $f_{ss}$ | enabled $n_X$ $2n_{ss}^{PSSCH} + k, k = 0, 1$ $\lfloor n_X/16 \rfloor \mod 30$ |
| Sequence hopping | | disabled |
| Cyclic shift | $n_{cs,\lambda}$ | $\lfloor n_X/2 \rfloor \mod 8$ |
| Orthogonal sequence | $\lfloor w^\lambda(0)\ w^\lambda(1)\ w^\lambda(2)\ w^\lambda(3) \rfloor$ | [+1 +1 +1 +1] if $n_X \mod 2 = 0$ [+1 −1 +1 −1] if $n_X \mod 2 = 1$ |
| Reference signal length | $M_{sc}^{RS}$ | $M_{sc}^{PSCCH}$ |
| Number of layers | $\upsilon$ | 1 |
| Number of antenna ports | P | 1 |

Herein, it may be that $r_{PSCCH}^{(\lambda)}(m \cdot M_{sc}^{RS}+n)=w^{(\lambda)}(m)r_{u,v}^{(\alpha_\lambda)}(n)$, m=0, 1, 2, 3 and $n_x$ may mean X bits in SA used for generating PSSCH DMRS sequence.

[Proposed rule #19] As an example, among bits (fields) used for determining (the interlinked) PSSCH DM-RS CS index (/value) (e.g., (3) bit value of "$C_{12}, C_{13}, C_{14}$" among 16-bit CRC ($C_0, C_1, \ldots, C_{15}$) of PSCCH), preconfigured (/signaled) (or randomly selected) 2 bits may be SCRAMBLED as selected PSCCH CS index (/value) (e.g., "2 bits"). Here, for example, in the case that the rule is applied, (A) (final) 16-bit CRC of PSCCH may be maintained (/applied) as "$C_0, C_1, \ldots, C_{15}$" values (e.g., it is regarded (/assumed) that only the CRC (and/or bit (field)) used for determining (the interlinked) PSSCH DM-RS CS index (/value) is changed by (the corresponding) SCRAMBLING operation) and/or (B) 16-bit CRC (partially)

changed by (the corresponding) SCRAMBLING operation may be (final) CRC of PSCCH. For example, among 16-bit CRC ($C_0, C_1, \ldots, C_{15}$) of PSCCH, LSB (e.g., in the case that the rule is applied, PSSCH DM-RS OCC index (/value) may also be changed) (or MSB) 2 bits (and/or preconfigured (/signaled) (or randomly selected) 2 bits) may be SCRAMBLED as selected PSCCH CS index (/value) (e.g., "2 bits"). Here, for example, in the case that the rule is applied, (A) 16-bit CRC (partially) changed by (the corresponding) SCRAMBLING operation may be (final) CRC of PSCCH and/or (B) (final) 16-bit CRC of PSCCH may be maintained (/applied) as "$C_0, C_1, \ldots, C_{15}$" values (e.g., it is regarded (/assumed) that only the CRC (and/or bit (field)) used for determining (the interlinked) PSSCH DM-RS CS index (/value) is changed by (the corresponding) SCRAMBLING operation). As an example, for each PSCCH CS index (/value) (e.g., "2 bits"), (different) 16 bits for SCRAMBLING use may be preconfigured (/signaled), and a UE may (A) SCRAMBLE 16 bits ($S_0, S_1, \ldots, S_{15}$) of SCRAMBLING use interlinked with the selected PSCCH CS index (/value) and (the generated) 16-bit CRC ($C_0, C_1, \ldots, C_{15}$), and then (the corresponding) SCRAMBLING result values ($W_0, W_1, \ldots, W_{15}$) become final 16-bit CRC of PSCCH and/or (B) maintain (/apply) (final) 16-bit CRC of PSCCH as "$C_0, C_1, \ldots, C_{15}$" values, but use (/assume) only the 16-bit CRC (and/or bit (field)) used for determining (the interlinked) PSSCH DM-RS CS index (/value) as "$W_0, W_1, \ldots, W_{15}$" value (and/or (3) bit value of "$W_{12}, W_{13}, W_{14}$" among "$W_0, W_1, \ldots, W_{15}$").

As an example, (a) SCI FOMRAT configuration field(s) used when performing MODE 2 V2V SCHEDULING (MODE2_SCH) operation and/or (B) DCI FOMRAT configuration field(s) used when performing MODE 1 DYNAMIC V2V SCHEDULING (MODE1_DYN) operation may be defined as below. Here, for example, FRA_INRETX field (similar to LVRB format of the conventional LTE system) may be defined such that RESOURCE INDICATION VALUE (RIV) value informs (A) start sub-channel index (/position) information (SUB_START) and/or sub-channel length (/number) information (SUB_LENGTH) which is contiguously allocated (/positioned) (on a frequency domain). Here, for example, in the case that two times of PSSCH transmissions are configured (/signaled) for a specific (single) TB transmission, (A) SUB_START value may be interpreted as start index (/position) information (SECDATA_SUBST) of a sub-channel in which a second PSSCH transmission is performed, and/or (B) SUB_LENGTH value may be interpreted as sub-channel length (/number) information (SFDATA_SUBLN) used for the second PSSCH transmission. Here, for example, start index (/position) information (FIRDATA_SUBST) in which a first PSSCH transmission is performed may be implicitly identified by a RX UE through (one-to-one) mapping (/linkage) relation between preconfigured (/signaled) "(blind) detected) (first) PSCCH resource index (/position) information" and "start index (/position) information of a sub-channel in which (the interlinked) (first) PSSCH transmission is performed (not directly signaled through FRA_INRETX).

Hereinafter, it is described an example for (A) SCI FOMRAT configuration field(s) used when performing MODE2_SCH operation and/or (B) DCI FOMRAT configuration field(s) used when performing MODE1_DYN operation.

For SCI, 1) PRIORITY: 3 bits, 2) resource reservation: 4 bits, 3) MCS: 5 bits, 4) CRC: 16 bits, 5) retransmission index (RETX_INDEX): 1 bit, 6) time gap (TGAP_INIRETX) between transmission start and retransmission: 4 bits, 7) frequency resource position (FRA_INRETX) for transmission start and retransmission: 8 bit, 8) reserved bit (RSV_BIT): 7 bits may be configured.

DCI may include: 1) CIF: 3 bits, 2) lowest index (PSCCH_RA) of a sub-channel allocated for transmission start: 5 bits, 3) time gap between transmission start and retransmission (as SA contents): 4 bits, 4) frequency resource position (FRA_INRETX) for transmission start and retransmission: 8 bit.

[Proposed rule #20] As an example, in the case that one time of PSSCH transmission is configured (/signaled) for a specific (single) TB transmission, part of information of FRA_INRETX field (described above) may be unnecessary. (In other word) As an example, the information required for the case is the sub-channel length (/number) information (FDATA_SUBST) used for (only) the first PSSCH transmission. Here, for example, (the corresponding) unnecessary information related STATE (or value) and/or bit may be defined according to the following (a part of or the whole) rule.

(Example #20-1) As an example, (A) assuming that (on one subframe) maximum 20 sub-channels may be configured (/signaled) for (V2V) resource pool, the bit number required for representing FDATA_SUBLN information may be "5" bits (i.e., "CEILING ($LOG_2(20)$)=5" (here, for example, CEILING (X) is a function of deriving a minimum information value which is greater than or equal to X) and/or (B) assuming that (on one subframe) K sub-channels may be configured (/signaled) for (V2V) resource pool, the bit number required for representing FDATA_SUBLN information may be "CEILING ($LOG_2(K)$)". Here, for example, in the case that two times of PSSCH transmissions are configured (/signaled) for a specific (single) TB transmission, assuming that (required) FRA_INRETX field size is "Q" bits (e.g., "Q=8"), remaining bits of "(Q−5)" (and/or "(Q−CEILING ($LOG_2(K)$))") may be interpreted (/regarded) as unnecessary information related bit.

(Example #20-2) As an example, in the case that two times of PSSCH transmissions are configured (/signaled) for a specific (single) TB transmission, assuming that (required) FRA_INRETX field size is "Q" bits, (preconfigured (/signaled)) multiple (a part of or all) SECDATA_SUBST values which may be designated together with (actually required) a specific (single) FDATA_SUBLN (or SFDATA_SUBLN) value may be interpreted (/regarded) as unnecessary information related bit.

(Example #20-3) As an example, in the case that one time of PSSCH transmission is configured (/signaled) for a specific (single) TB transmission, since a V2X RX UE(S) may identify whether the (corresponding) V2X TX UE performs one time or two times of PSSCH transmission using TGAP_INIRETX, the V2X RX UE(S) may interpret (/regard) RETX_INDEX related STATE (or value) as unnecessary information. As another example, in the case that one time of PSSCH transmission is configured (/signaled) for a specific (single) TB transmission, RETX_INDEX related value (or STATE) may be designated as a preconfigured (/signaled) (specific) value (or STATE). Here, for example, (RETX_INDEX related) the corresponding (specific) value (or STATE) may be used for "VIRTUAL CRC" use.

(Example #20-4) As an example, among RSV_BIT field related bits (e.g., "7" bits), a preconfigured (/signaled) some bits may be interpreted (/regarded) as unnecessary information related bit (or value).

For example, according to the following (a part of) rule, (above described) unnecessary information related STATE (or value) and/or bit is randomized, PSSCH (DM-RS) SEQUENCE (/CS (/OCC) INDEX) COLLISION problem occurred when PSSCH transport resources of different UEs are (partially or entirely) overlapped may be alleviated (e.g., (through the corresponding operation) PSCCH CRC is randomized, and accordingly, (finally) PSSCH (DM-RS) SEQUENCE (/CS (/OCC) INDEX may be randomized). Here, for example, the case that the above described unnecessary information related STATE (or value) and/or bit occurs (e.g., the case that one time of PSSCH transmission is configured (/signaled) for a specific (single) TB transmission) is just an example, (a part of or the whole) proposed method of the present disclosure may be extendedly applied to various cases (in which unnecessary information related STATE (or value) and/or bit occurs) (e.g., (in the case of MODE1_DYN DCI FORMAT and/or MODE2_SCH SCI FORMAT) (additional) extra bit which is generated when FRA_INRETX size is changed (according to the total number (K) of sub-channels constructing a preconfigured (/signaled) V2V resource pool (within a single subframe) (e.g., "(8−CEILING (LOG$_2$ (K (K+1)/2)) (FRA_INRETX size))" (and/or "(8−CEILING (LOG$_2$ (K (K+1)/2)) (FRA_INRETX size)−CEILING (LOG 2 (K)) (PSCCH_RA ∃ㄱ))")) (and/or a predefined (/signaled) (target) payload size (e.g., (additional) extra bit generated when FRA_INRETX size is changed from (target) payload size of MODE1_DYN DCI FORMAT, MODE2_SCH SCI FORMAT may be (existing) DCI FORMAT 0 payload size (refer to the description above), 48 bits (refer to the description above)). Here, for example, through the corresponding randomization operation (of unnecessary information related STATE (or value) and/or bit), 16-bit CRC ($C_0, C_1, \ldots, C_{15}$) is randomized (/changed), and finally, PSSCH DM-RS CS (/SEQUENCE/ OCC) (index) is also randomized (/changed) (refer to Table 7 and/or Table 8). Here, for example, (A) (above described) (Example #20-3) and/or (B) (Example #20-4) and/or (C) application of the following (a part of) rule to (additional) extra bit generated when FRA_INRETX size is changed according to the total number (K) of sub-channels constructing a preconfigured (/signaled) V2V resource pool (within a single subframe) may be limited to the case that the number of total sub-channels constructing V2V resource pool is designated as a preconfigured (/signaled) value (e.g., "1") or smaller (e.g., this may be interpreted as the situation that PSSCH DMRS (/PSCCH CRC) randomization is hard to be derived additionally (through the corresponding field) since FRA_INRETX size becomes small (e.g., "0")).

(Rule #20-1) As an example, a TX UE may designate (above described) unnecessary information related STATE (or value) and/or bit as a randomly selected value (and/or a preconfigured (/signaled) value from (serving) base station (or network)). Here, for example, the condition for which such a rule is applied may be differently defined (/signaled) for each of (above described) unnecessary information related STATE (or value) and/or bit (e.g., (Example #20-1), (Example #20-2), (Example #20-3), (Example #20-4)). Here, for example, in the case that the number of sub-channels configured (/signaled) as a resource pool (for V2X communication) is "1" (and/or in the case that one time of PSSCH transmission is configured (/signaled) for a specific (single) TB transmission), since (actually used) FRA_INRETX size becomes "0", the rule may be applied to the unnecessary information related STATE (or value) and/or bit of (Example #20-3) (e.g., RETX_INDEX related STATE (or value)), and otherwise (e.g., in the case that the number of sub-channels configured (/signaled) as a resource pool (for V2X communication) is not "1" (and/or in the case that one time of PSSCH transmission is configured (/signaled) for a specific (single) TB transmission)), the rule may be applied to the unnecessary information related STATE (or value) and/or bit of (Example #20-2) (e.g., preconfigured (/signaled)) multiple (a part of or all) SECDATA_SUBST values which may be designated together with (actually required) a specific (single) FDATA_SUBLN value). Here, for example, (under the environment in which one time of PSSCH transmission is configured (/signaled) for a specific (single) TB transmission) (for V2X communication) without regard to the number of sub-channels configured (/signaled) as a resource pool, the rule may be applied to the unnecessary information related STATE (or value) and/or bit of (Example #20-3) (e.g., RETX_INDEX related STATE (or value)), and/or the rule may be applied to the unnecessary information related STATE (or value) and/or bit of (Example #20-2) only in the case that the number of sub-channels configured (/signaled) as a resource pool (for V2X communication) is not "1" (and/or greater than "1") (e.g., preconfigured (/signaled)) multiple (a part of or all) SECDATA_SUBST values which may be designated together with (actually required) a specific (single) FDATA_SUBLN value).

(Rule #20-2) As an example, a TX UE may designate (above described) unnecessary information related STATE (or value) and/or bit according to a predefined (randomized (/hopping)) function based derivation (/calculation) value having (A) TX (or (target) RX UE identifier and/or (B) selected PSCCH CS index (/value) (e.g., "2 bits") as an input parameter (or a value derived by (C) TX (or (target) RX UE identifier and/or (D) selected PSCCH CS index (/value) (e.g., "2 bits")). Here, for example, when (above described) unnecessary information related bit is defined in the form of (Example #20-1), in the case that "(Q−5)" (and/or "(Q−CEILING (LOG$_2$(K)))") (e.g., "Q=8", "K=20") is greater than a bit value (PC_SELCSBIT) (e.g., "2 bits") indicating the selected PSCCH CS index (/value), a (bit) position that should be designated as PC_SELCSBIT bit (/value) (or a bit (/value) derived by PC_SELCSBIT bit) may be a preconfigured (/signaled) and/or (B) the remaining bit (e.g., "1" bit) of "(Q−5−PC_SELCSBIT)" (and/or "(Q−CEILING (LOG$_2$ (K))−PC_SELCSBIT)") may be ZERO PADDED (or designated as a preconfigured (/signaled) specific value).

As an example, in the case that one time of PSSCH transmission is configured (/signaled) for a specific (single) TB transmission, (above described) FRA_INRETX field size may be (exceptionally) reduced (e.g., "(Q−5)", "(Q−CEILING (LOG$_2$(K)))").

As an example, the PSCCH CRC used for determining a parameter such as PSSCH related (DM-RS) SEQUENCE (/CS (/OCC) INDEX may be defined as PSCCH CRC transmitted on the same timing of PSSCH (in the case that PSSCH (interlinked) with PSCCH is transmitted in "FDM" form) (and/or PSCCH CRC transmitted (necessarily) together for PSSCH transmission).

Hereinafter, the present disclosure is described.

For V2X message (/packet) transmission of relatively short (or long) 'delay (/or high (or low) service quality (QoS) requirement' or shorter (or longer) than a preconfigured (/signaled) threshold value, and/or 'priority level' of relatively higher (or lower) (than a preconfigured (/signaled) threshold value), in the case that a maximum value (/minimum value) range of 'transport resource (re)selection window' is adjusted (e.g., reduced), the following (a part of or the whole) rule may be applied.

The (a part of or the whole) rule of the present disclosure may be limitedly applied only to the case that a minimum value (/maximum value) of (adjusted) 'transport resource (re)selection window' is smaller (or greater) than a preconfigured (/signaled) threshold value (e.g., 20 ms) or the case that selectable candidate resources of the number smaller (or greater) than a preconfigured (/signaled) threshold value is existed (/remained).

(Example #1) After PSSCH-RSRP threshold value based candidate (transport) resource exclusion operation interlinked with PPPP value of V2X message (/packet) (this is referred to as STEP 2), even in the case that remaining candidate (transport) resource ratio (/number) is smaller than a preconfigured (/signaled) threshold value in a transport resource (re)selection window, a preconfigured (/signaled) offset value (e.g., 3 dB) based PSSCH-RSRP threshold value increase and candidate (transport) resource exclusion operation may not be performed again.

Figure 39:
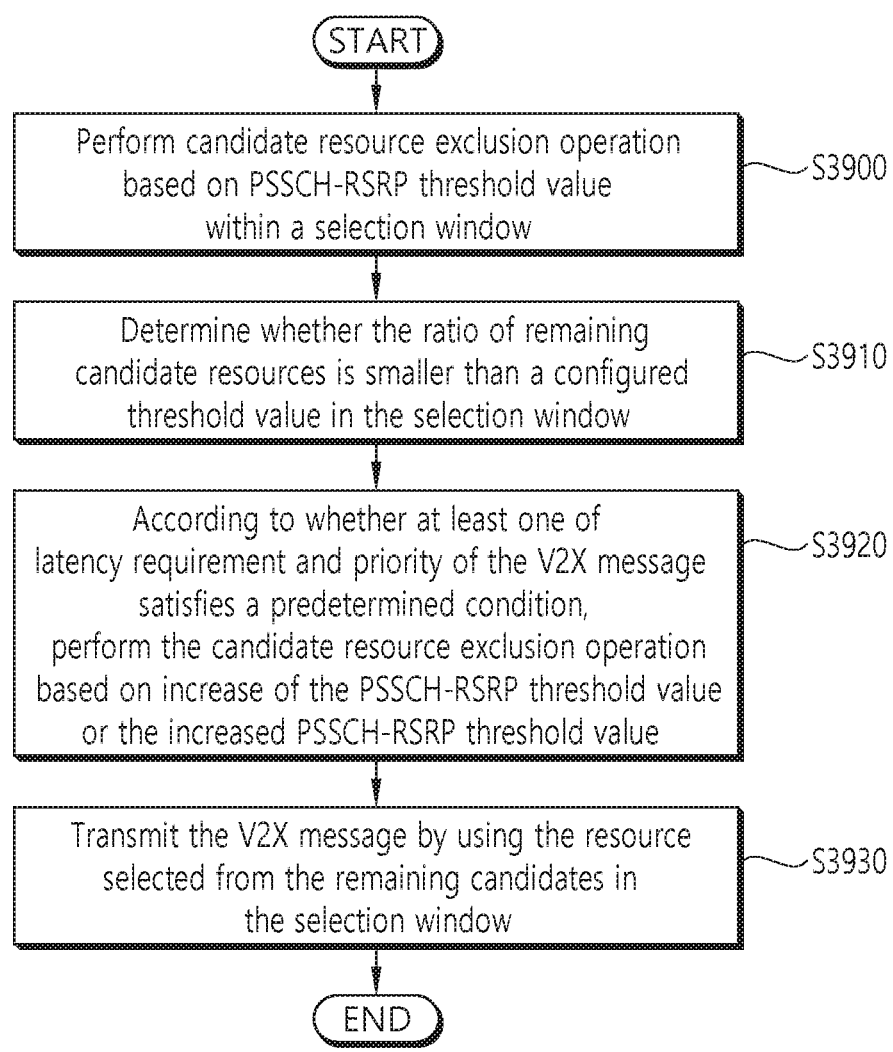
FIG. 39 illustrates a method for transmitting a V2X message according to an embodiment of the present disclosure.

FIG. 39 illustrates a method for transmitting a V2X message according to an embodiment of the present disclosure.

Referring to FIG. 39, a UE performs candidate resource exclusion operation based on PSSCH-RSRP threshold value within a selection window (step, S3900).

For example, after the UE decodes scheduling assignment (SA) transmitted by another UE, the UE may measure RSRP by using demodulation reference signal (DMRS) in the PSCCH region schedule by the SA. Such a RSRP may be referred to as PSSCH-RSRP. The PSSCH region may be in the selection window. The selection window may mean total set of candidate resources for selection V2X resources. The UE may exclude the resource of which PSSCH-RSRP value is greater than a preconfigured (/signaled) threshold value from the selection window. That fact that PSSCH-RSRP value is greater than a threshold value may be interpreted as interference exerted by other UE is greater than interference by the threshold value.

The UE determines whether the ratio (/number) of remaining candidate resources is smaller than a configured threshold value in the selection window (step, S3910). That is, after the UE exclude a resource of which PSSCH-RSRP value is greater than a preconfigured (/signaled) threshold value from the selection window, the UE determines the number of the remaining candidate resources among the entire candidate resources.

In the case that the ratio (/number) is smaller than the threshold value, according to whether at least one of latency requirement and priority of the V2X message satisfies a predetermined condition, the UE performs the candidate resource exclusion operation based on increase of the PSSCH-RSRP threshold value or the increased PSSCH-RSRP threshold value (step, S3920).

For example, in the case that the latency requirement of the V2X message is longer than a configured threshold value or the priority of the V2X message is lower than a configured threshold value, the UE may increase the PSSCH-RSRP threshold value (e.g., increase 3 dB) and perform the candidate resource exclusion operation based on the increased PSSCH-RSRP threshold value. Then, the ratio/number of the remaining resources may increase after the candidate resource exclusion operation.

On the contrary, in the case that the latency requirement of the V2X message is shorter than a configured threshold value or the priority of the V2X message is higher than a configured threshold value, the UE may not increase the PSSCH-RSRP threshold value and may not perform the candidate resource exclusion operation based on the increased PSSCH-RSRP threshold value again.

That is, in the case that a property of the V2X message satisfies a specific condition, for example, in the case that the required delay time is shorter than a threshold value, the required QoS is higher than a threshold value, in the case of important message of which priority is higher than a threshold value, and the like, the UE may not increase the PSSCH-RSRP threshold value or may not perform the candidate resource exclusion operation based on the increased PSSCH-RSRP threshold value again. As a result, the candidate resources remained in the selection window are resources of which interference is low, and among the resources, a resource for V2X message transmission is selected.

The UE transmits the V2X message by using the resource selected from the remaining candidates in the selection window (step, S3930).

According to the present disclosure, it may be prevented/alleviated that a resource in which (relatively) high interference is measured is finally selected within a relatively reduced transport resource (re)selection window (i.e., interpreted as total candidate (transport) resource number is reduced).

Figure 40:
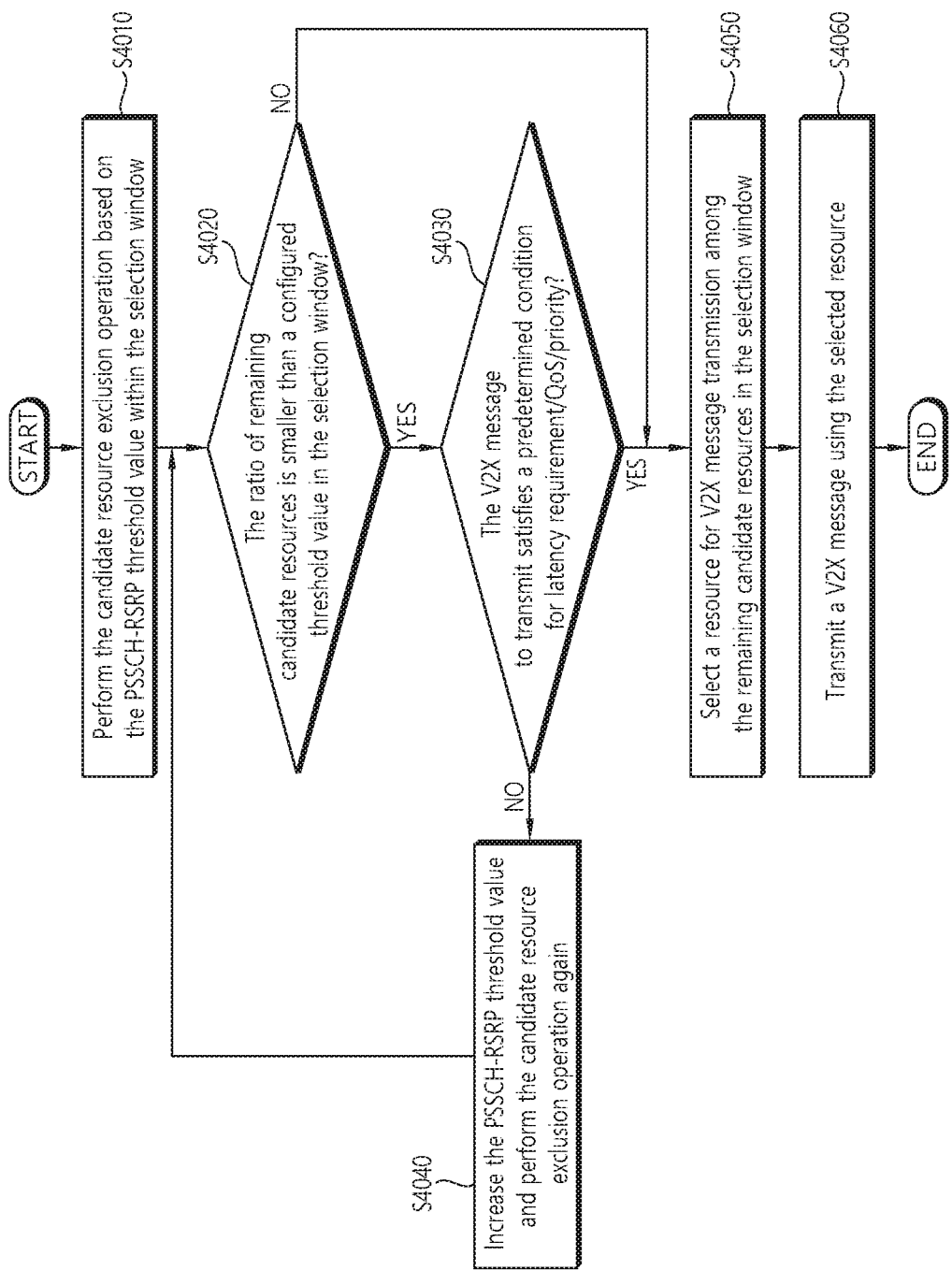
FIG. 40 illustrates a particular example to which Example #1 is applied.

FIG. 40 illustrates a particular example to which Example #1 is applied.

Referring to FIG. 40, the UE performs the candidate resource exclusion operation based on the PSSCH-RSRP threshold value within the selection window (step, S4010).

The UE determines whether the ratio of remaining candidate resources is smaller than a configured threshold value in the selection window (step, S4020), and in the case that the ratio of remaining candidate resources is the configured threshold value or greater, the UE selects a resource for V2X message transmission (step, S4050), and then, transmits the V2X message using the selected resource (step, S4060).

On the contrary, in the case that the ratio of remaining candidate resources is smaller than a configured threshold value, the UE determines whether the V2X message to transmit satisfies a predetermined condition for latency requirement/QoS/priority (step, S4030).

The condition may include a condition on whether latency requirement of the V2X message is shorter than a configured threshold value, a condition on whether QoS required by the V2X message is higher than a configured threshold value, and a condition on whether the priority of the V2X message is higher than a configured threshold value. That is, the UE determines whether the V2X message is a message to be transmitted preferentially with faster/better quality.

In the case that the V2X message satisfies the condition, the UE does not increase the PSSCH-RSRP threshold value or does not perform the candidate resource exclusion operation based on the increased PSSCH-RSRP threshold value again and selects a resource for V2X message transmission among the remaining candidate resources (step, S4050). And then, the UE transmits a V2X message using the selected resource (step, S4060).

On the other hand, in the case that the V2X message does not satisfy the condition, the UE increase the PSSCH-RSRP threshold value and performs the candidate resource exclusion operation based on the increased PSSCH-RSRP threshold value again (step, S4040). Later, the UE returns to the step of determining whether the ratio of remaining candidate resources is smaller than a configured threshold value in the selection window (step, S4020). Through the procedure, when the ratio of remaining candidate resources becomes the configured threshold value or greater, the UE selects a resource for V2X message transmission among the remaining candidate resources after the exclusion operation within the selection window (step, S4050), and then, transmits the V2X message using the selected resource (step, S4060).

(Example #2) The candidate (transport) resource ratio (/number) value or the corresponding remained candidate (transport) resource ratio (/number) that should be remained at the least after PSSCH-RSRP threshold value based candidate (transport) resource exclusion operation (i.e., STEP 2 operation) is smaller than a preconfigured (/signaled) threshold value, after an offset value added to the (related) PSSCH-RSRP threshold value or S-RSSI based candidate (transport) resource exclusion operation, the candidate (transport) resource ratio (/number) value that should be remained at the least may be signaled by a network (or base station). The candidate (transport) resource ratio (/number) value that should be remained at the least may be relatively smaller (or greater) value than other type (/requirement) of V2X message (/packet).

In the case that the rule is applied, a network (or base station) may control the (average) interference level existed in the (transport) resource selected within the relatively reduced transport resource (re)selection window or the probability that the resource selected in the form is selected with being overlapped among multiple UEs, and the like based on predefined information (e.g., CBR) reported from a UE.

Figure 41:
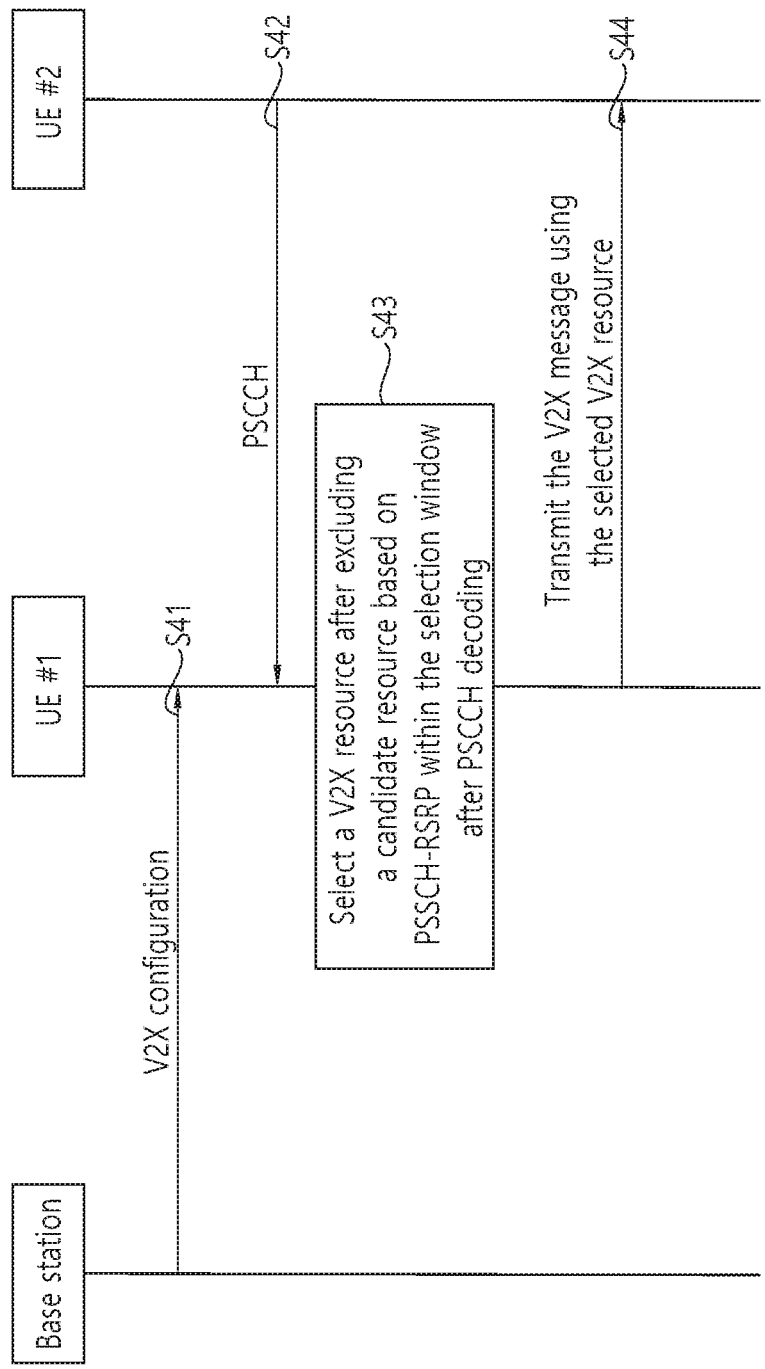
FIG. 41 illustrates an example that a base station and UEs operate according to the present disclosure.

FIG. 41 illustrates an example that a base station and UEs operate according to the present disclosure.

Referring to FIG. 41, a base station provides a V2X configuration to a UE (step, S41). The V2X configuration may include at least one of information for ratio/number of candidate resource that should be remained after PSSCH-RSRP threshold value based candidate resource exclusion operation within a selection window, information for an offset value added to the PSSCH-RSRP threshold value, and information for candidate (transport) resource ratio (/number) that should be remained at the least after S-RSSI based candidate (transport) resource exclusion operation.

UE #1 receives a PSCCH from UE #2 (step, S42), and after decoding the PSCCH, measures PSSCH-RSRP using a DMRS in PSSCH region scheduled by the PSCCH, and based on it, after excluding a candidate resource within the selection window, selects a resource for V2X message transmission (step, S43). This procedure may be according to the operation described in Example #1 and Example #2.

UE #1 transmits the V2X message to UE #2 using the selected V2X resource (step, S44).

Meanwhile, in the case that V2X communication based on carrier aggregation (CA) is performed, relatively much transmission power may be allocated (or a preconfigured (/signaled) GUARANTEED POWER may be applied) to the carrier (this is referred to as CC_HPRI) in which V2X message (/packet) transmission of a PPPP value which is higher than a preconfigured (/signaled) threshold value (or relatively higher) is performed. Alternatively, in the case that V2X message (/packet) transmission (of relatively row PPPP value) is performed (together) on different carrier, the resource selection (/reservation) may be performed by avoiding a time resource (e.g., subframe) used (/reserved) for (the) V2X message (/packet) transmission on CC_HPRI.

In the case that the rule is applied, the performance (/coverage) of a V2X message (/packet) having (relatively) high (or low) PPPP value may be guaranteed. The rule may be limitedly applied only to the POWER LIMITED CASE, that is, the case that transmission power summation of packets transmitted simultaneously on multiple carriers becomes greater than a maximum allowable power of UE.

As another example, in the aspect of resource selection priority, a primary carrier (or reference carrier, this is referred to as CC_REFER) may be configured (/signaled). In this case, the time resource (e.g., subframe) selected in CC_REFER may be excluded additionally, and the resource selection (/reservation) of relatively low priority may be performed.

As an example, the CC_HPRI described above may be (extendedly) interpreted as a kind of CC_REFER. Here, CC_REFER may be designated as a PPPP value higher (or relatively higher) than a preconfigured (/signaled) threshold value, or RELIABILITY REQUIREMENT, or a carrier in which V2X message (/packet) transmission of relatively short LATENCY REQUIREMENT is performed, or CBR measurement value lower than a preconfigured (/signaled) threshold value (or relatively low (or high)), or a carrier of (remaining resource amount than) CR_LIMIT, and the like.

Alternatively, according to the following rule, "minimum T2 value (set)" may be configured (/signaled) from a network. For example, a UE may select a resource in the selection window of [T1, T2] in a time domain, when performing resource selection. In this case, T2 may be selected as (MIN T2≤≤T2≤≤MAX T2) for a set including multiple candidate values.

The examples for the proposed scheme described above may be included as one of the implementation methods of the present disclosure. Accordingly, it is understood that the examples for the proposed scheme may be regarded as a sort of proposed methods. Further, the proposed schemes described above may be implemented independently, but also implemented as a combination (or merge) of a part of proposed schemes. As an example, the present disclosure has been described a proposal method on the basis of the 3GPP LTE system for convenience of description, the scope of the system to which the proposed method is applied may be extended to other systems in addition to the 3GPP LTE system. As an example, the proposed schemes of the present disclosure may be extended and applied for D2D communication. Here, the D2D communication means that the UE communicates directly with another UE using a wireless channel. Here, for example, the UE means a UE of a user, but network equipment such as a base station may also be regarded as a kind of UE when transmitting/receiving a signal according to a communication method between the UEs. In addition, as an example, the proposed schemes of the present disclosure may be limitedly applied only to MODE 2 V2X operation (and/or MODE 1 V2X operation). Here, as an example, the proposed schemes of the present disclosure may be limitedly applied only to the case that (as a predefined (/signaled) condition is satisfied) '(transport) resource (re)selection operation' is triggered) a packet (/message) (to be transmitted or generated) packet (/message) is existed on '(LOW LAYER) buffer' (and/or 'PDCP LAYER') (or a packet (/message) is generated) (or the case that a packet (/message) (to be transmitted or generated) packet (/message) is not existed on '(LOW LAYER) buffer' (and/or 'PDCP LAYER') (or a packet (/message) is not generated). In addition, as an example, the proposed schemes of the present disclosure may be limitedly applied only to the case that PSSCH and (the interlinked) PSCCH are not located (or located) in adjacent RB(S) on the same subframe. In addition, as an example, the proposed schemes of the present disclosure may be extendedly applied to V2V MODE 1 (/MODE 2) SEMI-PERSISTENT SCHEDULING (SPS) operation (and/or V2X MODE 1 (/MODE 2) DYNAMIC SCHEDULING operation and/or V2X MODE 1 (/MODE 2) SPS operation) as well as V2V MODE 1 (/MODE 2) DYNAMIC SCHEDULING operation. In addition, as an example, the wording "transport resource selection" may be (extendedly) applied to "transport resource (re)selection".

FIG. 39 is a block diagram illustrating a UE in which the embodiment of the present disclosure is implemented.

Referring to FIG. 39, a UE 1100 includes a processor 1110, a memory 1120 and a radio frequency (RF) unit 1130.

According to an embodiment, the processor 1110 may control such that, in the case that a plurality number of "minimum T2 values" is configured (/signaled) for a specific PPPP value, the UE may (finally) select the greatest "minimum T2 value" among those smaller or equal to its own transmission packet delay value (this is referred to as VAL_LAC) (of the highest priority or short latency requirement) or an extra/allowed time that satisfies VAL_LAC.

In the case that such a rule is applied, for example, the resource selection related selection window length is maintained as the longest to the maximum (simultaneously with satisfying transport packet related latency requirement), the selection resource collision problem between different UEs may be alleviated.

As another example, in the case that "minimum T2 value (set)" is configured for each PPPP (for each carrier), the PPPP value which is a criterion of selecting "minimum T2 value" used when the UE performs resource reselection for a specific carrier may be defined as (A) that of the highest (/lowest) priority or (B) V2X message related PPPP value on timing of performing resource reselection (or triggering) among a plurality of V2X message related PPPP values.

The minimum value of T2 may be decreased for reducing delay of physical layer. T2 minimum value selection based (pre)determined configuration may also be supported. The minimum value of T2 may be selected in a set including a plurality of values. The set may include a value of 20 ms or a value smaller than 20 ms.

As another example, when a UE configures a selection window of [T1, T2] length (e.g., "T1≤≤T2" or "T1<T2"), T2 value (e.g., "MIN T2≤≤T2") may be selected as a value that may satisfy the latency requirement of a transmission message, and T1 value may be designated considering a processing time of the transmission message (e.g., "0≤≤T1≤≤4") (according to a UE implementation).

Here, the message transmission related "minimum T2 value" of relatively short latency requirement (and/or relatively high PPPP value) may be configured (/signaled) as relatively short. In this case, a selection window may have too short length (e.g., selection resource collision probability between different UEs of adjacent positions is unable to be lowered sufficiently) or disappeared.

In order to solve the problem, "minimum (and/or maximum) TI value" may be defined as UE CAPABILITY. In the case that the rule is applied, owing to the UE CAPABILITY limitation related to "minimum (and/or maximum) TI value", it may be interpreted that the UE failing to secure a preconfigured (/signaled) (minimum) selection window size is unable to perform (/allow) specific service type (/PPPP) related message transmission (of relatively short latency requirement) (and/or resource reservation/selection).

As another example, "minimum (and/or maximum) TI value" (or UE CAPABILITY type) information in which specific service type (/PPPP) related message transmission (of the latency requirement) (and/or resource reservation/selection) may be performed (/allowed) may be configured (/signaled) (from a network) (together with or separately from MIN T2 information for each service type (/PPPP)).

As another example, "minimum (and/or maximum) TI value" in which message transmission and/or resource reservation/selection may be performed (/allowed) may be differently (or independently) configured (/signaled) (from a network) for each PPPP (or service type) (for each carrier), or the UE may report the corresponding information to a base station through a predefined signaling.

As an additional example, "minimum (and/or maximum) TI value" in which message transmission and/or resource reservation/selection may be performed (/allowed) may be differently (or independently) configured (/signaled) (from a network) according to CBR value (/range).

As another example, after PSSCH-RSRP threshold value based candidate (transport) resource exclusion operation (STEP 2 operation) for each CBR (set/range), a candidate (transport) resource ratio (/number) remained in the transport resource (re)selection window may be differently configured (/signaled).

In the case that such a rule is applied, in heavy load situation, a selection resource (position) randomization between (adjacent) UEs may be increased (e.g., for relatively high CBR, remaining candidate resource ratio (/number) after PSSCH-RSRP threshold value based candidate (transport) resource exclusion operation may be highly configured).

The examples for the proposed scheme described above may be included as one of the implementation methods of the present disclosure. Accordingly, it is understood that the examples for the proposed scheme may be regarded as a sort of proposed methods. Further, the proposed schemes described above may be implemented independently, but also implemented as a combination (or merge) of a part of proposed schemes. As an example, the present disclosure has been described a proposal method on the basis of the 3GPP LTE/LTE-A system for convenience of description, the scope of the system to which the proposed method is applied may be extended to other systems in addition to the 3GPP LTE/LTE-A system. As an example, the proposed schemes of the present disclosure may be extended and applied for D2D communication. Here, the D2D communication means that the UE communicates directly with another UE using a wireless channel. The UE means a UE of a user, but network equipment such as a base station may also be regarded as a kind of UE when transmitting/receiving a signal according to a communication method between the UEs.

In addition, the proposed schemes of the present disclosure may be limitedly applied only to MODE 2 V2X operation (and/or MODE 1 V2X operation). In addition, the proposed schemes of the present disclosure may be limitedly applied only to the case that (as a predefined (/signaled) condition is satisfied) '(transport) resource (re)selection operation' is triggered) a packet (/message) (to be transmitted or generated) packet (/message) is existed on '(LOW LAYER) buffer' (and/or 'PDCP LAYER') (or a packet (/message) is generated) (or the case that a packet (/message) (to be transmitted or generated) packet (/message) is not existed on '(LOW LAYER) buffer' (and/or 'PDCP LAYER') (or a packet (/message) is not generated).

The proposed schemes of the present disclosure may be limitedly applied only to the case that PSSCH and (the interlinked) PSCCH are not located (or located) in adjacent RB(S) on the same subframe.

In addition, the proposed schemes of the present disclosure may be extendedly applied to V2V MODE 1 (/MODE 2) SEMI-PERSISTENT SCHEDULING (SPS) operation (and/or V2X MODE 1 (/MODE 2) DYNAMIC SCHEDULING operation and/or V2X MODE 1(/MODE 2) SPS operation) as well as V2V MODE 1 (/MODE 2) DYNAMIC SCHEDULING operation.

Furthermore, the proposed schemes of the present disclosure may be limitedly applied only to the case of INTRA- BAND carrier aggregation or the case of limited UE capability that is unable to perform simultaneous transmission/reception operation on different carriers.

Figure 42:
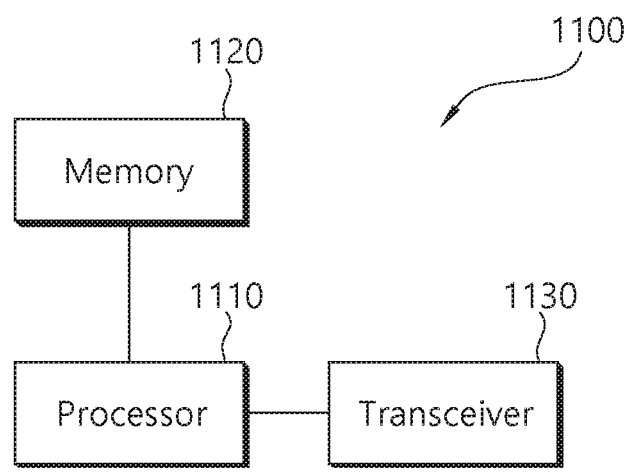
FIG. 42 is a block diagram showing a UE according to an embodiment of the present disclosure.

FIG. 42 is a block diagram illustrating a UE in which the embodiment of the present disclosure is implemented.

Referring to FIG. 42, a UE 1100 includes a processor 1110, a memory 1120 and a transceiver 1130.

According to an embodiment, the processor 1110 may perform the function/operation/method described in the present disclosure. For example, the processor 1110 may perform sensing during a sensing duration, after excluding a candidate resource based on PSSCH-RSRP threshold value within the selection window, select a resource for performing a V2X communication, and then perform V2X communication using the selected resource.

The memory 1120 may store information/code/command/measurement result, and the like required for UE 1100 operation. The memory 1120 may be connected to the processor 1110.

The transceiver 1130 is connected to the processor 1110 and transmits and receives a radio signal.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include one or more antenna for transmitting and/or receiving radio signals. When the above-described embodiment is implemented in software, the above-described method may be implemented using a module (process or function) which performs the above function. The module may be stored in the memory and executed by the processor. The memory may be disposed to the processor internally or externally and connected to the processor using a variety of well-known means.

Figure 43:
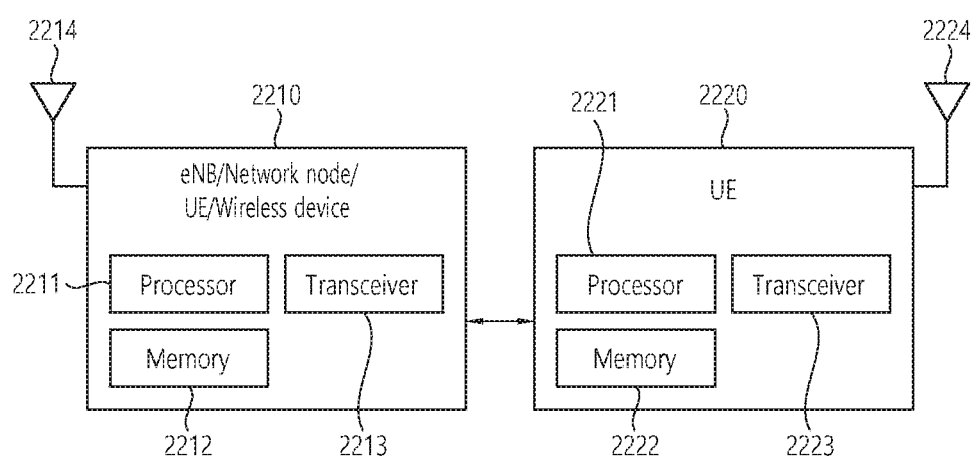
FIG. 43 is a block diagram for an example of a wireless communication device according to an embodiment of the present disclosure.

FIG. 43 is a block diagram for an example of a wireless communication device according to an embodiment of the present disclosure.

Referring to FIG. 43, a wireless communication device may include a base station 2210 and a UE 2220. The UE 2220 may be positioned in the area of the base station 2210. In some scenario, the wireless communication device may include multiple UEs. In the example of FIG. 43, the base station 2210 and the UE 2220 are shown, but the present disclosure is not limited thereto. For example, the base station 2210 may be replaced by another network node, UE, wireless device, or other device.

The base station and the UE may be represented as a wireless communication device or a wireless device, respectively. In FIG. 43, the base station may be replaced by a network node, a wireless device or a UE.

The base station 2210 may include one or more processors including a processor 2211, at least one memory including a memory 2212, and at least one transceiver including a transceiver 2213. The processor 2211 may perform the functions, procedures, and/or methods described above. The processor 2211 may perform one or more protocols. For example, the processor 2211 may perform one or more layers of the wireless interface protocol. The memory 2212 is connected to the processor 2211 and may store various types of information and/or instructions. The transceiver 2213 is connected to the processor 2211 and may be controlled to transmit and receive wireless signals.

The UE 2220 may include at least one processor including a processor 2221, at least one memory device including a memory 2222, and at least one transceiver including a transceiver 2223.

The processor 2221 may perform the functions, procedures, and/or methods described above. The processor 2221 may implement one or more protocols. For example, the processor 2221 may implement one or more layers of a wireless interface protocol. The memory 2222 is coupled to the processor 2221 and may store various types of information and/or instructions. The transceiver 2223 is connected to the processor 2221 and may be controlled to transmit and receive wireless signals.

The memory 2212 and/or the memory 2222 may be coupled internally or externally to the processor 2211 and/or the processor 2221 or may be connected to other processors through a variety of technologies such as wired or wireless connections.

The base station 2210 and/or the UE 2220 may have more than one antenna. For example, antenna 2214 and/or antenna 2224 may be configured to transmit and receive wireless signals.

Figure 44:
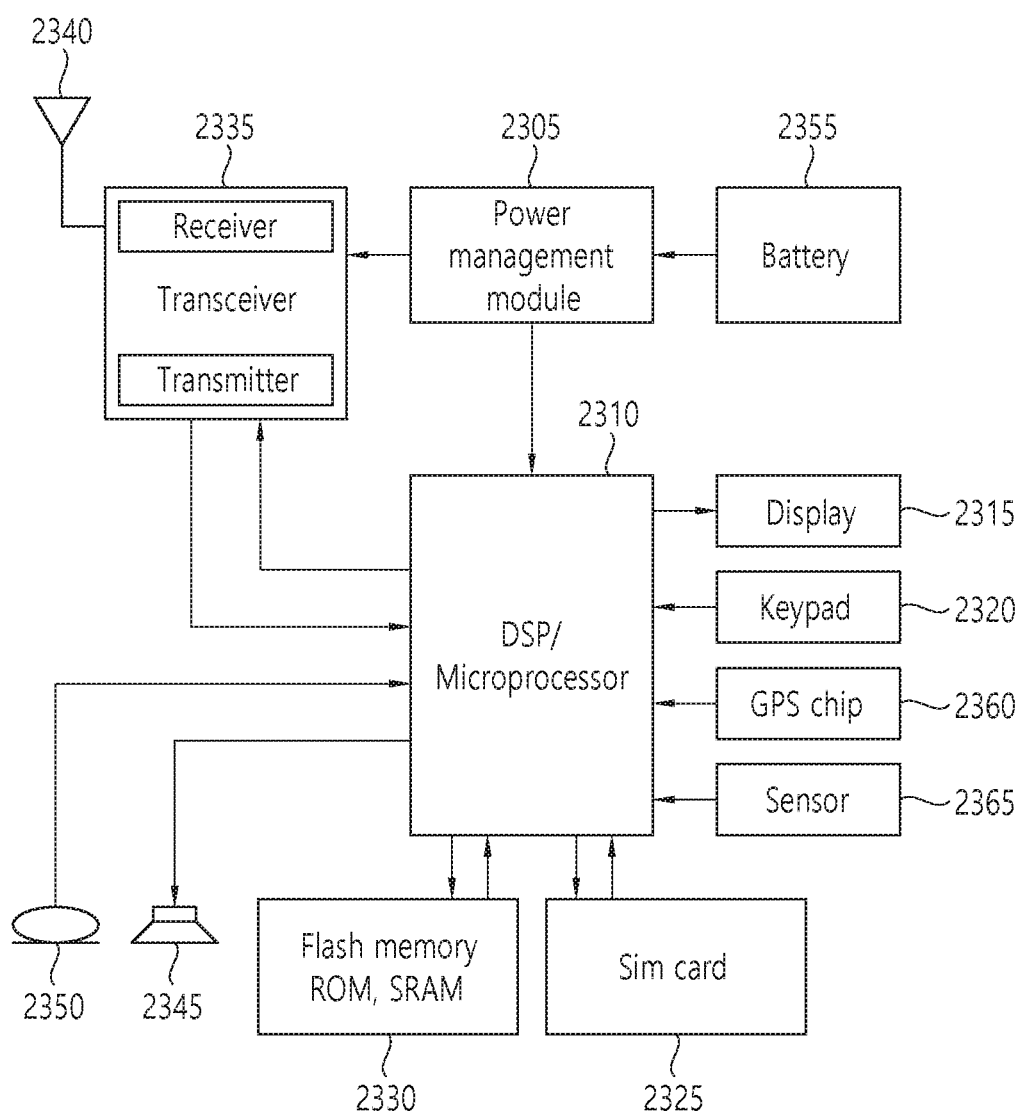
FIG. 44 illustrates an example of a wireless communication device according to an embodiment of the present disclosure.

FIG. 44 illustrates an example of a wireless communication device according to an embodiment of the present disclosure.

FIG. 44 may be a diagram more specifically illustrating the UE 2220 of FIG. 43 above. However, the wireless communication device in FIG. 44 is not limited to the UE 2220. The wireless communication device may be an arbitrary proper mobile computer device configured to perform one or more implementations of the present disclosure such as a vehicle communication system or device, a wearable device, a portable computer, a smart phone, and the like.

Referring to FIG. 44, the UE 2220, like the processor 2310, may include at least one processor (e.g., DSP or microprocessor), a transceiver 2335, a power management module 2305, an antenna 2340, a battery 2355, a display 2315, a keypad 2320, a GPS chip 2360 and sensor 2365, a memory 2330, a subscriber identification module (SIM) card 2325 (this component is optional), a speaker 2345, and a microphone 2350. The UE 2220 may also include a single antenna or multiple antennas.

The processor 2310 may be configured to perform a function, a process, and/or a method described above. According to an implementation example, the processor 2310 may perform one or more protocols like layers of a wireless interface protocol.

The memory 2330 is connected to the processor 2310 to store information related to an operation of the processor 2310. The memory 2330 may be positioned inside or outside the processor 2310 and connected with another processor through various techniques such as wired or wireless connection.

A user may input various types of information (e.g., command information like a telephone number) by pressing the keypad 2320 or by voice activation using the microphone 2350. The processor 2310 receives such command information and processes to perform appropriate functions including dialing a telephone number. As an example, data (e.g., operational data) may be searched from the SIM card 2325 or the memory 2330. As another example, the processor 2310 may receive and process GPS information from the GPS (Global Positioning System) chip 2360 to perform the function related to a position of UE such as vehicle navigation, map service, and the like. As another example, the processor 2310 may display various types of information and data on the display 2315 for the user to recognize and for convenience.

The transceiver 2335 is connected to the processor 2310 to transmit/receive an RF signal. The processor 2310 transfers the command information to the RF module 2335 to initiate communication, for example, to transmit wireless signals including voice communication data. The transceiver 2335 includes a receiver and a transmitter for receiving and transmitting the wireless signals. The antenna 2340 functions to transmit and receive the wireless signals. According to an implementational example, upon receiving the wireless signals, the transceiver 2335 may transfer the signals for processing by the processor 2310 and convert the signals to a baseband. The processed signal may be converted into to audible or readable information output via the speaker 2345 according to various techniques.

According to an implementational example, the sensor 2365 may be connected to the processor 2310. The sensor 2365 may include one or more detection device configured to discover a format of various types of information including a velocity, an acceleration, a light, a vibration, a proximity, a position, an image, but not limited thereto. The processor 2310 may receive and process the sensor information obtained from the sensor 2365 and perform various forms of function such as collision prevention, automatic driving, and the like.

In the example of FIG. 44, various constituent elements (e.g., a camera, a USB port, etc.) may be further included in the UE. For example, the camera may be connected to the processor 2310 and used for various services such as automatic driving, vehicle safety service, and the like.

As such, FIG. 44 is just an example, and the implementation is not limited thereto. For example, some constituent elements (e.g., the keypad 2320, the GPS chip 2360, the sensor 2365, the speaker 2345, and/or the microphone 2350) may not be implemented in a certain scenario.

Figure 45:
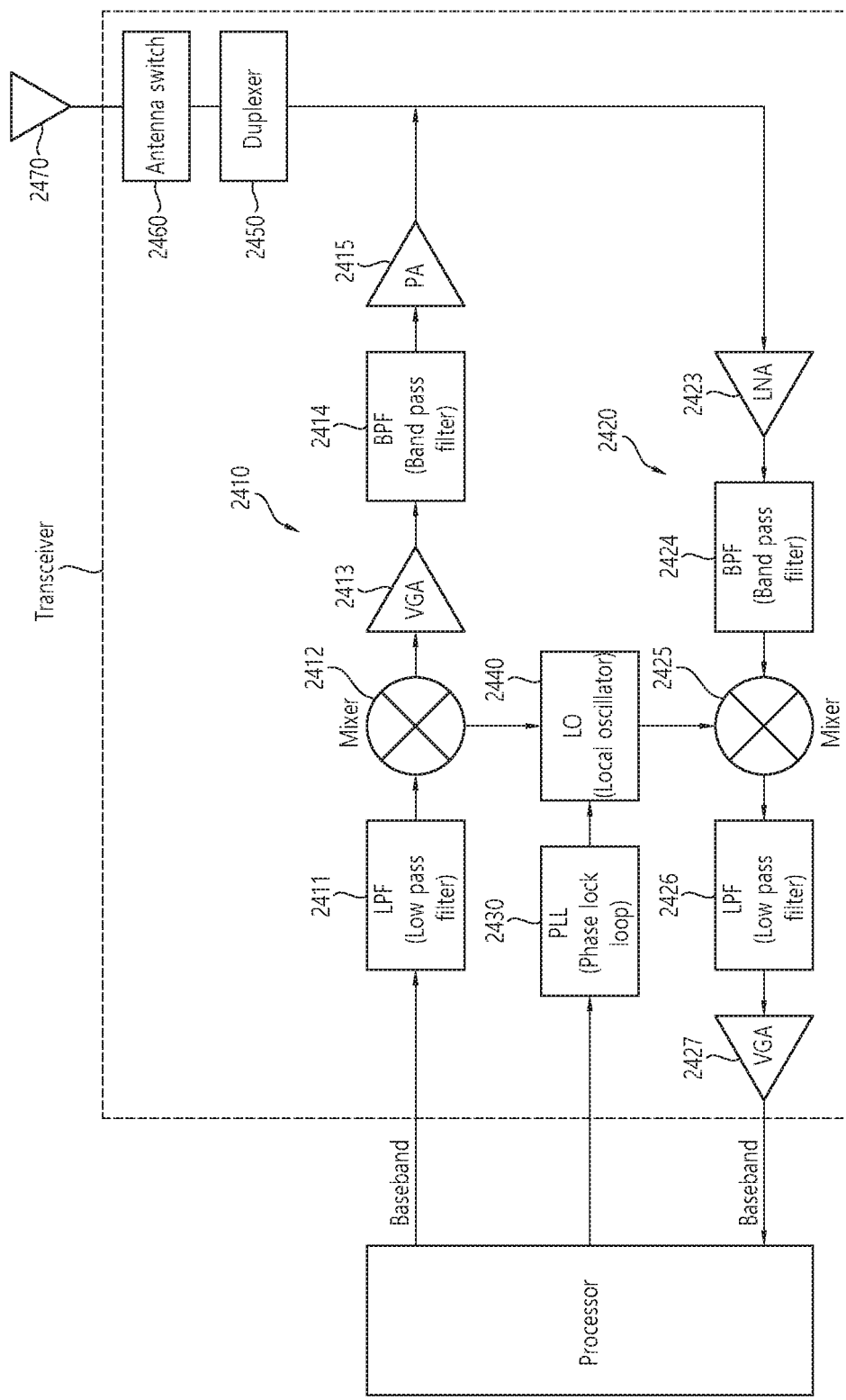
FIG. 45 illustrates an example of a transceiver of a wireless communication device according to an embodiment of the present disclosure.

FIG. 45 illustrates an example of a transceiver of a wireless communication device according to an embodiment of the present disclosure.

For example, FIG. 45 may show an example of a transceiver which may be implemented in frequency division duplex (FDD) system.

In a transmission path, like the processor depicted in FIG. 43 and FIG. 44, at least one processor may process such that data is transmitted and send a signal such as an analogue output signal to the transceiver 2410.

In the example, the analogue output signal in the transceiver 2410, for example, may be filtered by a low pass filter (LPF) 2411 to remove noise due to previous digital-analogue conversion (ADC), upconverted to RF from baseband by the upconverter (e.g., mixer) 2412 and amplified by an amplifier such as a variable gain amplifier 2413. The amplified signal is filtered by a filter 2414, amplified by a power amplifier (PA) 2415, routed through duplexer(s) 2450/antenna switch (es) 2460, and then transmitted through an antenna 2470.

In a reception path, the antenna 2470 receives a signal in wireless environment, and the received signals are routed through the antenna switch(es) 2460/duplexer(s) 2450 and sent to the receiver 2420.

In the above example, the signal received in the receiver 2420 is amplified by an amplifier such as a low noise amplifier (LNA) 2423, filtered by a band pass filter 2424, and down-converted to baseband from RF by a down-converter (e.g., mixer) 2425.

The down-converted signal is filtered by a low pass filter (LPF) 2426, amplified by an amplifier such as VGA 2427 to obtain an analog input signal, and the analog input signal is provided to one or more processors like the processor in FIG. 22 and FIG. 23.

Furthermore, a local oscillator (LO) 2440 generates a transmission/reception of LO signal and send it to the upconverter 2412 and the down-converter 2425, respectively.

According to an implementational example, a phase lock loop 2430 may receive control information from the processor and send control signals to a LO generator 2440 to generate transmission/reception of LO signals in an appropriate frequency.

The implementations are not limited to the specific deployment shown in FIG. 45, but various constituent elements and circuits may be differently disposed from the example shown in FIG. 45.

Figure 46:
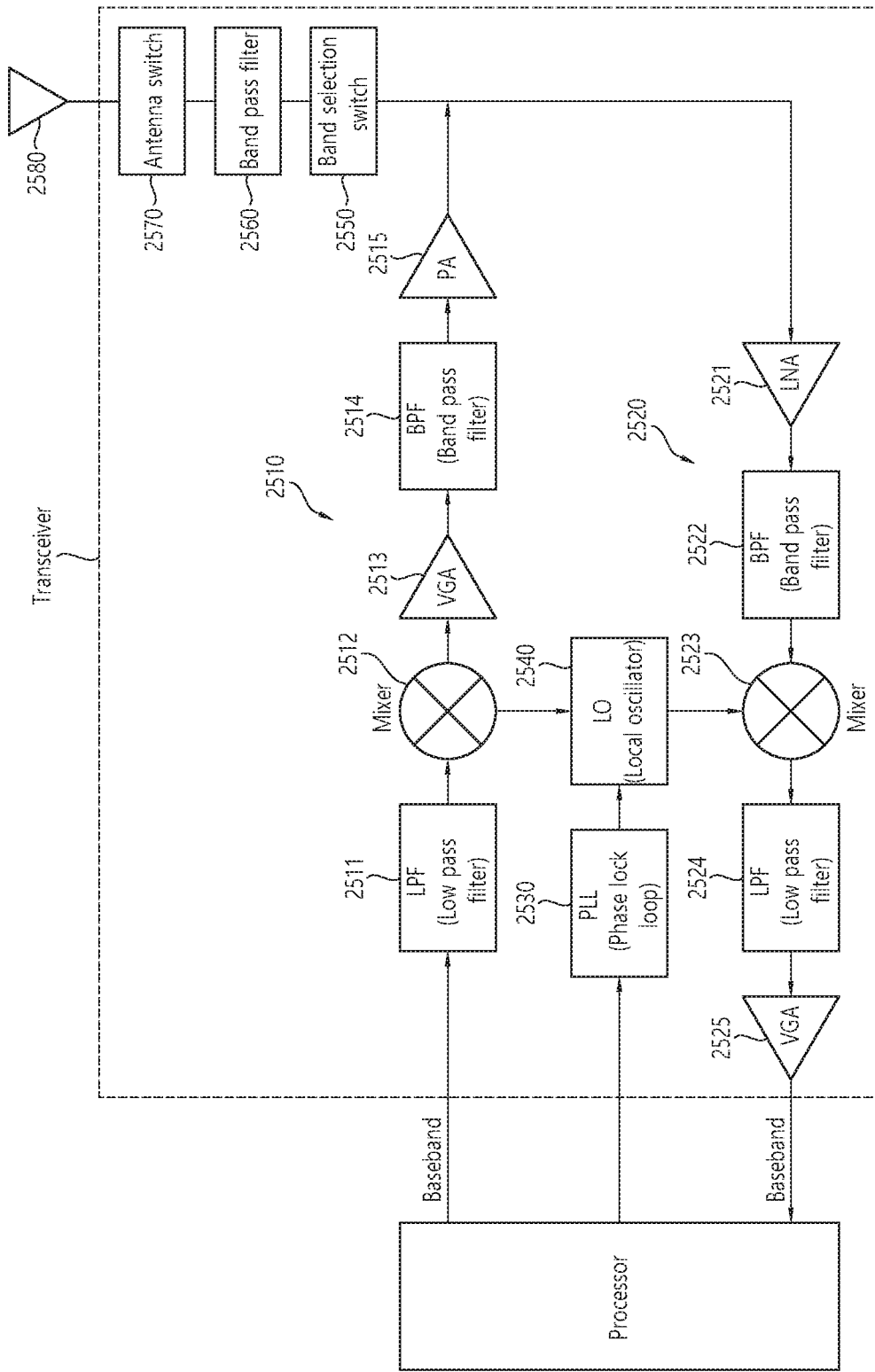
FIG. 46 illustrates another example of a transceiver of a wireless communication device according to an embodiment of the present disclosure.

FIG. 46 illustrates another example of a transceiver of a wireless communication device according to an embodiment of the present disclosure.

For example, FIG. 46 may show an example of a transceiver which may be implemented in time division duplex (TDD) system.

According to an implementational example, a transmitter 2510 and a receiver 2520 of a transceiver of the TDD system may have one or more similar properties to the transmitter and the receiver of the FDD system. Hereinafter, a structure of the transceiver of the TDD system is described.

In a transmission path, a signal amplified by a power amplifier (PA) 2515 of the transmitter is routed through a band selection switch 2550, a band pass filter (BPF) 2560 and an antenna switch(es) 2570 and transmitted to an antenna 2580.

In a reception path, the antenna 2580 receives a signal in wireless environment, and the received signals are routed through the antenna switch(es) 2570, the band pass filter (BPF) 2560 and the band selection switch 2550 and provided to the receiver 2520.

Figure 47:
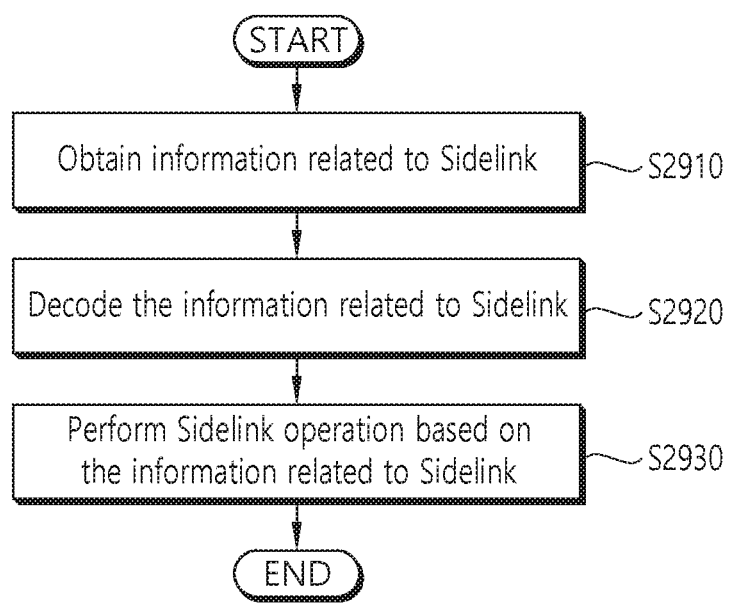
FIG. 47 illustrates a wireless device operation example related to Sidelink communication.

FIG. 47 illustrates a wireless device operation example related to Sidelink communication. The wireless device operation related to Sidelink described in FIG. 47 is just an example, but Sidelink operations using various techniques may be performed in the wireless device. Sidelink is UE-to-UE interface for Sidelink communication and/or Sidelink discovery. Sidelink may correspond to PC5 interface. In wide meaning, the Sidelink operation may be transmission/reception of information between UEs. Sidelink may deliver various types of information.

In the above example, a wireless device obtains information related to Sidelink (step, S2910). The information related to Sidelink may be one or more resource configurations. The information related to Sidelink may be obtained from another wireless device or a network node.

After obtaining the information, the wireless device decodes the information related to Sidelink (step, S2920).

After decoding the information related to Sidelink, the wireless device performs one or more Sidelink operations based on the information related to Sidelink (step, S2930). Here, the Sidelink operation(s) performed by the wireless device may be one or more operations described herein.

Figure 48:
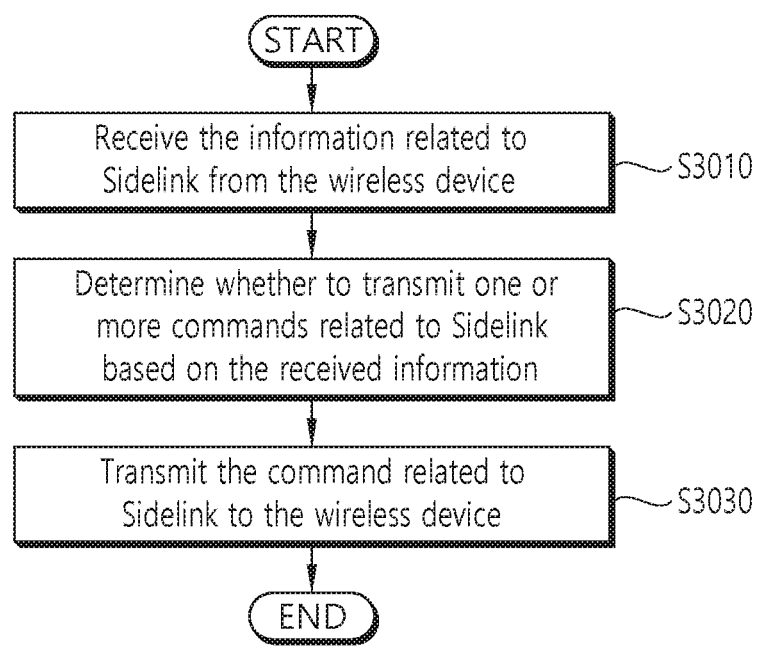
FIG. 48 illustrates a network node operation example related to Sidelink communication.

FIG. 48 illustrates a network node operation example related to Sidelink communication. The network node operation related to Sidelink described in FIG. 48 is just an example, but Sidelink operations using various techniques may be performed in the network node.

The network node receives the information related to Sidelink from the wireless device (step, S3010). For example, the information related to Sidelink may be 'SidelinkUEInformation' used for informing Sidelink information to the network node.

After receiving the information, the network node determines whether to transmit one or more commands related to Sidelink based on the received information (step, S3020).

According to the determination of the network node to transmit the command, the network node transmits the command(s) related to Sidelink to the wireless device (step, S3030). According to an implementational example, after receiving the command transmitted by the network node, the wireless device may perform one or more Sidelink operation(s) based on the received command.

Figure 49:
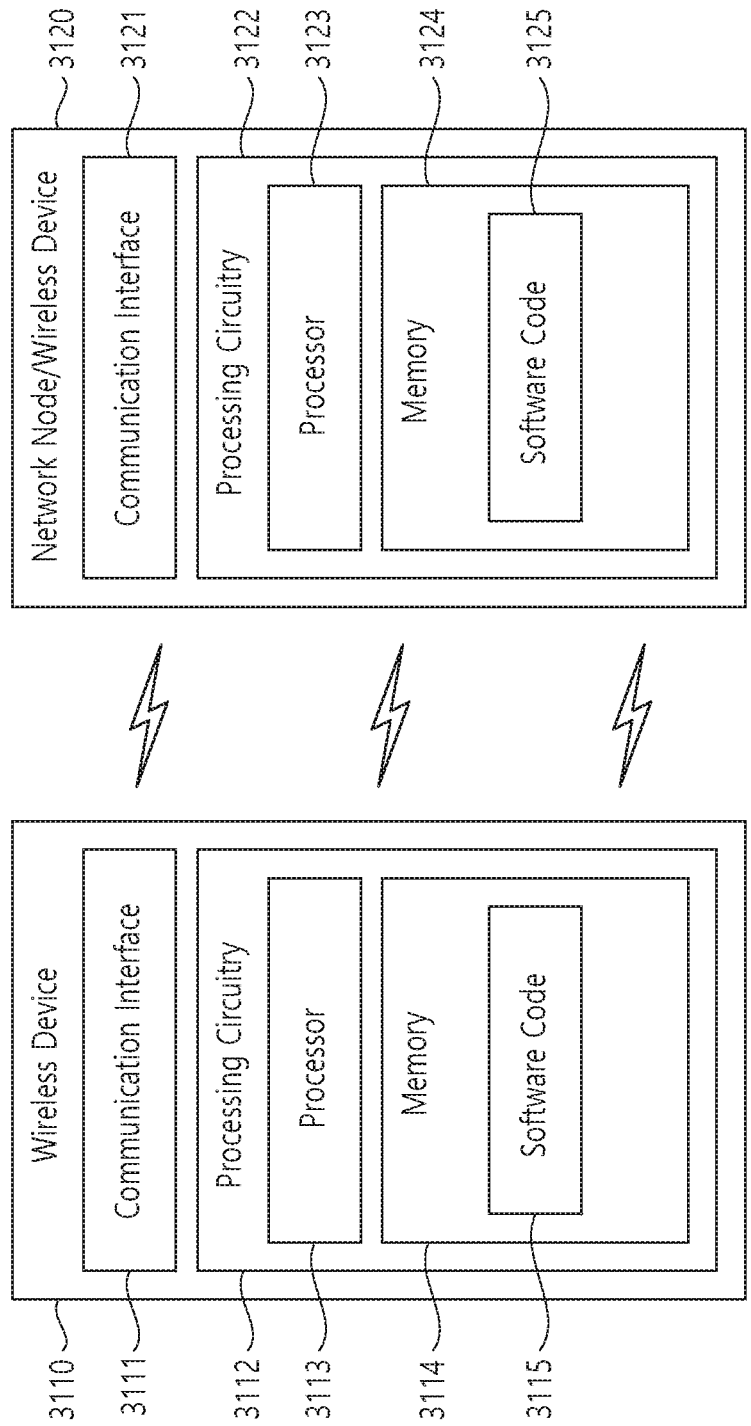
FIG. 49 is a block diagram illustrating an example of implementing a wireless device 3110 and a network node 3120.

FIG. 49 is a block diagram illustrating an example of implementing a wireless device 3110 and a network node 3120. The network node 3120 may be replaced by a wireless device or a UE.

In the example, the wireless device 3110 includes a communication interface 3111 to communicate with one or more other wireless devices, network nodes and/or other elements in the network. The communication interface 3111 may include one or more transmitter, one or more receiver and/or one or more communication interface. The wireless device 3110 includes a processing circuit 3112. The processing circuit 3112 may include one or more processors including a processor 3113 and one or memory including a memory 3114.

The processing circuit 3112 may be configured to control arbitrary methods described in the present disclosure and/or processes and/or for the wireless device 3110 to perform such a method and/or process. The processor 3113 corresponds to one or more processor for performing the wireless device functions described in the present disclosure. The wireless device 3110 includes the memory 3114 configured to store data, program software code and/or other information described in the present disclosure.

According to an implementational example, when one or more processors is executed like the processor 3113, the memory 3114 is configured to store software code 3115 including a command to perform a part or the whole process according to the present disclosure described above.

For example, like the processor 3113, one or more processors that control one or more transceivers like the transceiver 2233 may perform one or more process related to transmission/reception of information to transmit/receive information.

The network node 3120 includes a communication interface 3121 to communicate with one or more other network nodes, wireless devices and/or other elements in a network. Here, the communication interface 3121 includes one or more transmitters, one or more receives and/or one or more communication interfaces. The network node 3120 includes a processing circuit 3122. Here, the processing circuit may include a processor 3123 and a memory 3124.

According to an implementational example, when one or more processors is executed like the processor 3123, the memory 3124 is configured to store software code 3125 including a command to perform a part or the whole process according to the present disclosure.

For example, like the processor 3123, one or more processors that control one or more transceivers like the transceiver 2213 may perform one or more process related to transmission/reception of information to transmit/receive information.

In the embodiments described above, the components and the features of the present disclosure are combined in a predetermined form. Each component or feature should be considered as an option unless otherwise expressly stated. Each component or feature may be implemented not to be associated with other components or features. Further, the embodiment of the present disclosure may be configured by associating some components and/or features. The order of the operations described in the embodiments of the present disclosure may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present disclosure may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment of the present disclosure may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that various modifications and alterations of the present disclosure may be embodied without departing from the concept or the scope of the present disclosure.

The present disclosure has been described with referring to an example applied to the 3GPP LTE/LTE-A system or 5G system (NR system), but the present disclosure may also be applied to other various wireless communication systems.

What is claimed is:

1. A method for transmitting a vehicle-to-everything (V2X) message by a User Equipment (UE) in a wireless communication system, the method comprising:

performing a candidate resource exclusion operation based on s physical sidelink shared channel-reference signal received power (PSSCH-RSRP) threshold value in a selection window;

determining whether a ratio of a remaining number of candidate resources in the selection window to a total number of candidate resources in the selection window is smaller than a first configured threshold value;

based on the ratio being smaller than the first configured threshold value and whether or not at least one of a latency requirement and priority of the V2X message satisfies a condition, performing increase of increasing the PSSCH-RSRP threshold value and re-performing the candidate resource exclusion operation based on the increased PSSCH-RSRP threshold value; and transmitting the V2X message using a selected resource among the remaining candidate resources in the selection window, wherein the condition is satisfied by the latency requirement of the V2X message being shorter than a second configured threshold value or the priority of the V2X message being higher than a third configured threshold value, and wherein: i) based on the ratio being smaller than the first configured threshold value, and the V2X message not satisfying the condition, the PSSCH-RSRP threshold value is increased and the candidate resource exclusion operation based on the increased PSSCH-RSRP threshold value is re-performed, and wherein ii) based on the ratio being smaller than the configured threshold value, and the V2X message satisfying the condition, the PSSCH-RSRP threshold value is not increased and the candidate resource exclusion operation based on an increased PSSCH-RSRP threshold value is not re-performed.

2. The method of claim 1, wherein based on a time duration of the selection window being from a first timing to a second timing, one of a plurality of candidate resources is selected for the second timing.

3. The method of claim 2, wherein the plurality of candidate resources is determined according to at least one of the latency requirement and the priority of the V2X message.

4. The method of claim 2,
wherein the first timing is determined according to a processing time required for the UE to transmit the V2X message, and
wherein the second timing is determined according to one of the latency requirement and the priority of the V2X message.

5. The method of claim 1,
wherein scheduling assignment information is received from another UE, and
wherein the PSSCH-RSRP is measured using a demodulation reference signal, DMRS, in a physical sidelink shared channel, PSSCH, region scheduled by the scheduling assignment information.

6. The method of claim 5, wherein the PSSCH region is included in the selection window.

7. A User Equipment (UE), the UE comprising:
a transceiver for transmitting and receiving a radio signal; and
a processor operatively coupled with the transceiver,
wherein the processor is configured to:
perform a candidate resource exclusion operation based on a physical sidelink shared channel-reference signal received power (PSSCH-RSRP) threshold value in a selection window;
determine whether a ratio of a remaining number of candidate resources in the selection window to a total number of candidate resources in the selection window is smaller than a first configured threshold value;
based on the ratio being smaller than the first configured threshold value and whether or not at least one of a latency requirement and priority of the V2X message satisfies a condition, increasing the PSSCH-RSRP threshold value and re-performing the candidate resource exclusion operation based on the increased PSSCH-RSRP threshold value; and
transmit the V2X message using a selected resource among the remaining candidate resources in the selection window,
wherein the condition is satisfied by the latency requirement of the V2X message being shorter than a second configured threshold value or the priority of the V2X message being higher than a third configured threshold value, and
wherein: i) based on the ratio being smaller than the first configured threshold value, and the V2X message not satisfying the condition, the PSSCH-RSRP threshold value is increased and the candidate resource exclusion operation based on the increased PSSCH-RSRP threshold value is re-performed, and
wherein ii) based on the ratio being smaller than the configured threshold value, and the V2X message satisfying the condition, the PSSCH-RSRP threshold value is not increased and the candidate resource exclusion operation based on an increased PSSCH-RSRP threshold value is not re-performed.

* * * * *